US012747356B2

(12) United States Patent
Oakley et al.

(10) Patent No.: US 12,747,356 B2
(45) Date of Patent: Sep. 29, 2026

(54) BINDER COMPOSITIONS AND USE THEREOF

(71) Applicant: NILO LIMITED, Remuera (NZ)

(72) Inventors: Simon David Oakley, Remuera (NZ); Philip Kenneth Coveny, Remuera (NZ); Niko Robert Forlong, Remuera (NZ); Aditya Milind Rudrakar, Remuera (NZ); Adam Michael Berry, Remuera (NZ); Ibrar Hussain, Remuera (NZ); Daniel Reuben Strong, Remuera (NZ); Ryan Samuel Tan, Remuera (NZ)

(73) Assignee: NILO LIMITED (NZ)

( * ) Notice: Subject to any disclaimer, the term of this patent is extended or adjusted under 35 U.S.C. 154(b) by 64 days.

(21) Appl. No.: 18/877,940

(22) PCT Filed: Dec. 2, 2024

(86) PCT No.: PCT/NZ2024/050130
§ 371 (c)(1),
(2) Date: Dec. 20, 2024

(87) PCT Pub. No.: WO2025/116752
PCT Pub. Date: Jun. 5, 2025

(65) Prior Publication Data
US 2025/0223446 A1 Jul. 10, 2025

Related U.S. Application Data

(63) Continuation of application No. PCT/IB2023/062113, filed on Dec. 1, 2023.

(30) Foreign Application Priority Data

Jun. 5, 2024 (AU) ................................ 2024901695
Aug. 29, 2024 (AU) ................................ 2024902701

(51) Int. Cl.
*C08L 97/02* (2006.01)
*B27N 3/00* (2006.01)
(Continued)

(52) U.S. Cl.
CPC .............. *C08L 97/02* (2013.01); *B27N 3/002* (2013.01); *C08J 3/05* (2013.01); *C08J 3/247* (2013.01);
(Continued)

(58) Field of Classification Search
CPC ................. C08L 97/02; C08L 2205/16; C08L 2207/066; C08L 2207/20; C08L 2312/00;
(Continued)

(56) References Cited

U.S. PATENT DOCUMENTS

2004/0076820 A1 4/2004 Hodgson
2008/0114134 A1 5/2008 Pohl

FOREIGN PATENT DOCUMENTS

CN 105542498 A * 5/2016
CN 106519556 A * 3/2017 ............ C08F 255/02
(Continued)

OTHER PUBLICATIONS

Uriguen et al., "Preparation of water-borne dispersions of polyolefins: new systems for the study of homogeneous nucleation of polymers", (Polymer 45 (2004) 5961-5968). (Year: 2004).*
(Continued)

*Primary Examiner* — Joseph S Del Sole
*Assistant Examiner* — Ronald Grinsted
(74) *Attorney, Agent, or Firm* — The Belles Group, P.C

(57) ABSTRACT

Described is a method of producing a thermoplastic dispersion or binder from virgin and/or waste plastic and the use of the dispersion or binder to produce a thermoplastic composite product, such as a composite board. A portion of the thermoplastic may be treated using heat and/or a catalyst,
(Continued)

or reacted with a coupling agent to produce a functionalised thermoplastic, and/or dispersed in water under agitation to produce a thermoplastic dispersion.

20 Claims, 30 Drawing Sheets

(51) Int. Cl.
*C08J 3/05* (2006.01)
*C08J 3/24* (2006.01)

(52) U.S. Cl.
CPC ........ *C08J 2323/06* (2013.01); *C08J 2397/02* (2013.01); *C08L 2205/16* (2013.01); *C08L 2207/066* (2013.01); *C08L 2207/20* (2013.01); *C08L 2312/00* (2013.01)

(58) Field of Classification Search
CPC ............. B27N 3/002; C08J 3/05; C08J 3/247; C08J 2323/06; C08J 2397/02
USPC ............................................................ 524/13
See application file for complete search history.

(56) References Cited

FOREIGN PATENT DOCUMENTS

| | | | | | |
|---|---|---|---|---|---|
| CN | 111334238 | A | * | 6/2020 | ......... C08G 18/4018 |
| EP | 3438184 | A1 | | 2/2019 | |
| WO | 1995013179 | A1 | | 5/1995 | |
| WO | 2008020768 | A1 | | 2/2008 | |
| WO | 2011106531 | A1 | | 9/2011 | |

OTHER PUBLICATIONS

International Search Report of PCT/NZ2024/050130, Issued Jan. 31, 2025.

* cited by examiner

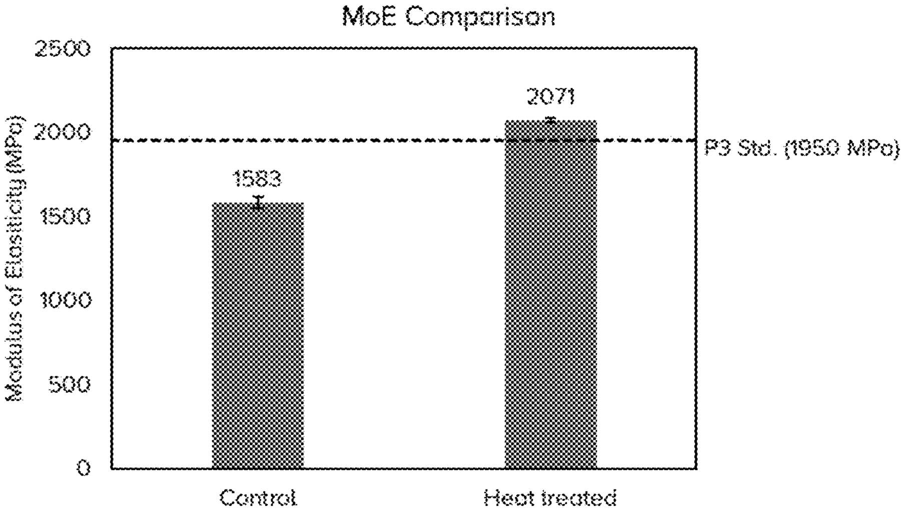
Figure 2A (ii)
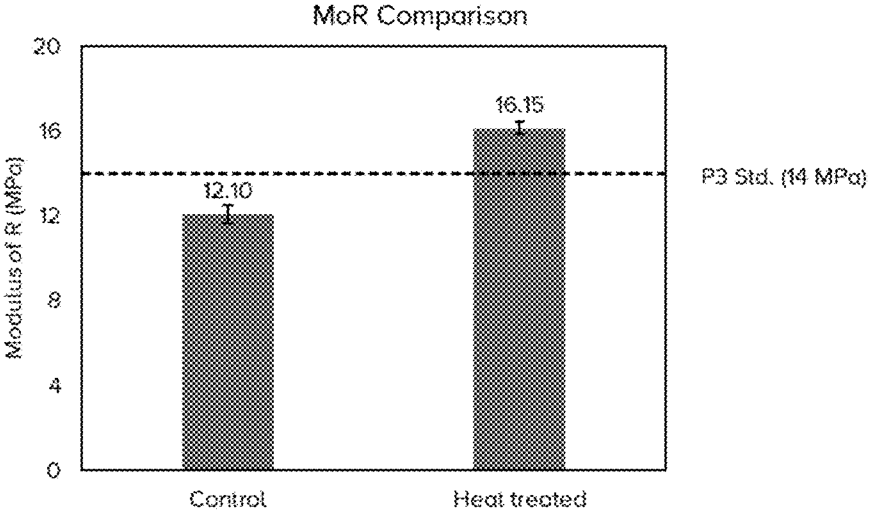
Figure 2A (iii)

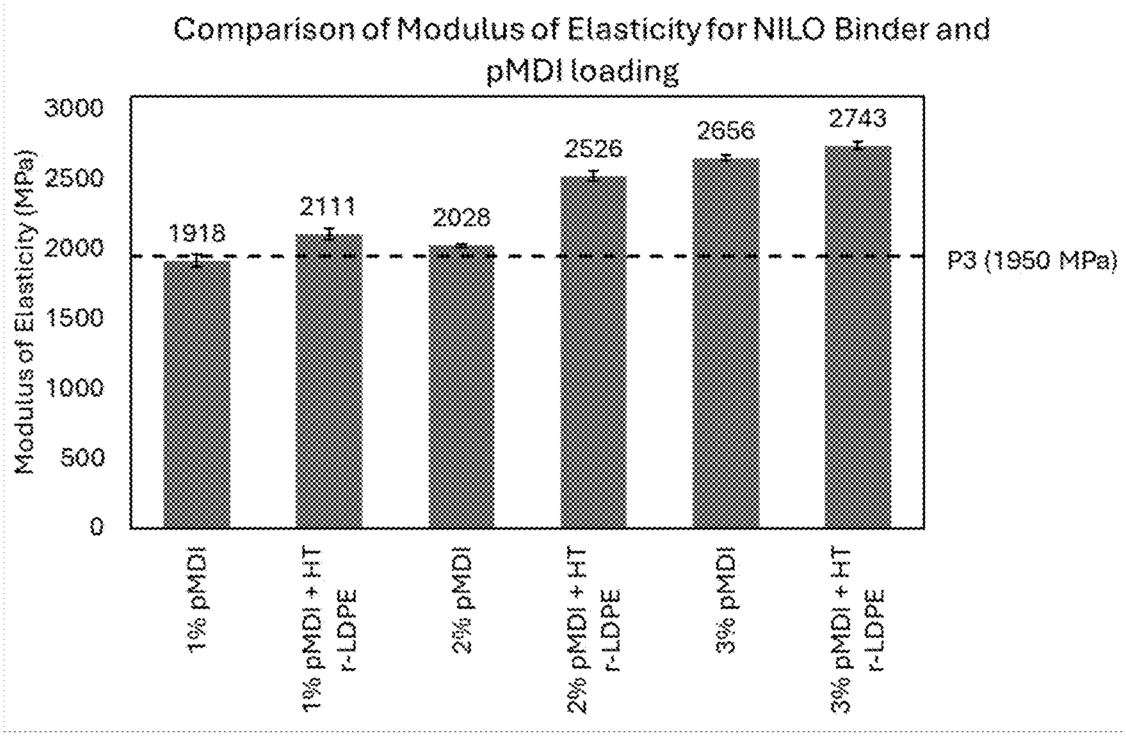
Figure 2B (i)
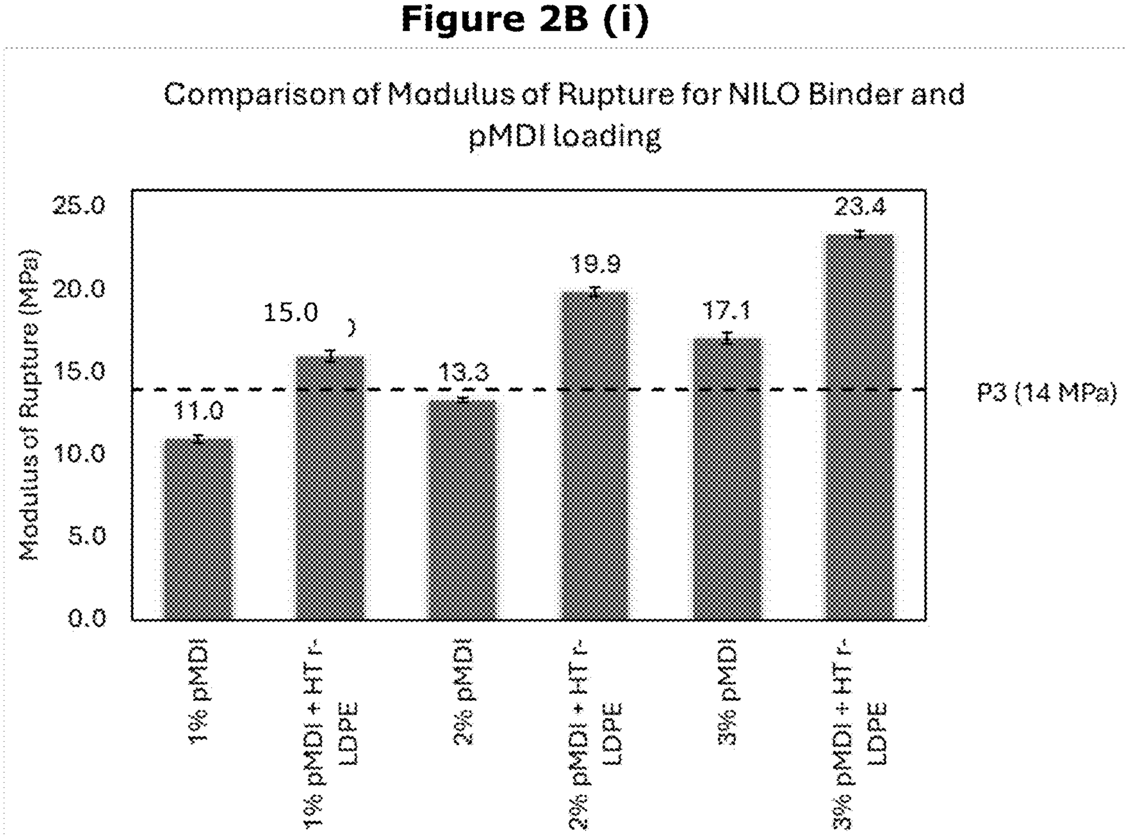
Figure 2B (ii)

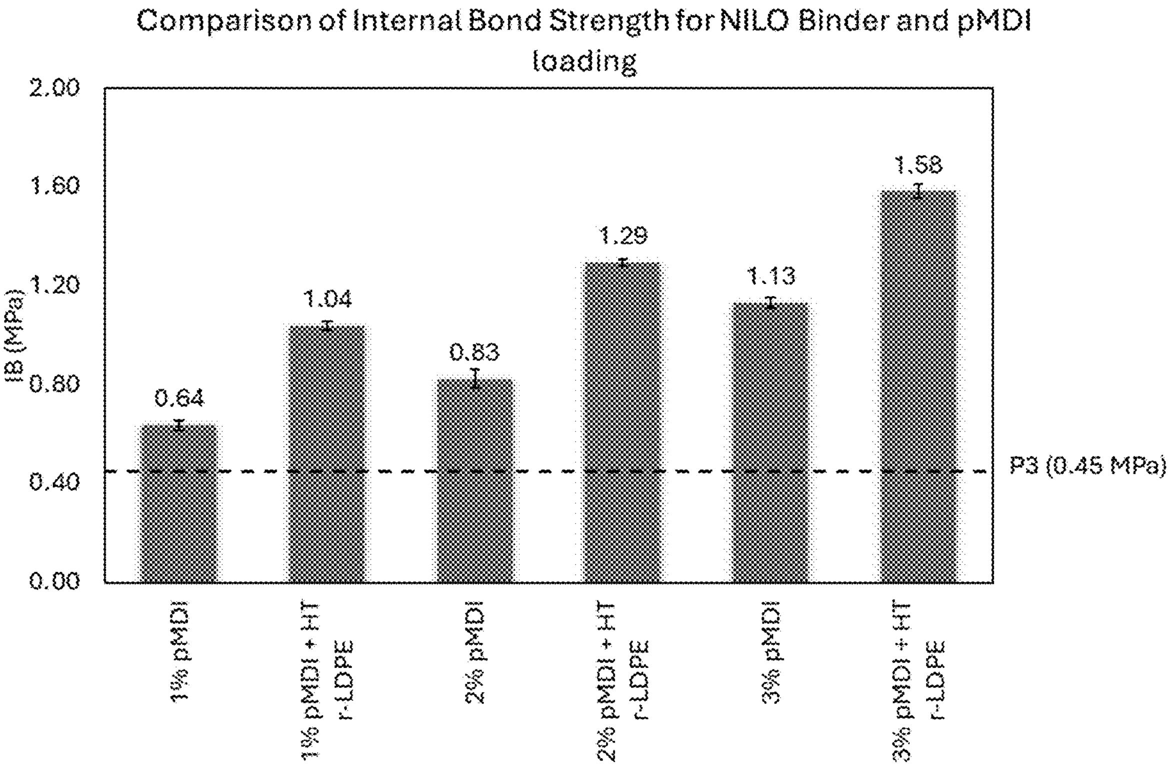
Figure 2B (iii)
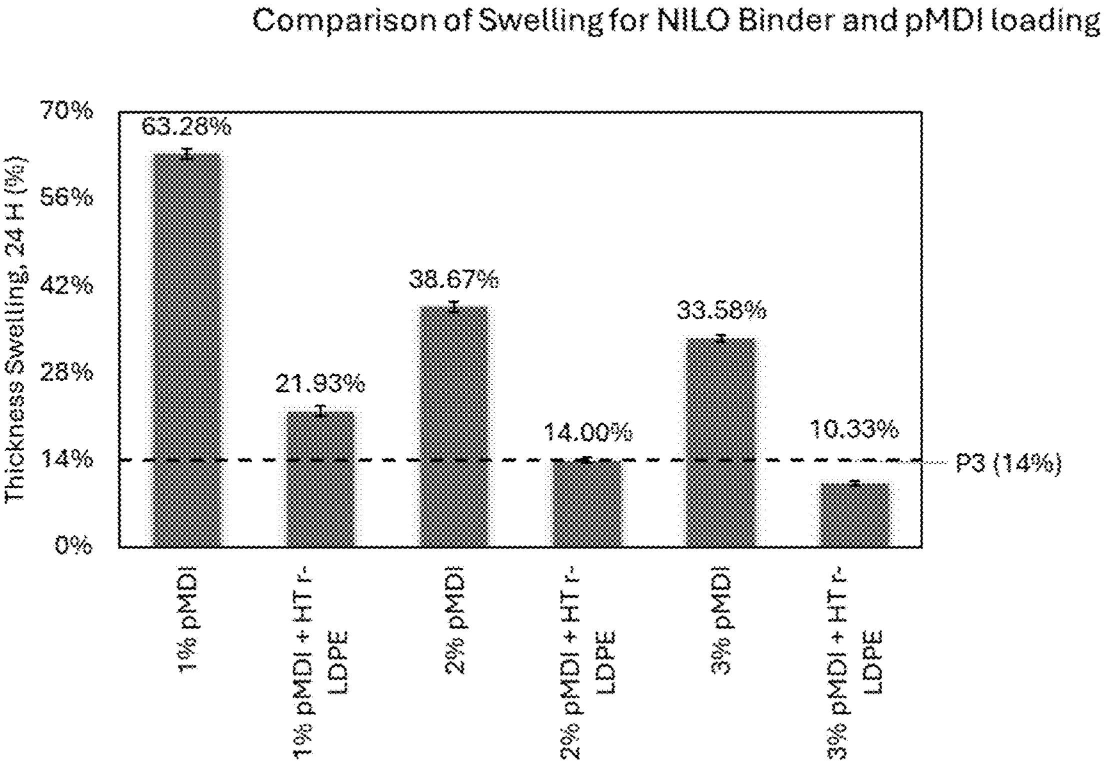
Figure 2B (iv)

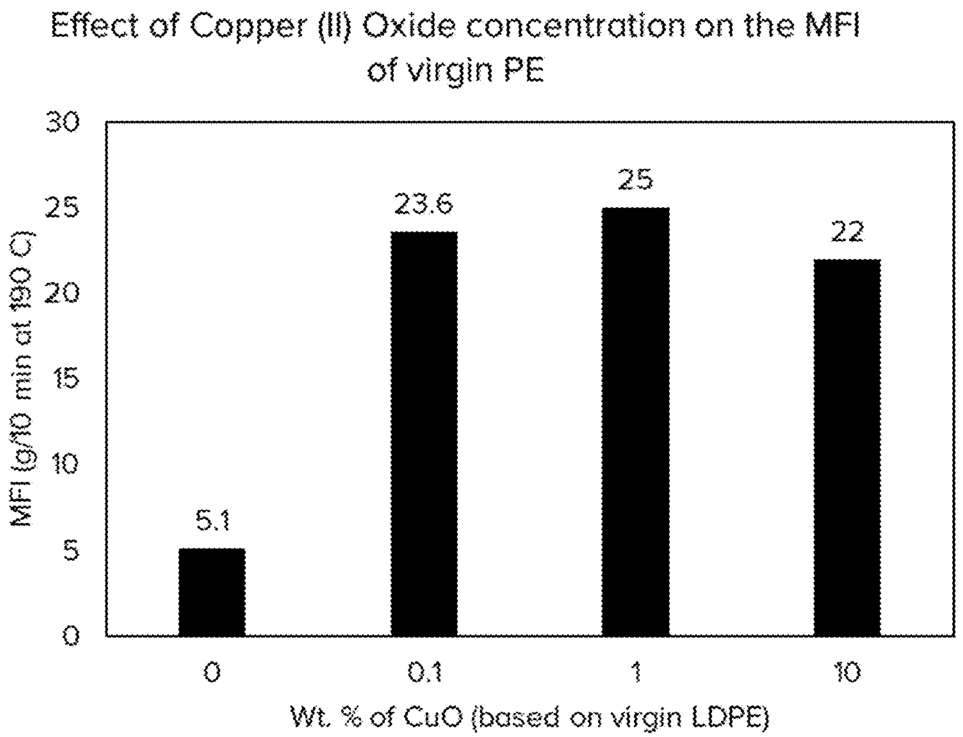
Figure 4A (i)
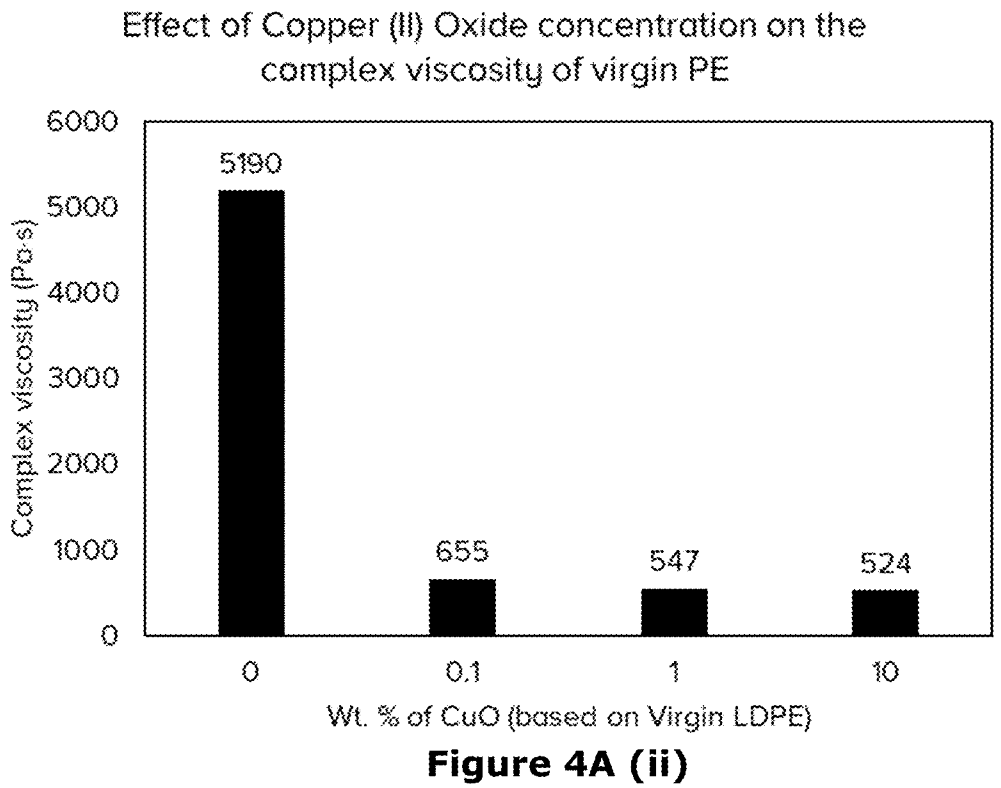
Figure 4A (ii)

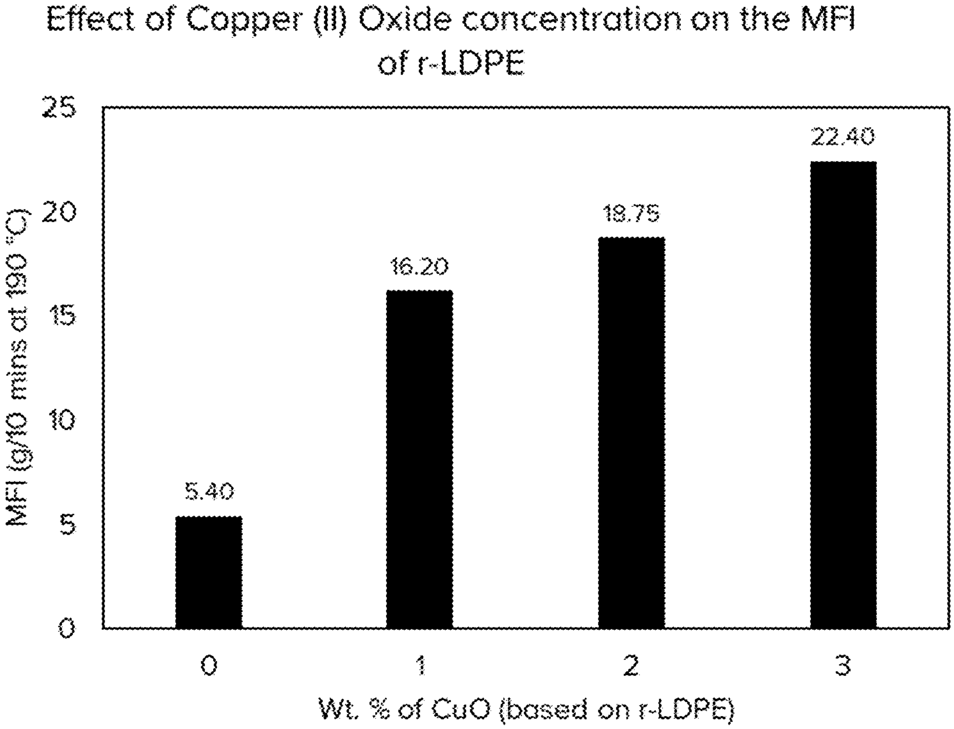
Figure 4B (i)
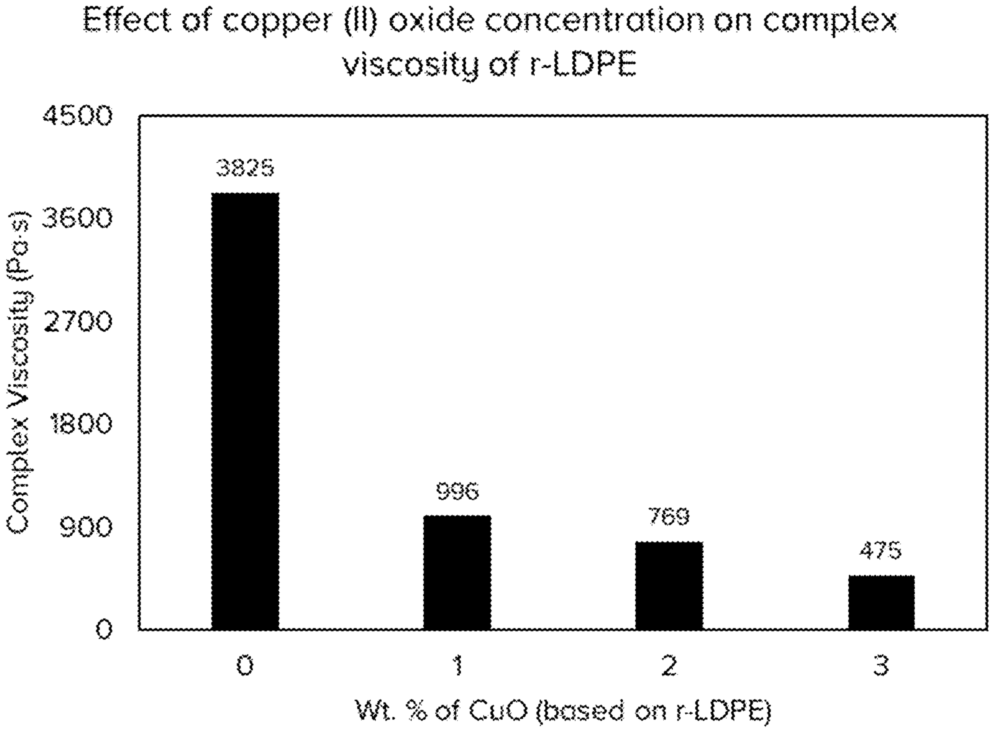
Figure 4B (ii)

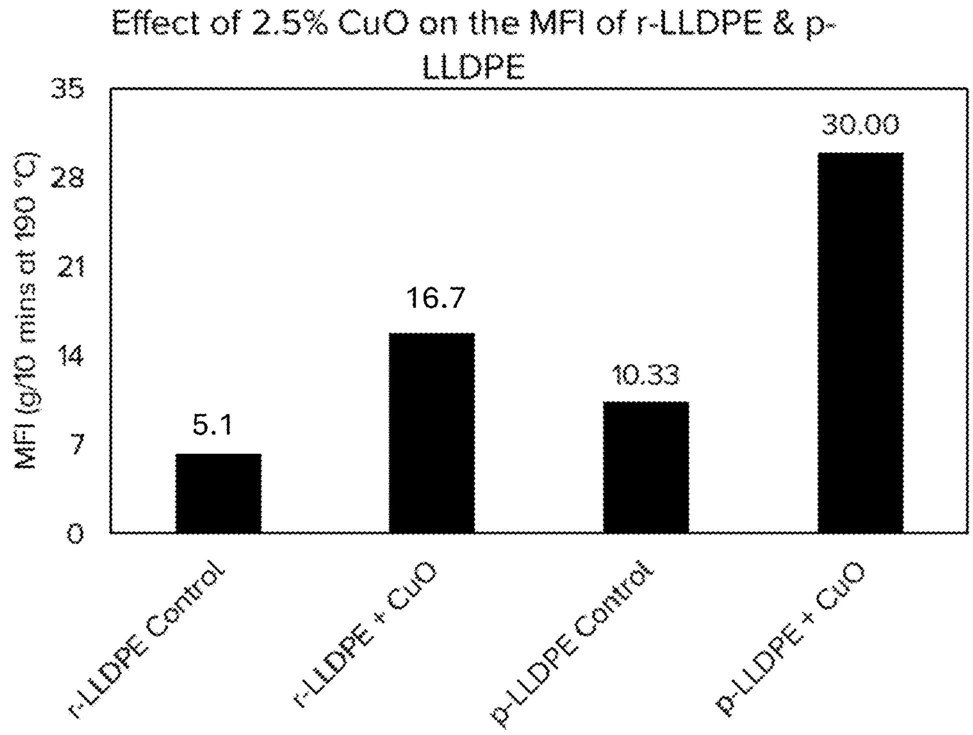
Figure 4C (i)
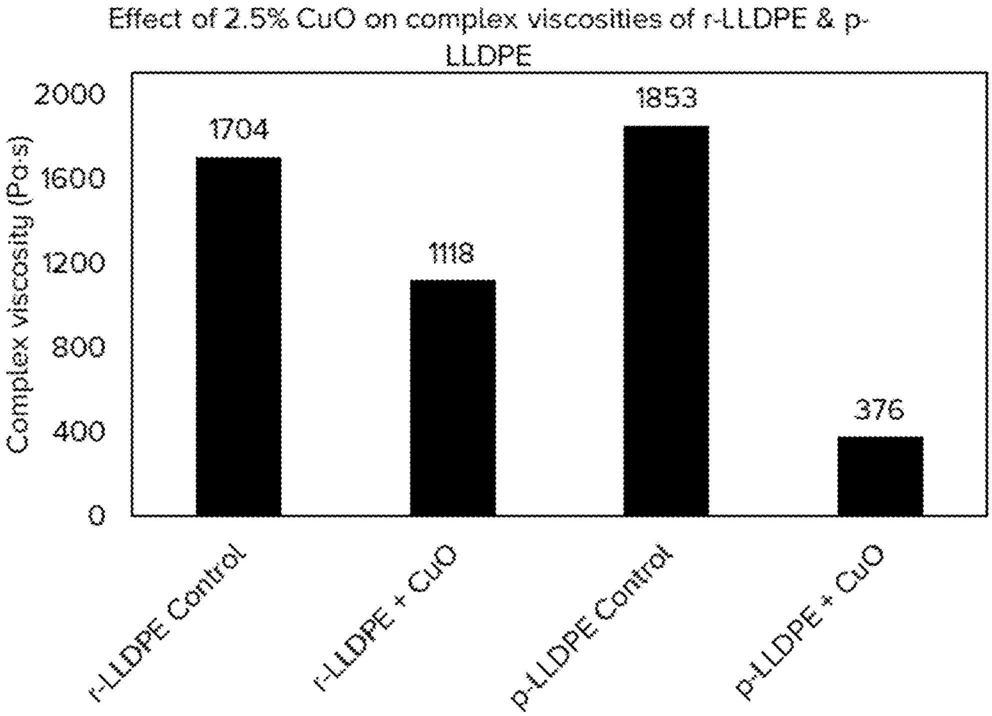
Figure 4C (ii)

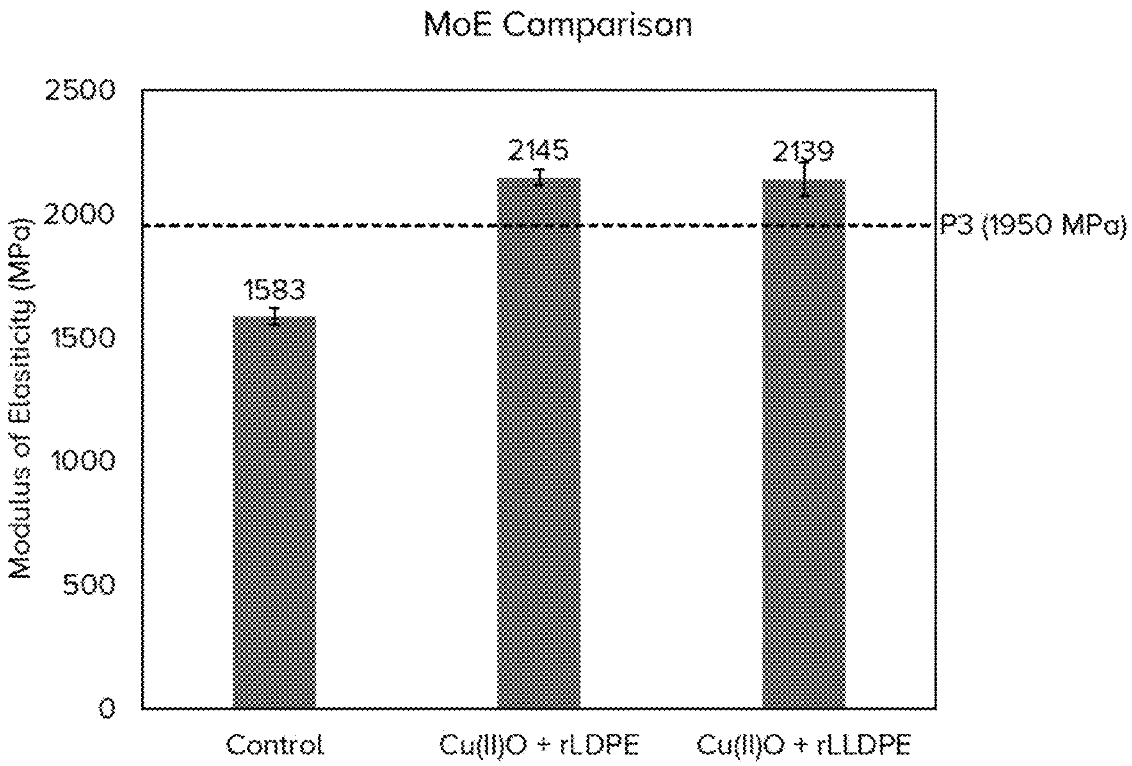
Figure 6 (i)
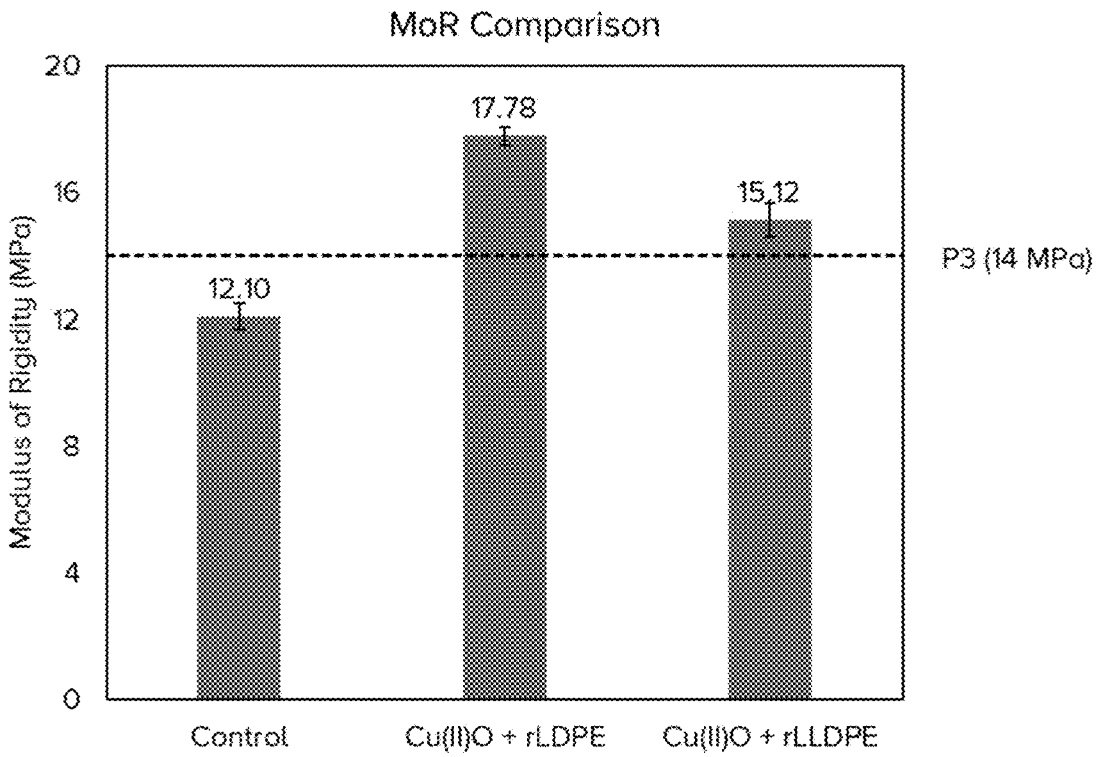
Figure 6 (ii)

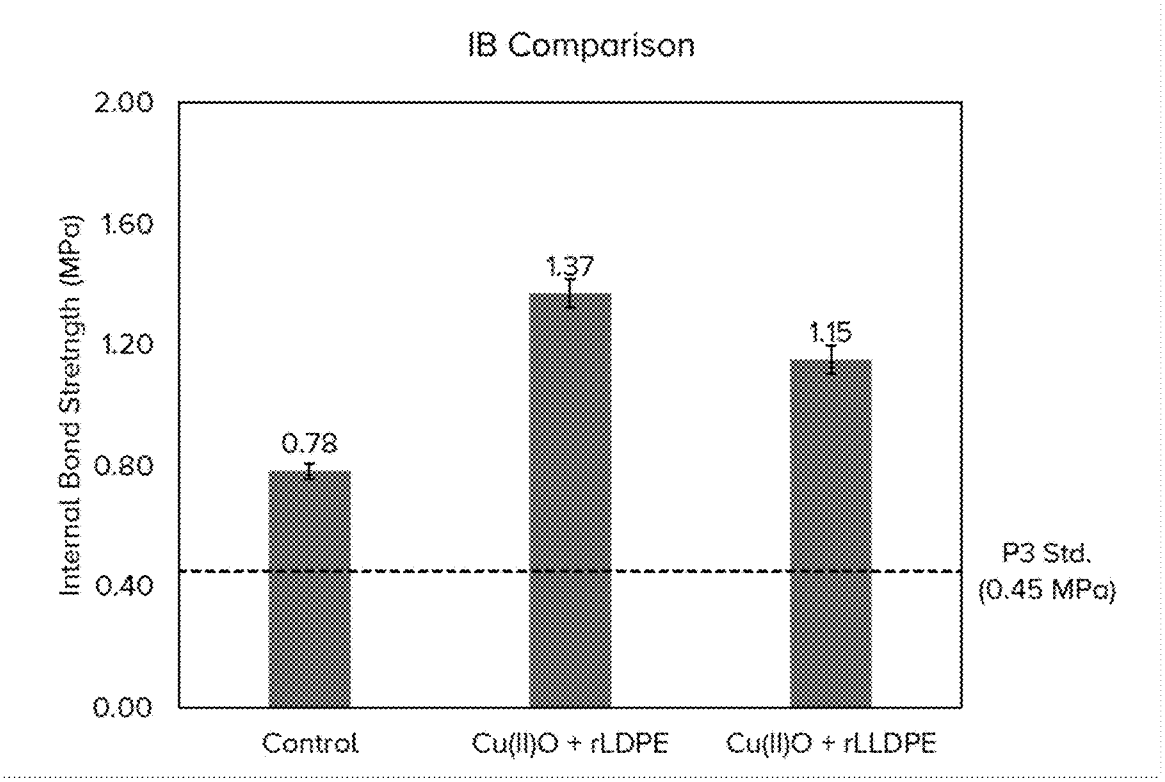
Figure 6 (iii)
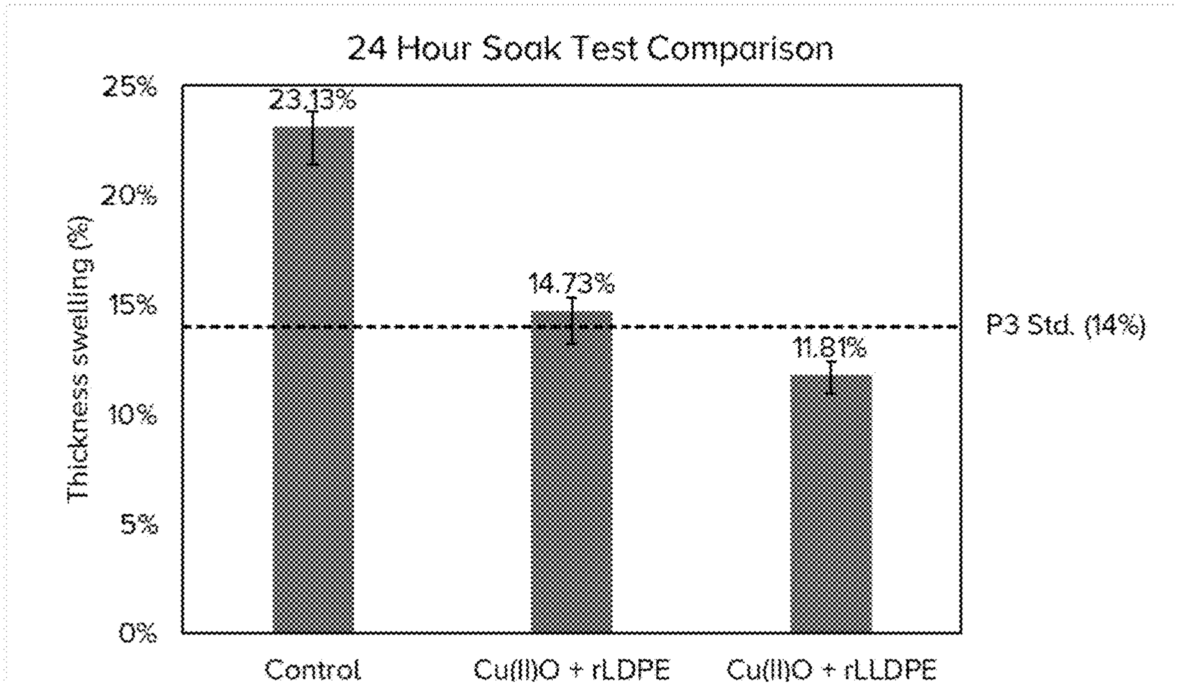
Figure 6 (iv)

BINDER COMPOSITIONS AND USE THEREOF

FIELD

The present invention relates to a method for making a thermoplastic dispersion and/or binder and use therefore in the manufacture of a plastic composite product.

BACKGROUND

Plastic is a widely used material in both household and industrial items. Many countries are struggling to dispose of or use waste plastic in an economical and safe manner. The recycling of plastic into other goods is known, but requires energy and resources to wash the plastic, reduce it to a desired particle size from its original form and then re-use it in a recycled product.

Binders (also known as adhesives) are used for a variety of applications for industrial and consumer applications. One such binder is urea-formaldehyde (UF) so named for its common synthesis pathway and overall structure. UF products are thermosetting resins or polymers which are used as binders/adhesives. However, UF binders have disadvantages such as volatile organic compound emissions which can cause deleterious health effects, energy-intensive production processes, and associated regulatory hurdles. Thus, there is a need for alternative binding agents. In addition, UF adhesives undergo a condensation reaction to bond materials which is reversible, especially under specific environmental conditions. In humid or wet areas, the UF bond can hydrolyse, meaning the bond can break down and revert to its original components. This hydrolysis leads to a reduction in bond strength and durability, making UF adhesives less suitable for use in environments where they are exposed to moisture, and leading to potential failures in the structural integrity of the bonded product.

Plastic waste poses a range of environmental, economic, and social challenges. These include environmental impacts arising from non-biodegradability such as marine pollution harming marine life, chemical leaching of harmful products and by-products into the food chain, microplastic pollution and air pollution where plastics are burned for energy. Thus, there is a need to reduce, reuse and recycle plastic waste to extend its useful life, and reduce its deleterious effects on the environment.

It is an object of the present invention to provide a method for manufacturing a thermoplastic dispersion and/or binder and optionally its use thereof, or to at least provide the public with a useful choice.

SUMMARY

In a first aspect we describe a method for producing a thermoplastic dispersion comprising the introduction of a polymer to an extruder, wherein the polymer is subjected to a treatment step.

In a further aspect we describe a particulate thermoplastic having an average particle size less than 0.5 mm, and a metal catalyst.

In a further aspect we describe a method of producing a thermoplastic dispersion comprising heating a thermoplastic to produce a melted thermoplastic, subsequently dispersing the thermoplastic in water under agitation to produce a thermoplastic dispersion comprising thermoplastic particles, and wherein the thermoplastic is subjected to a treatment step.

In a further aspect we describe a thermoplastic dispersion that comprises a particulate thermoplastic having an average particle size less than 0.5 mm, the particulate thermoplastic having i) a melt flow index of greater than 8 g/10 min at 190° C., ii) a complex viscosity of less than 5,000 Pa·s at 160° C., iii) an average molecular weight that is decreased by greater than 30% relative to the sourced, untreated, or virgin thermoplastic, or iv) any one or more of (i) to (iii).

In a further aspect we describe a method of producing a thermoplastic dispersion comprising heating a thermoplastic to produce a melted thermoplastic, subsequently dispersing the thermoplastic in water under agitation to produce a thermoplastic dispersion comprising thermoplastic particles, and wherein the thermoplastic is subjected to a treatment step, the treatment step selected from i) heating the thermoplastic at an activation temperature, ii) adding a metal catalyst, or iii) both (i) and (ii).

In a further aspect we describe a method of producing a thermoplastic dispersion comprising heating a thermoplastic to produce a melted thermoplastic, dispersing the melted thermoplastic in water under agitation, to produce a thermoplastic dispersion comprising thermoplastic particles, and wherein the thermoplastic is subjected to a treatment step, the treatment step selected from i) heating the thermoplastic at an activation temperature, ii) adding a metal catalyst, the metal catalyst selected from a metal oxide, metal acetate, the metal having a single s orbital electron in the outer shell, or iii) both (i) and (ii).

In a further aspect we describe a method of producing a thermoplastic dispersion comprising heating a thermoplastic to produce a melted thermoplastic, dispersing the melted thermoplastic in water under agitation, to produce a thermoplastic dispersion comprising thermoplastic particles, wherein the thermoplastic is subjected to a treatment step, the treatment step selected from i) heating the thermoplastic at an activation temperature, ii) adding a metal catalyst in the form of a metal acetate, a group XI metal oxide, or a metal sulphate, or iii) both (i) and (ii).

In a further aspect we describe a method of producing a thermoplastic dispersion comprising heating a thermoplastic to produce a melted thermoplastic, dispersing the melted thermoplastic in water under agitation, to produce a thermoplastic dispersion comprising thermoplastic particles, wherein the melted thermoplastic, whether melted or dispersed, is subjected to a treatment step, the treatment step selected from i) heating the thermoplastic at an activation temperature, ii) adding a metal catalyst, or iii) both (i) and (ii), and wherein the metal catalyst a) increases the melt flow index of the thermoplastic, b) decreases the viscosity of the thermoplastic, c) decreases the molecular weight of the thermoplastic, or d) any one or more of (a) to (c).

According to another aspect, there is described a method of preparing a moisture resistant composite product comprising obtaining a thermoplastic dispersion produced by
- heating a thermoplastic to produce a melted thermoplastic,
- subsequently dispersing the thermoplastic in water under agitation to produce a thermoplastic dispersion comprising thermoplastic particles, and
- wherein the thermoplastic is subjected to a treatment step;

combining the thermoplastic dispersion with a cross-linker and a fibre to produce a composite mixture, and applying heat and pressure to the composite mixture to form a moisture resistant composite product that exhibits a 24 hour swell of less than about 15% when measured by a 24 hour swell test.

According to another aspect, there is described a method of preparing a moisture resistant composite product comprising obtaining a thermoplastic dispersion produced by
- heating a thermoplastic to produce a melted thermoplastic,
- subsequently dispersing the thermoplastic in water under agitation to produce a thermoplastic dispersion comprising thermoplastic particles, and
- wherein the thermoplastic is subjected to a treatment step;

combining the thermoplastic dispersion with a cross-linker and a fibre to produce a composite mixture, and applying heat and pressure to the composite mixture, and wherein the moisture resistant composite product does not comprise a moisture resistance compound, other than the thermoplastic dispersion.

According to another aspect, there is described a method of preparing a moisture resistant composite product comprising obtaining a thermoplastic dispersion produced by
- heating a thermoplastic to produce a melted thermoplastic,
- subsequently dispersing the thermoplastic in water under agitation to produce a thermoplastic dispersion comprising thermoplastic particles, and
- wherein the thermoplastic is subjected to a treatment step selected from
  - i) heating the thermoplastic at an activation temperature,
  - ii) adding a metal catalyst, or
  - iii) both (i) and (ii);

combining the thermoplastic dispersion with about 1% to about 5% by weight of the board of a cross-linker, and a fibre to produce a composite mixture, and applying heat and pressure to the composite mixture to form a moisture resistant composite product that exhibits a 24 hour swell of less than about 15% when measured by a 24 hour swell test.

According to another aspect, there is described a method of preparing a moisture resistant composite product comprising obtaining a thermoplastic dispersion that comprises a particulate thermoplastic having an average particle size less than 0.5 mm and a cross-linker, mixing the thermoplastic dispersion with a fibre to form a composite mixture, and applying heat and pressure to the composite mixture to form a thermoplastic composite product that exhibits a 24 hour swell of less than about 15% when measured by a 24 hour swell test.

According to another aspect, there is described a method of producing a thermoplastic composite product comprising obtaining a thermoplastic dispersion that comprises a particulate thermoplastic having an average particle size less than 0.5 mm, a cross-linker, and a metal catalyst, mixing the thermoplastic dispersion with a fibre to form a composite mixture, and applying heat and pressure to the composite mixture in a press or mould to form a thermoplastic composite product.

According to another aspect, there is described a method of producing a thermoplastic composite product comprising obtaining a thermoplastic dispersion that comprises a particulate thermoplastic having an average particle size less than 0.5 mm, and a metal catalyst, mixing the thermoplastic dispersion with a cross-linker and a fibre, to form a composite mixture, and applying heat and pressure to the composite mixture in a press or mould to form a thermoplastic composite product.

According to another aspect, there is described a method of producing a thermoplastic composite product comprising obtaining a binder that comprises a particulate thermoplastic having an average particle size less than 0.5 mm, a cross-linker, and a metal catalyst, wherein the binder has been formed by
- introducing a thermoplastic into an inlet end of one or more extruders, and within the one or more extruders, melting the thermoplastic and treating with a metal catalyst, then combining the treated thermoplastic with a cross-linker,
- mixing the thermoplastic dispersion with a fibre, to form a composite mixture, and applying heat and pressure to the composite mixture in a press or mould to form a thermoplastic composite product.

According to another aspect, there is described a method of producing a thermoplastic composite product comprising obtaining a treated thermoplastic that comprises a particulate thermoplastic having an average particle size less than 0.5 mm, and a metal catalyst, wherein the treated thermoplastic has been formed by
- introducing a thermoplastic into an inlet end of one or more extruders, and within the one or more extruders, heating a thermoplastic to produce a melted thermoplastic and treating with a metal catalyst to provide a treated thermoplastic,
- mixing the treated thermoplastic with a cross-linker and a fibre, to form a composite mixture, and applying heat and pressure to the composite mixture in a press or mould to form a thermoplastic composite product.

According to another aspect, there is described a composite board comprising: waste thermoplastic;

lignocellulosic material; and a metal catalyst, wherein the lignocellulosic material comprises at least 75% of the composite board.

The following can apply to any one or more of the aspects described above.

In one example the treatment step is selected from i) heating the thermoplastic at an activation temperature, ii) adding a metal catalyst, or iii) both (i) and (ii).

The heat and pressure applied to the composite mixture may be provided in a press or mould.

The thermoplastic used to form a binder may be in the form of a powder or a dispersion. In one example the thermoplastic used to form a binder is an aqueous thermoplastic dispersion.

In one example the activation temperature referred to in aspects of the invention is at least 150° C. above the melting temperature of the thermoplastic. In another example, the activation temperature is at least 175° C. above the melting temperature. In a further example the temperature is at least 200° C. above the melting temperature. In example configurations, these activation temperatures are applied to a thermoplastic comprising polyethylene and/or polypropylene. For example, LDPE, LLDPE or HDPE.

In another example, the activation temperature comprises greater than about 300° C., greater than 310° C., greater than 320° C. or greater than 330° C. In one particular example, the thermoplastic is selected from the group consisting of LLDPE, LDPE, HDPE or PP and the activation temperature is greater than 300° C. The thermoplastic described may be a waste thermoplastic.

In one example the metal catalyst a) increases the melt flow index of the thermoplastic, b) decreases the viscosity of the thermoplastic, c) decreases the average molecular weight of the thermoplastic by greater than 35%, or d) any one or more of (a) to (c).

In one example the metal catalyst is selected from the group consisting of group XI transition metal catalysts, group XI transition metal oxides catalysts, copper catalysts, copper oxide catalysts, copper (I) oxide, copper (II) oxide, copper (II) sulphate, silver catalysts, silver (I) oxide, silver (II) oxide, gold and a metal catalyst with a single s orbital electron in the outer shell, a metal acetate catalyst or zinc acetate.

In one example the metal catalyst is a copper (I) oxide or copper (II) oxide.

In one example the metal catalyst is added at 0.01-100% by weight of the thermoplastic. For example, the metal catalyst may be combined at a ratio of at least about 0.01, 0.1, 0.5, 1, 2, 3, 4, 5, 6, 7, 8, 9, 10 or 20% by weight of the thermoplastic.

In one example the metal catalyst is combined with the thermoplastic prior to heating.

In one example the metal catalyst is combined with the thermoplastic during or after heating.

In one example heating at an activation temperature is carried out on the melted thermoplastic.

In one example heating at an activation temperature is carried out on the thermoplastic dispersion.

In one example the treatment step results in an average decrease in the molecular weight of the thermoplastic of greater than 30%. In one configuration, the molecular weight of the thermoplastic comprises less than about 100,000 g/mol, less than 90,000 g/mol or less than 80,000 g/mol.

In one example the thermoplastic and metal catalyst is added to an extruder.

In one example melting, dispersion, and/or the treatment step take place within an extruder.

In one example the melting comprises substantially melting the thermoplastic in an extruder to define an extruder melt zone.

In one example the dispersal stage further comprises dispersing the thermoplastic in water under agitation in an extruder emulsification zone.

In one example the emulsification zone comprises a dilution zone for the addition of further water. In one example, the ratio of thermoplastic to water of about 0.8:1 to 1.8:1

In one example the temperature of the melt zone is between about 140° C. to about 240° C. and the temperature of subsequent zone(s) is lower than the temperature of the melt zone.

In one example a cross linker is added to at least one of the treated thermoplastic and the thermoplastic dispersion to produce an activated thermoplastic binder.

In one example the cross linker is added in an amount of about 5% to about 50% by weight of the dispersion. In one example the cross linker is added in an amount of about 10% to about 30% by weight of the dispersion In one example the cross linker is selected from an organic peroxide or an isocyanate.

In one example the isocyanate is added at 5% to 50% by weight of the binder. In one example the isocyanate is added at 5% to 20% by weight of the binder.

In one example the isocyanate is added at 0.5 to 5% by weight of the board. In one example the isocyanate is added up to 3% by weight of the board. In one example the isocyanate is added at 1% to 3% by weight of the board.

In one example the isocyanate is selected from the group consisting of eMDI, pMDI and a diisocyanate.

In one example a thermoplastic composite product may be made by mixing the binder of any one of the aspects or examples detailed above with a fibre to form a composite mixture and applying heat and pressure to the composite mixture in a press or mould to form a thermoplastic composite product.

In one example the board comprises fibre in an amount of about 70 to 95% by weight of the board. In one example the board comprises fibre in an amount of about 70 to 92% by weight of the board.

In one example the fibre is selected from glass fibre, carbon fibre, aramid fibre and a combination thereof.

In one example the fibre comprises a lignocellulosic material. In one example the lignocellulosic material is selected from the group consisting of sawdust, wood fibre, wood particles, wood chips, wood sheets, coconut husk, rice straw or husk, barley straw, bamboo, palm leaves or a combination thereof.

In one example the composite mixture has a moisture content of around 5% to around 15%.

In one example the source of thermoplastic comprises a high-melt thermoplastic such as polypropylene, and a low melt thermoplastic such as polyethylene, or a combination thereof.

In one example the ratio of high-melt thermoplastic to low-melt thermoplastic is from 1:4 to 4:1.

In one example the source of thermoplastic comprises waste thermoplastic.

In one example the melted thermoplastic is reacted with a coupling agent to produce a functionalised thermoplastic, to define a functionalisation phase. The melted thermoplastic may be treated as described above with at least one of heat treatment or a catalyst.

In one example the functionalisation phase is performed in a functionalisation zone of an extruder.

In one example the coupling agent is selected from a grafting compatibiliser or a reactive hydrogen provider.

In one example the coupling agent is selected from glycidyl methacrylate, maleic anhydride, acrylic acid, glycidyl methacrylate, N-vinylformamide, bismaleimide or a silane.

In one example at least a portion of the thermoplastic is reacted with an initiator in the extruder.

In one example the moisture content of the thermoplastic dispersion or the binder is about 25% to about 75%.

In one example the plastic particles in the thermoplastic dispersion or the binder have a particle size of less than 0.5 mm in length in any orientation or axis.

In one example the thermoplastic is subjected to a pre-processing step comprising a) increasing the melt flow index of the thermoplastic, for example by heating to an activation temperature or treatment with a catalyst,
b) washing the thermoplastic,
c) comminuting the thermoplastic to reduce the variance of a particle size of the thermoplastic,
d) standardisation of the particle size and/or density,
e) palletisation to a particle size of 2 mm to 8 mm, or
f) any combination of one or more of (a) to (e).

In one example the thermoplastic is subjected to a characterising step that analyses one or more physical property of the thermoplastic.

In one example the described method may be used in the manufacture of a lignocellulosic thermoplastic composite product,
a synthetic fibre composite product, or
a concrete composite product.

In one example the described method may be used in the manufacture of a lignocellulosic thermoplastic composite board having a) a modulus of elasticity of between about 1,000 to about 4,000 MPa
b) a modulus of rupture of about 10 to about 25 MPa
c) a screw holding of about 200 to about 500 N
d) a density of about 550 to about 1,100 kg/m3, or
e) any combination of one or more of (a) to (d).

In one example the moisture resistant composite product comprises a 24 hour swell of less than about 15%, 14%, 13%, 12%, 11%, 10%.

In one example there is provided a moisture resistant composite product that does not include a moisture resistance compound, other than the thermoplastic dispersion or binder.

In one example the moisture resistance compound is a wax.

In one example the composite mixture prior to heat and pressure has a moisture content of less than 15%. In one example the composite mixture prior to hat and pressure has a moisture content of less than 12%.

In one example, the thermoplastic is sourced from waste plastic.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

BRIEF DESCRIPTION OF THE DRAWINGS

The invention will now be described by way of example only and with reference to the following figures.

FIGS. 2A(ii) and 2A(iii) show the performance of boards (MOE and MOR respectively) prepared using heat-treated thermoplastic dispersion from building wrap as an adhesive compared to the control.

FIGS. 2B(i) to (iv) show the performance of boards produced using a combination of pMDI cross-linker at different loadings and heat-treated thermoplastic dispersions compared to control boards.

FIGS. 4A(i) and 4A(ii) show the variation of melt flow behavior and complex viscosity with increasing amounts of CuO catalyst in virgin LDPE. FIGS. 4B(i) and 4B(ii) show similar data for recycled LDPE samples. FIGS. 4C(i) and 4C(ii) show the influence of CuO dosing on two forms of recycled linear-low density polyethylene.

FIGS. 6(*i*) to (*iv*) show the average MoE, MOR, IB, and thickness swell after a 24-hour soak test for wood fibre boards made with CuO catalyzed thermoplastic dispersions.

DETAILED DESCRIPTION OF THE INVENTION

Definitions

Figure 1A:
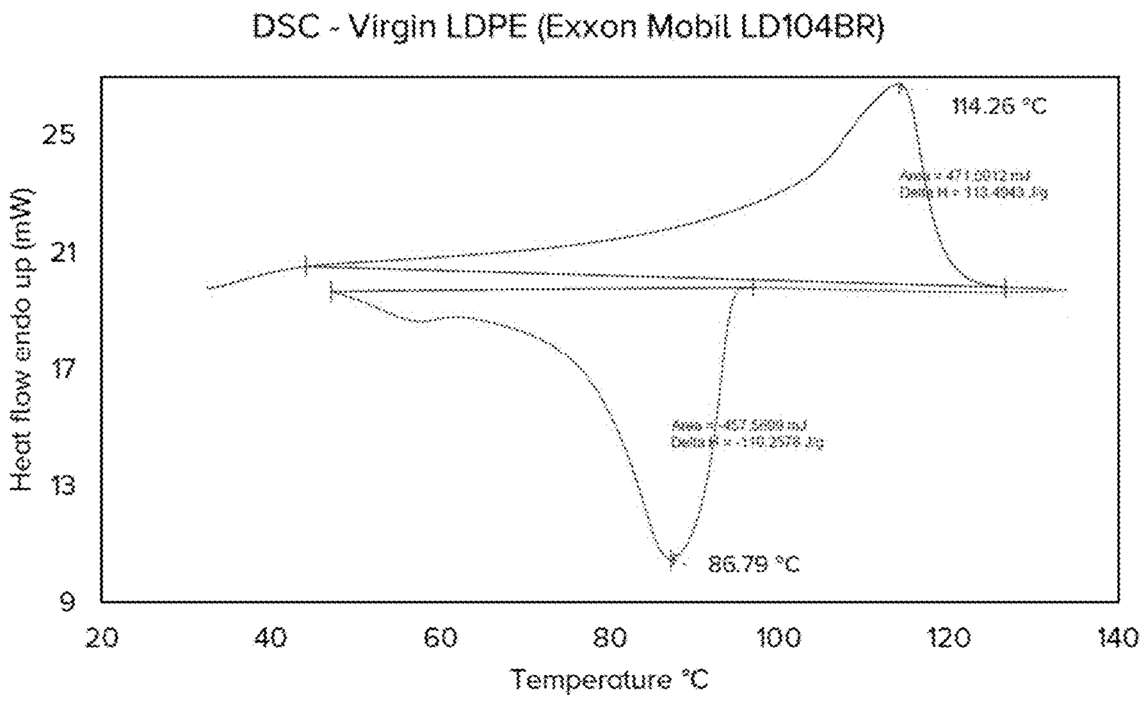
FIG. 1*a* shows the DSC spectrum of virgin LDPE.

As used herein the term "cellulose", "cellulosic" or its grammatical equivalents refers to processed plant material such as paper or cardboard, and excludes lignocellulosic material.

As used herein the term "lignocellulose", "lignocellulosic" or its grammatical equivalents refers to plant material in which the wood fibres are still substantially intact, such as wood chips, sawdust, wood particles, wood sheets, coconut husk, rice straw or husk, barley straw, bamboo, wood fibres and the like, and excludes cellulose as defined. As referred to herein, lignocellulosic material, lignocellulosic-based material, lignocellulosic substrate and lignocellulosic fibre are to be read interchangeably.

The term "comprising" as used in this specification means "consisting at least in part of". When interpreting statements in this specification which include that term, the features, prefaced by that term in each statement, all need to be present but other features can also be present. Related terms such as "comprise" and "comprised" are to be interpreted in the same manner.

As referred to herein, "waste plastic" means plastic that has been used in a product or process previously for a single or multiple uses following the initial synthesis of that plastic polymer. Waste plastic has different properties compared to virgin plastic due to the wear and tear from previous use and the recycling processes undergone. Waste plastic may have been pre-processed, for example through manual, automated or mechanized sorting, washing, or comminuting. Waste plastic may originate from household or industrial waste collection services, municipal recycling facilities or other reclaimers. In certain embodiments, the waste plastic may comprise at least one of post-industrial (or pre-consumer) plastic and/or post-consumer plastic and may include recycled plastic.

As referred to herein, "virgin plastic" means plastic that has plastic resin that has not been used in a product or process before. It is newly manufactured plastic material produced directly from the petrochemical feedstock, such as natural gas or crude oil, without any recycled plastic content. Virgin plastic provides consistent quality and properties since it hasn't been subjected to prior use and processing. As a result, it is often chosen for applications where specific structural, aesthetic, or hygienic properties are critical, such as in medical devices, high-quality consumer products, or food packaging.

As referred to herein, a "dispersion" means a system in which particles of one substance (the dispersed phase) are dispersed, or distributed throughout another substance (the dispersion medium). The particles can range in size. Dispersions may comprise solid particles dispersed in a liquid, liquids of one density dispersed in another, immiscible liquid, or particles of one solid dispersed in the particles of another solid. In one example, the dispersion comprises droplets and/or particles of polymer material dispersed in water.

As referred to herein, "emulsion" means a material comprising a combination of at least two immiscible fractions which are or have been mixed in a liquid or semi-liquid state. Emulsions according to the present disclosure are examples of dispersions and may not necessarily comprise two liquids. They will typically comprise a polymer in water where the polymer may be a size-reduced solidified polymer that has undergone heating and mixing to form the emulsion.

As referred to herein, an "extruder" means a machine used to mix and push or draw out a material while heating the material. The extruder may be a single or twin-screw extruder, an intermeshing co-rotating twin-screw extruder, a co-kneader, a Banbury mixer, a high-pressure homogenizer or any other machine comprising an internal screw or rotors to knead or mix material while applying high pressure and temperature. Extruders typically consist of a heated barrel equipped with a rotating screw or kneading elements. The raw material, often in the form of pellets or granules, is fed into the barrel, where it gets melted and mixed due to the combined action of the screw's mechanical work and the heat from the barrel. The molten plastic is then forced through a die at the end of the barrel, giving it a desired shape.

As referred to herein, "particularise" means the processing of a material to reduce the size of its particles. Particularisation may be achieved using various methods including extrusion for example in a single or twin-screw extruder, shredding, mechanical milling, crushing, grinding, ultrasonic disintegration, micronisation, cryogenic grinding, shearing, high-pressure homogenization, microfluidisation and pulverisation.

We describe a thermoplastic dispersion and/or treated thermoplastic and/or thermoplastic binder and use thereof to form a thermoplastic composite product. Briefly stated, the methods include melting a thermoplastic source and subsequently dispersing the thermoplastic in water under agitation to produce a thermoplastic dispersion comprising thermoplastic particles. During the method the thermoplastic is subjected to a treatment step being selected from (a) heating the thermoplastic at an activation temperature, (b) adding a metal catalyst, or both (a) and (b).

A cross-linker may subsequently be added to the treated and/or functionalised thermoplastic or thermoplastic dispersion to produce the binder. The cross-linker may be added to the extruder, or to the extruded functionalised thermoplastic or thermoplastic dispersion. When used, the binder may be mixed with a fibre to form a composite mixture. The composite mixture may then be formed into a composite product, for example by being introduced into a press or mould and subjected to heat and pressure to form a thermoplastic composite product.

The inventors have found that waste thermoplastic, when treated and/or functionalised and formed into a thermoplastic dispersion according to the methods described herein, exhibits certain beneficial properties that enable the sustainable and efficient re-use as an adhesive. These findings have the potential to transform the chemical recycling industry, enable diversion of waste plastic from landfill for re-use, and at the same time reduce the fossil fuel usage and emissions associated with extraction and manufacture of virgin plastics.

The thermoplastic (or thermosoft plastic) is a plastic polymer. Most thermoplastics have a high molecular weight. The polymer chains of the thermoplastic associate by intermolecular forces, which weaken with increased temperature, yielding a viscous liquid. In this state, thermoplastics may be reshaped. The thermoplastic may comprise virgin or waste plastic or a mixture of virgin plastic and waste plastic.

The system, method and apparatus may be used for the processing of a variety of input plastics. In some embodiments the majority of the input thermoplastic is selected from polypropylene or polyethylene, or a combination thereof. The input thermoplastic may comprise at least 60, 65, 70, 75, 80, 85, 90% of a polypropylene or polyethylene, or a combination thereof, and suitable ranges may be selected from between any of these values, (for example, about 60 to about 90, about 60 to about 85, about 60 to about 80, about 65 to about 90, about 65 to about 80 or about 70 to about 90% by weight of the plastic). Polyethylene may comprise 55, 60, 65, 70, 75, 80, 85 or 90% by weight of the thermoplastic, and suitable ranges may be selected from between any of these values, (for example, about 55 to about 90, about 55 to about 80, about 55 to about 70, about 60 to about 90, about 60 to about 85, about 60 to about 80, about 65 to about 90, about 65 to about 80 or about 70 to about 90% by weight of the plastic).

Waste plastic provides a useful source of plastic for this process. In many countries waste plastic creates an environmental problem as society struggles to recycle or dispose of such plastic economically and safely. The sourced waste plastics may be for example the type of plastics derived from the waste recycling process. However, it will be appreciated various types of input plastic may be used depending on the desired output slurry.

A problem in processing waste plastic is the variability in polymer type and size, and the presence of additives or contaminants. For example, post-consumer waste comprises a variety of different polymers, and may include organic and inorganic contaminants such as food waste, glass and foil. A step in being able to effectively process waste plastics is the characterization of that waste quickly and efficiently. Processing of waste plastics often requires that the physical and chemical properties of the waste plastic are known so that the processing parameters can be optimally applied and correct stoichiometric ratios can be derived.

Accordingly, the methods provided herein may comprise a waste characterisation step comprising analysis of one or more physical properties. The one or more physical properties may comprise melt-flow index, melting point, viscosity, glass transition temperature, density, tensile strength, crystallinity or any combination thereof. Similarly, the methods provided herein may comprise a waste characterisation step comprising analysis of one or more chemical properties. The one or more chemical properties may comprise chemical formula, molecular weight, monomer content, degree of branching, crosslink density, oxidative stability, or any combination thereof.

The waste plastic may include any one of, or combination of, polyethylene terephthalate (PETE or PET), high-density polyethylene (HDPE), polyvinyl chloride (PVC), low-density polyethylene (LDPE), Linear low-density polyethylene (LLDPE), polypropylene (PP), polystyrene or styrofoam (PS), polycarbonate, polylactide, acrylic, acrylonitrile butadiene, styrene, fibreglass, rubber, paper and nylon. This waste plastic mixture may for example originate from a co-mingled plastic waste stream. Given the wide use of plastic in society, the waste plastic may be sourced from every-day waste products such as plastic bottles (e.g. milk, carbonated drinks, water bottles, cleaning products), plastic containers (e.g. for industrial products such as oil, food items), and packaging (whether rigid or soft), although it will be appreciated that the product list of waste products is immensely broad.

The waste plastic may undergo one or more pre-processing steps. These pre-processing steps may be carried out in a pre-processing facility that includes all equipment, lines, and controls necessary to carry out the pre-processing of waste plastic. Alternatively, the waste plastic does not undergo pre-processing and the waste plastic stream is not subjected to any pre-processing before any of the downstream steps described herein. The pre-processing facility of the waste plastic source may include at least one separation step or zone. The separation step or zone may be configured to separate the waste plastic stream into two or more streams enriched in certain types of plastics. Such separation may be advantageous when waste plastic undergoes a chemical recycling step such as functionalisation.

Some thermoplastics are difficult to recycle or reuse, such as plastic film. Plastic film can be used in the present method, which is important given the lack of other options for recycling plastic film. The ability of the present method to reuse plastic film arises from the ability of extruders to melt, compress and mix efficiently. Further advantages may include the ability to inject additives or reactive components into the molten plastic and have them combine in the final product. The present method uses extrusion technology to produce a binder that can then be used to manufacture new composite products. One source of plastic may be shredded plastic. That is, it is shredded so that it can fit within the inlet of the twin screw extruder. Various methods are known to shred plastic products. For example, the use of cutting and/or extruders, shredders, granulators or grinders. Cutting and extruding machines (e.g. see U.S. Pat. No. 9,744,689) can include one or more knives that rotate in a housing such that any plastic introduced into the housing is cut by the knives into smaller particles. In some machines the plastic may start to melt, or melt, due to the action of the knives (i.e. by the heat produced by friction) and such melted or partially melted plastic may enter an extruder in which the screws carry the plastic away from the cutting blades. The plastic may then be extruded and cut into small pellets at the outlet of the extruder. Shredders (e.g. see U.S. Pat. No. 6,241,170), granulators (e.g. see U.S. Pat. No. 6,749,138) and grinders (e.g. see U.S. Pat. No. 5,547,136 or German patent DE 19614030 A1) may include a single or plurality of cutting wheels or rollers that again rotate in a housing and reduce the size of the plastic through the action of the cutting wheel or rollers against the plastic as the plastic passes between the cutting wheels or roller and the internal surface of the housing. Alternately, the plastic may pass between two or more banks of knives or rollers, that in some cases overlap, such that the plastic is cut or ground due to this passage. Such processes typically use rotary knives or bed knives whose rotation cuts the plastic into smaller particles or pieces.

It will be appreciated that the plastic waste may include some contamination. In some embodiments the waste thermoplastic may include some cellulosic material such as paper and labels. Preferably the thermoplastic comprises less than about 1, 2, 3, 4, 5, 6, 7, 8, 9 or 10% cellulosic material by weight of the thermoplastic, and suitable ranges may be selected from between any of these values.

The processes of functionalisation and/or emulsification described herein may require the use of a pre-processed waste thermoplastic. The processes of functionalisation and/or emulsification may be required before waste plastics such as plastic film, or thin "shards" of thermoplastic such as common types of plastic bottle, can be used in the described method. Pelletising of the waste plastic prior to processing may ensure uniformity of plastic particle size and density which may allow for better control over the flow and melting of the material. The smaller and more homogenous size of the pellets may allow for more efficient melting and mixing during the extrusion process. As used herein, the palletisation pre-processing step may comprise preparation of pellets with a size of about 2, 3, 4, 5, 6, 7, or 8 mm, and suitable ranges may be selected from between any of these values (for example, about 2 to about 8.2 to about 6, about 2 to about 5, about 3 to about 8, about 3 to about 7, about 3 to about 6, about 4 to about 8 or about 4 to about 6 mm). This may lead to a more homogeneous functionalisation and emulsification when these steps are employed. Further, the pellets may be able to be effectively fed with a pre-determined rate which ensures stoichiometric ratios during functionalisation and emulsification are maintained.

The inventors have found that the melt-flow index (MFI) of the thermoplastic to be dispersed has a direct correlation with the particle size in any dispersion obtained following the processing steps described herein. A higher MFI leads to increased board strength as shown in Example 2B. In one example, the MFI of the thermoplastic to be processed comprises greater than 8 g/10 min at 190° C. The inventors have further determined that MFI of thermoplastic may be increased following passage through an extruder. The higher melt flow thermoplastics are believed to provide benefits during board formation as they melt and spread more effectively, enhancing mechanical locking between the thermoplastic and lignocellulosic material.

The present method may provide pre-processing of a thermoplastic that comprises a step of increasing the melt-flow index (MFI) of the thermoplastic. The pre-processing step may be carried out:

prior to functionalisation, after functionalisation and prior to emulsification, or prior to emulsification in the absence of functionalisation.

The functionalisation may comprise both:

a) functionalising the thermoplastic; and b) increasing the melt flow index.

Step (a) above may increase the thermoplastic reactivity when it is combined with a cross-linker. Step (b) above may result in improved processing through an extruder, enhanced emulsification and achievement of a smaller particle size. The step of increasing the melt-flow index (MFI) of the thermoplastic may be carried out by any one or more of the following.

a) The addition of a catalyst.

b) The addition of a melt-flow index-increasing additive to an extruder. The additive may be at least one of a plasticiser and an initiator. The initiator may be an initiator described herein such as DCP. The plasticiser may be tall oil or a polyolefin-specific plasticiser c) Application of an extruder temperature which achieves an increase of MFI.

d) Processing the thermoplastic through an extruder to reduce molecular weight of the thermoplastic molecules. Where the thermoplastic includes the presence of branched polymer such as polypropylene, the branched polymer may be more amenable to processing in this way due to the branched nature of the molecules and processing reduces chain length of the polymer.

e) Combining the thermoplastic, such as the waste thermoplastic, with a second thermoplastic.

Step (c) may comprise combining the thermoplastic with a second thermoplastic that has a higher melt-flow index. That is, the first thermoplastic may comprise a low melt thermoplastic and the second thermoplastic may comprise a high-melt thermoplastic. The second thermoplastic may comprise polypropylene. The second thermoplastic (comprising a high-melt thermoplastic) may form 10, 20, 30, 40 or 50% of the total weight of thermoplastic, and suitable ranges may be selected from between any of these values (for example, about 10 to about 50, about 10 to about 40, about 10 to about 30, about 20 to about 50, about 20 to about 49 or about 30 to about 50% of the total weight of thermoplastic). Example 8 illustrates the effect on melt-flow index of addition of varying quantities of recycled polypropylene. This shows that the addition of recycled polypropylene provides a method of increasing the melt-flow index of a mixed waste thermoplastic composition.

As referred to herein, a high-melt thermoplastic comprises a melting point greater than 130° C., and low-melt thermoplastic comprises a melting point of 130° C. or less.

The melt-flow index may be increased by processing the thermoplastic through an extruder with the addition of an initiator. This may be particularly effective in processing polypropylene because the initiator abstracts a hydrogen from the polymer backbone causing a reduction in molecular weight through chain scission. Accordingly, in one embodiment, the thermoplastic may be processed to increase the melt-flow index by the use of an extruder to process thermoplastic comprising polypropylene. The initiator in this example may be added to the extruder, or to the fed material prior to entry into the extruder.

FIG. 6A shows an example of the method as described herein in which:

a thermoplastic is functionalised in an extruder to form a functionalised thermoplastic, optionally a further treatment step may be used comprising heat treatment or introduction of a catalyst, the functionalised and optionally treated thermoplastic is combined with a cross-linker and a substrate in a mixer to form a binder mix, the binder mix is formulated into a mat for pressing in a press, and heat and pressure are applied to the mat to produce a composite product.

The composite product may undergo post-processing such as cutting or laminating to form a useful product. The thermoplastic may have undergone at least one of pre-processing (e.g. washing or sorting) and/or characterisation step. As shown in FIG. 6B, the thermoplastic may not undergo functionalisation in an extruder. The thermoplastic may already have been functionalised, or may not require functionalisation to provide a useful composite product. FIG. 6B shows an example of the method as described herein in which:

at least a portion of the thermoplastic is substantially melted, optionally treated and combined with water in an extruder to form a thermoplastic dispersion, the optional treatment step may comprise heat treatment or introduction of a catalyst, the dispersion is mixed in a mixer with a cross-linker and a substrate to form a binder mix, the binder mix is formulated into a mat for pressing in a press, and heat and pressure are applied to the mat to produce a composite product.

The composite product may undergo post-processing such as cutting or laminating to form a useful product. The thermoplastic may have undergone at least one of pre-processing (e.g. washing or sorting) and/or characterisation step.

Examples 7-13 show various examples of thermoplastic dispersions being produced for composite board preparation.

As shown in FIG. 6C, the thermoplastic may undergo both functionalisation (to form a functionalised thermoplastic), and dispersion (to form a thermoplastic dispersion). FIG. 6C shows an example of the method as described herein in which:

a thermoplastic is functionalised in an extruder to form a functionalised thermoplastic, optionally a further treatment step may be used comprising heat treatment or introduction of a catalyst, at least a portion of the functionalised thermoplastic is substantially melted and combined with water in an extruder to form a thermoplastic dispersion, the thermoplastic dispersion is combined with a cross-linker and a substrate in a mixer to form a binder mix, the binder mix is formulated into a mat for pressing in a press, and heat and pressure are applied to the mat to produce a composite product.

The composite product may undergo post-processing such as cutting or laminating to form a useful product. The thermoplastic may have undergone at least one of pre-processing (e.g. washing or sorting) and/or a characterisation step.

Examples 7-13 demonstrate the effective production of binders and use of those binders in the preparation of composite boards.

It will be appreciated that the binder mix referred to herein may be used in the preparation of a range of composite materials or adhesives such as those described below. In one embodiment, the substrate comprises a lignocellulosic material/substrate.

In some examples, the sourced or virgin thermoplastic is treated to achieve a treated thermoplastic. This treated thermoplastic exhibits certain properties compared to the untreated, sourced, waste or virgin thermoplastic that synergise with downstream process steps and composition components to provide an enhanced thermoplastic dispersion. For example, a thermoplastic dispersion with smaller particle size provides enhanced dispersion stability and adhesion properties when incorporated with a fibre within a composite material such as a composite board. In some examples, these improved downstream properties of the dispersion and board are achieved when a binder that comprises a particulate thermoplastic having an average particle size less than 0.5 mm, the thermoplastic having i) a melt flow index of greater than 8 g/10 min at 190° C.,
ii) a complex viscosity of less than 5,000 Pa·s at 160° C.,
iii) an average molecular weight that is decreased by greater than 30% relative to the sourced, untreated, or virgin thermoplastic, or
iv) any one or more of (i) to (iii).

In one example a cross linker is added to at least one of the treated thermoplastic and the thermoplastic dispersion to produce an activated thermoplastic binder. The inventors have found that using an isocyanate based cross linker provides a binder with properties that adheres to and integrates with a fibre substrate to provide synergistically enhanced adhesion properties. When the binder is used within a composite board as shown in Example 6, this combination of treated thermoplastic, moisture and cross linker results in a composite product with surprisingly good performance compared to a control.

In one example the isocyanate is added at 5% to 20% by weight of the binder. In one example the isocyanate is added at 5% to 50% by weight of the binder.

In one example the isocyanate is selected from the group consisting of pMDI (polymeric methylene diphenyl diisocyanate), eMDI (emulsified methylene diphenyl diisocyanate) and a diisocyanate.

FIG. 6D shows an example of the method as described herein in which:

- a thermoplastic is treated in an extruder to form a treated thermoplastic,
- the thermoplastic may optionally be functionalised prior to, concurrently with, or after treatment,
- the treatment may comprise heat treatment or introduction of a catalyst to increase MFI,
- the treated thermoplastic is combined with a cross-linker and a substrate in a mixer to form a binder mix,
- the binder mix is formulated into a mat for pressing in a press, and
- heat and pressure are applied to the mat to produce a composite product.

The composite product may undergo post-processing such as cutting or laminating to form a useful product. The thermoplastic may have undergone at least one of pre-processing (e.g. washing or sorting) and/or characterisation step.

As shown in FIG. 6E, the thermoplastic may be subjected to treatment prior to, concurrently with, or after the dispersion of the thermoplastic in water in an extruder. This thermoplastic may already have been functionalised, or may not require functionalisation to provide a useful composite product. FIG. 6E shows an example of the method as described herein in which:

- at least a portion of the thermoplastic is substantially melted, treated and combined with water in an extruder to form a thermoplastic dispersion,
- the thermoplastic is subjected to a treatment before, concurrently with or after being combined with water, wherein the treatment may comprise heat treatment or introduction of a catalyst to increase MFI,
- the dispersion is mixed in a mixer with a cross-linker and a substrate to form a binder mix,
- the binder mix is formulated into a mat for pressing in a press, and
- heat and pressure are applied to the mat to produce a composite product.

The composite product may undergo post-processing such as cutting or laminating to form a useful product. The thermoplastic may have undergone at least one of pre-processing (e.g. washing or sorting) and/or characterisation step.

Examples 7-13 show various examples of thermoplastic dispersions being produced for composite board preparation.

As shown in FIG. 6F, the thermoplastic may undergo both treatment (to form a treated thermoplastic), and dispersion (to form a thermoplastic dispersion). The thermoplastic may optionally undergo functionalisation prior to, concurrently with or after the treatment. FIG. 6F shows an example of the method as described herein in which:

- a thermoplastic is treated in an extruder to form a treated thermoplastic that is optionally functionalised prior to, concurrently with, or after the treatment,
- at least a portion of the treated thermoplastic is substantially melted and combined with water in an extruder to form a thermoplastic dispersion,
- the thermoplastic dispersion is combined with a cross-linker and a substrate in a mixer to form a binder mix,
- the binder mix is formulated into a mat for pressing in a press, and
- heat and pressure are applied to the mat to produce a composite product.

The composite product may undergo post-processing such as cutting or laminating to form a useful product. The thermoplastic may have undergone at least one of pre-processing (e.g. washing or sorting) and/or a characterisation step.

One form of treatment of the thermoplastic is to mix it at a temperature significantly above the melting point of the thermoplastic. This may be carried out in a mixing vessel or an extruder. It will be appreciated that a standard processing temperature for thermoplastic in an extruder will be at, or slightly above the melting temperature of the plastic. This ensures that the thermoplastic melts while minimising energy usage. The inventors have surprisingly found that when a much higher temperature is used, the melt-flow index rises in a non-linear fashion that indicates a fundamental change in the structure of the treated thermoplastic.

Figure 2A:
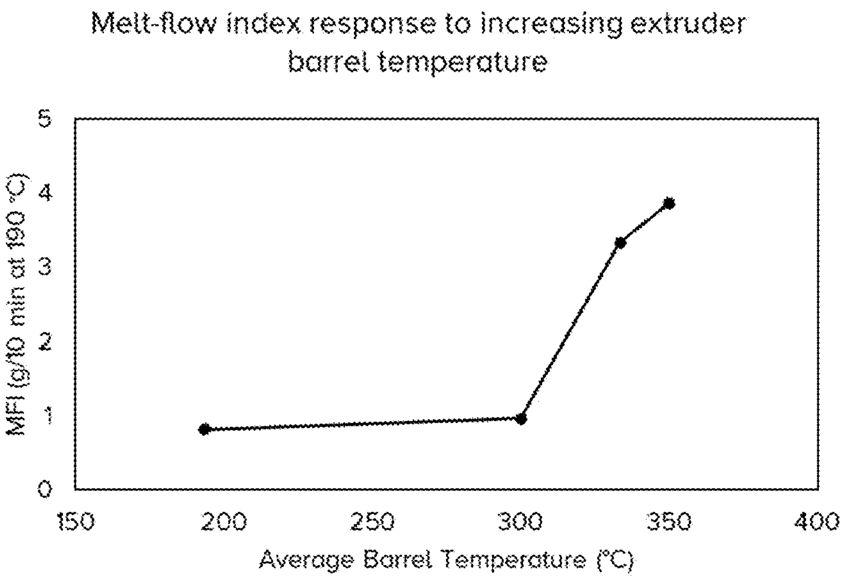
FIG. 2A(i) shows the average MFI for samples BWT1-4 in relation to average barrel temperature.

Example 2a shows how melt-flow index increases as treatment temperature increases. FIG. 2*a* shows the non-linear increase of MFI. FIG. 2*b* shows the surprising increase in board performance observed when the processing temperature increases.

Without wishing to be bound by theory, it is believed that this effect is due to the thermoplastic reaching an activation temperature at which polymer chain scission occurs or begins to dominate over cross-linking reactions. Different thermoplastics have different degrees of branching so the differing amount of side chains may influence the activation temperature for chain scission.

Accordingly, in one example, the invention provides a method of treating a thermoplastic comprising heating the thermoplastic to an activation temperature at or above its chain scission temperature. The activation temperature in this context is the temperature setpoint at which a heating apparatus such as an extruder is set to achieve heating of the thermoplastic. In one example, this activation temperature is at least 150° C. above the melting temperature. In another example in which the chain scission temperature is higher, the activation temperature is at least 175° C. above the melting temperature. In a further example, where a higher degree of branching is present in the polymer, the temperature is at least 200° C. above the melting temperature.

In another example, the activation temperature may be expressed in absolute temperature terms although this will vary for different thermoplastics with varying degrees of branching and melting temperatures. For polyolefins including LDPE, HDPE, LLDPE and PP, the activation temperature may be greater than about 300° C. For certain more highly branched polyolefins the activation temperature may be greater than 310° C. In certain examples, the temperature may be greater than 320° C. or greater than 330° C. In one particular example, the thermoplastic comprises LDPE film and the activation temperature is greater than 300° C. The thermoplastic may be a waste plastic.

In some examples, the methods described herein may be used to treat a variety of different thermoplastics which may comprise waste thermoplastics. The activation temperature for such alternative thermoplastics may vary and can be determined by a person of skill in the art with reference to the experimental procedures outlined in Example 2 where MFI is measured at varying activation temperatures. In some examples, the activation temperatures for different thermoplastics comprise the following:

| Thermoplastic | Activation Temperature |
|---|---|
| Polyethylene (PE) | >300 °C |
| Polypropylene (PP) | >300 °C |
| Polyvinyl Chloride (PVC) | >200 °C |
| Polystyrene (PS) | >300 °C |
| Polyethylene Terephthalate (PET) | >300 °C |
| Polytetrafluoroethylene (PTFE, Teflon) | >500 °C |
| Polycarbonate (PC) | >400 °C |
| Nylon (Polyamide) | >300 °C |
| Polymethyl Methacrylate (PMMA) | >280 °C |
| Polyurethane (PU) | >250 °C |

Accordingly, in one example there is provided a method of treating a thermoplastic to increase the melt-flow index. In one example, the melt flow index comprises greater than 8 g/10 min at 190° C. In further examples, the MFI comprises greater than 10 or 15 g/10 min at 190° C.

Figure 3A:
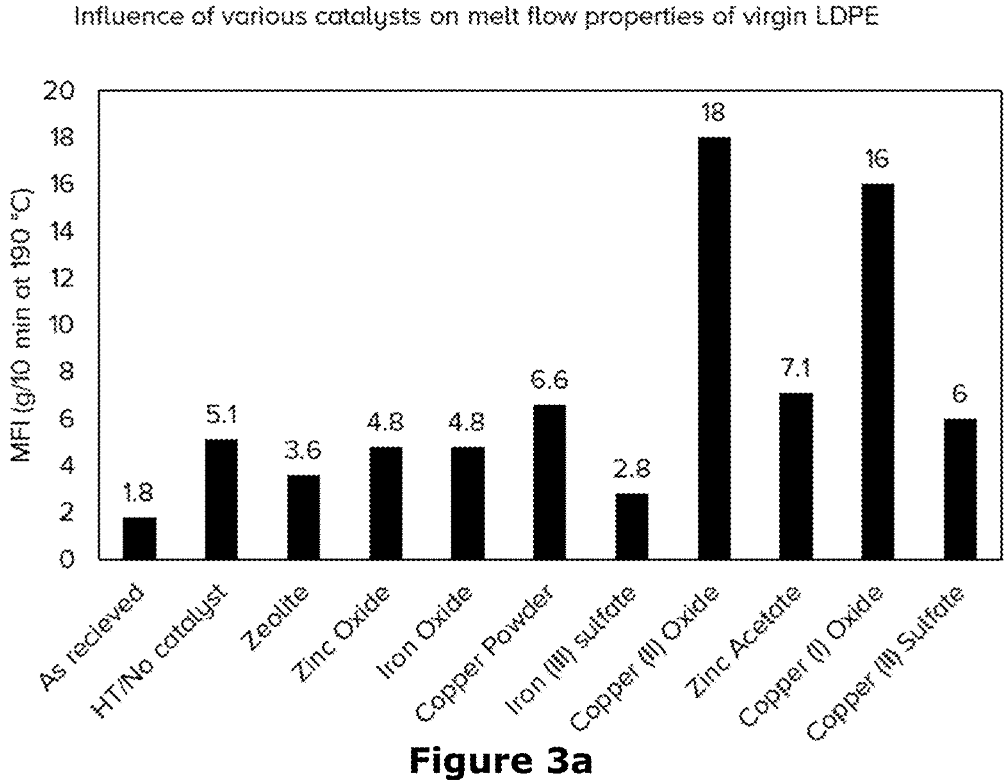
FIGS. 3*a*, 3*b* and 3*c* show a comparison of melt-flow indices, viscosities and molecular weight of catalyst and heat treated samples compared to no catalyst or heat treatment of extruded virgin LDPE samples.

A further treatment of the thermoplastic is to treat it with a catalyst which increases the MFI. Example 3 shows screening trials for potential catalysts. In this example, the catalysts were added to an extruder with waste plastic and the MFI was measured. FIG. 3*a* shows that copper (I) oxide (CuO) and copper (II) oxide ($Cu_2O$) had a surprisingly beneficial effect on the MFI of the treated plastic.

Examples 4a and 4b investigate catalyst dosing for the catalysts of interest. It can be seen that the copper oxide catalysts have significant MFI-increasing effects even when applied at a concentration of between approximately 0.1% to at least 3% w/w of the thermoplastic. Example 4A indicates that the catalysts operate to reduce MFI at less than 0.1% for example greater than 0.01%.

Accordingly, in one example there is provided a method of treating a thermoplastic to increase the melt-flow index wherein the treatment comprises processing the thermoplastic with a catalyst which increases the melt-flow index.

The catalyst may be selected from the group consisting of a metal with a single s orbital electron in the outer shell, group XI transition metal catalysts, group XI transition metal oxides catalysts, copper catalysts, copper oxide catalysts, copper (I) oxide, copper (II) oxide, copper (II) sulphate, silver catalysts, silver (I) oxide, silver (II) oxide, gold catalysts, a metal acetate catalyst or zinc acetate.

Examples 4a and 4b investigate catalyst dosing for the catalysts of interest. It was found that the copper oxide catalysts have significant MFI-increasing effects even when applied at a concentration of 0.1% w/w of the thermoplastic.

The catalyst may be combined with the thermoplastic prior to or during mixing, for example in an extruder. In one example, the catalyst is combined with the thermoplastic in a ratio of 0.01-100% w/w. For example, the catalyst is combined at a ratio of at least about 0.01%, 1%, 3%, 5%, 8%, 10%, or 20%.

Without wishing to be bound by theory, it is believed that as a group XI transition metal, $Cu^{2+}$ in copper (II) oxide readily reduces to $Cu^{+1}$ due to its electron configuration. The electron configuration of $C^{2+}$ places a single electron in the high-energy d-orbital to become the more energetically stable $Cu^{1+}$. As a result, the reduction reaction of $Cu^{2+}$ to $Cu^{1+}$ in the presence of atmospheric oxygen, attacks the C—H bonds in LDPE and generates a hydroxyl radical that in-turn promotes the chain scission in LDPE. It is likely that the reduced $Cu^{1+}$ is again oxidized to $Cu^{2+}$ at elevated temperature and propagates the catalytic cycle. Similar high temperature redox behaviour is expected to be observed for other group XI metals such as Ag and Au.

With regard to the observed efficacy of copper oxide rather than copper sulphate, a further hypothesis is that copper oxides outperform other catalysts due to Lewis theory. Sulphate and oxide anions are classed as hard bases. However, oxide is a harder base than sulphate because it is smaller and less easily polarised. Copper ions are classed as soft acids and therefore they have stronger interactions with softer ions like sulphate. This means that copper sulphate is more stable than copper oxide and so copper oxide will more easily separate into copper and oxide ions.

Figure 5A:
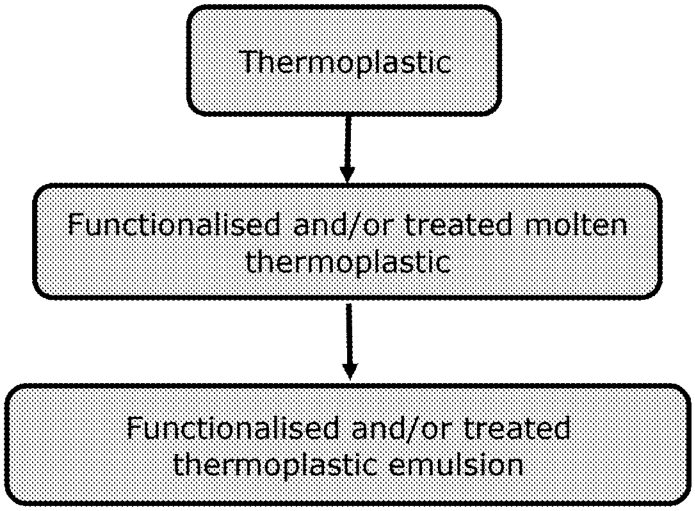
FIGS. 5A and 5B show examples of processes of the invention.
Figure 5B:
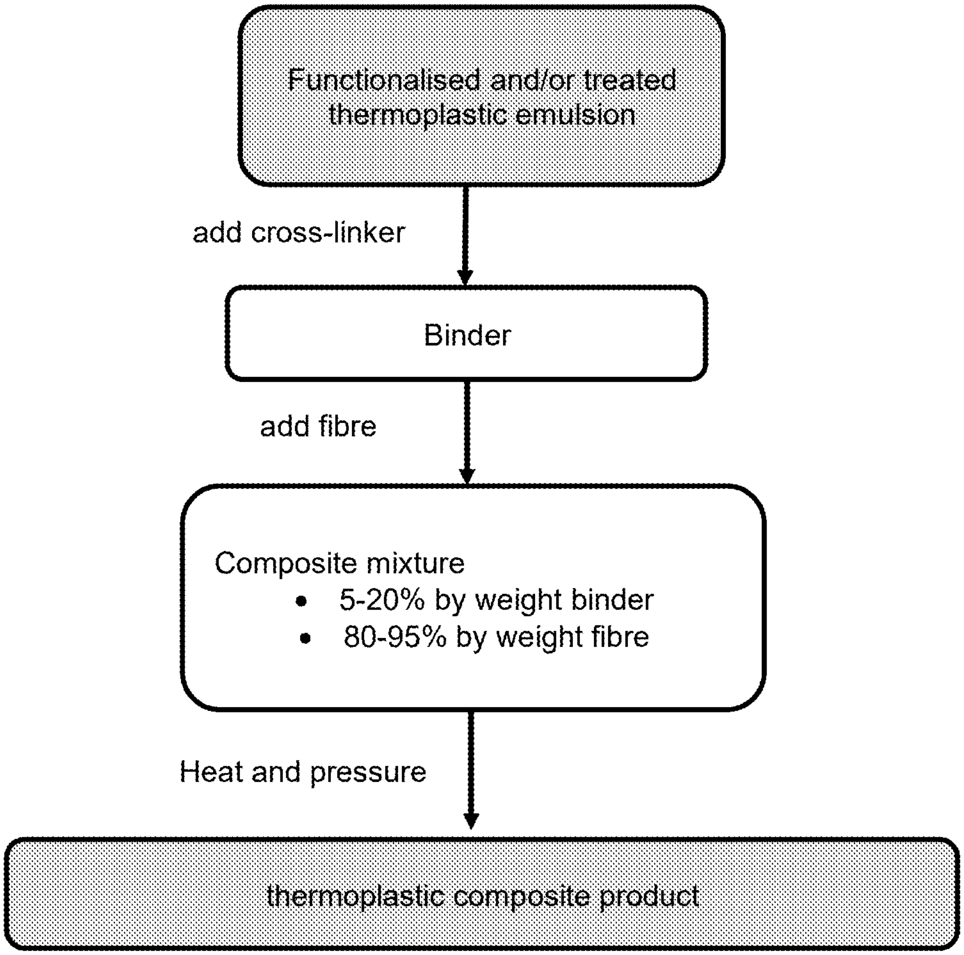

The method as described herein may include functionalising a thermoplastic to improve its reactivity with cross-linkers when preparing a binder. This functionalisation may be carried out with or without a treatment step such as a heat treatment or catalysis treatment as described herein. All previously proposed examples of heat and catalytic treatment may be combined with functionalisation to achieve a thermoplastic binder as described. FIGS. 5A and 5B illustrate examples of the invention. The binder may find use in various applications, such as being combined with a lignocellulosic material/substrate to form a plastic composite product.

The method as described herein may produce a composite material comprising:

introducing thermoplastic into an extruder;

optionally treating the thermoplastic with a heat treatment or catalytic treatment;

reacting the thermoplastic with a coupling agent to form a functionalised thermoplastic;

formulating the functionalised thermoplastic with a cross-linker to form a binder; and mixing the binder with a cellulosic substrate to form a composite mixture.

The process may further comprise heating and pressing the composite mixture to produce a composite product.

Most plastic waste, in particular PP and PE, is hydrophobic. Lignocellulosic material fibres are hydrophilic. Therefore it can be difficult to combine the two. Coupling agents, for example grafting compatibilisers, can be used that have both hydrophobic and hydrophilic functional groups and therefore enable the binding of cross-linkers to thermoplastics.

The thermoplastic introduced to the extruder may substantially melt in a melt zone of the extruder. The coupling agent may be added to the melted thermoplastic in the melt zone, optionally in combination with a heat or catalytic treatment. The functionalisation of thermoplastic waste with a coupling agent can occur at the same time in an extruder or sequentially in multiple extruders or modular extruders. Similarly, treatment with heat or catalysts can occur at the same time in an extruder or sequentially in multiple extruders or modular extruders.

Without wishing to be restricted by theory, there are differences between the chemical structure and/or polarity of thermoplastic polymers and lignocellulosic material fibres. Those differences may result in weak interfacial adhesion. For example, polyolefins are hydrophobic and lignocellulosic material fibres are hydrophilic, meaning that they repel each other. Weak interfacial adhesion can lead to low tensile strength and a weaker thermoplastic composite product, which results in a weaker final product such as a plastic-lignocellulosic material composite board. Coupling agents can add functional groups which provide available hydrogen, or be grafted onto the polymer to change its polarity and create favourable interactions with the lignocellulosic material. These favourable interactions with the lignocellulosic material can result in stronger interfacial adhesion. Where cross linkers are used, the coupling agent can form bonds with the cross linker.

At least one coupling agent may be added to the extruder with the thermoplastic. The one or more coupling agent may be added prior to heating and operation of the extruder. One or more coupling agents may be added after initial heating and operation of the extruder.

The amount of each coupling agent added may be about 1, 2, 3, 4 or 5% by weight of the thermoplastic, and suitable ranges may be selected from between any of these values (for example, about 1 to about 5, about 1 to about 4, about 1 to about 3, about 2 to about 5, about 2 to about 4, about 3 to about 5 or about 3 to about 4% by weight of the thermoplastic).

Where different types of coupling agents are added, the total amount of coupling agent added may be 2, 3, 4, 5, 6, 7, 8, 9 or 10% by weight of the thermoplastic, and suitable ranges may be selected from between any of these values (for example, about 2 to about 10, about 2 to about 8, about 2 to about 7, about 3 to about 10, about 3 to about 9, about 3 to about 7, about 3 to about 6, about 4 to about 10, about 4 to about 9, about 4 to about 8, about 5 to about 10, about 5 to about 9, about 5 to about 8, about 6 to about 10, about 6 to about 8, about 7 to about 10 or about 7 to about 9% by weight of the thermoplastic).

The degree of functionalisation of a polymer backbone refers to the extent to which functional groups are attached to the polymer's main chain. In polymer chemistry, a functional group is a specific group of atoms within a molecule that is responsible for the characteristic chemical reactions of that molecule. The "degree of functionalization" quantifies how many of these groups are attached to the polymer. For instance, in a functionalised polymer, not every repeat unit might have a functional group attached. The degree of functionalisation as referred to herein expresses a percentage of the polymer's repeat units that have been modified with a functional group. The degree of functionalisation is controlled during the reactive extrusion process.

Described is a method of preparing functionalised thermoplastic, or using functionalised thermoplastic according to the methods described herein with a degree of functionalisation in the range from 0.5, 1, 2, 3, 4, 5 or 6%, and suitable ranges may be selected from between any of these values (for example, about 0.5 to about 6, about 0.5 to about 5, about 0.5 to about 4, about 0.5 to about 2, about 1 to about 6, about 1 to about 5, about 1 to about 4, about 2 to about 6, about 2 to about 5, about 3 to about 6%, or about 3 to about 4%). The functionalised thermoplastic may comprises PE or PP or a mixture of PE and PP. Methods to measure the degree of functionalisation will be known to those of skill in the art. For example, the method may comprises the use of FTIR and/or acid-base titration In one example, the coupling agent comprises the monomer GMA (glycidyl methacrylate). The GMA may be added to an extruder via a feed concurrently or consecutively with a thermoplastic. In one example the GMA is added to a melt zone of an extruder via an injector. The amount added depends on the desired degree of functionalisation. The GMA may be added in a range of 2, 3, 4, 5, 6, 7, 8, 9, or 10% by weight of the thermoplastic, and suitable ranges may be selected from between any of these values (for example, about 2 to about 10, about 2 to about 8, about 2 to about 7, about 3 to about 10, about 3 to about 9, about 3 to about 7, about 4 to about 10, about 4 to about 9, about 4 to about 8, about 5 to about 10, about 5 to about 8 or about 6 to about 10% by weight of the thermoplastic). Adding a higher proportion of coupling agent can result in undesirable phase separation where contrasting hydrophilic and hydrophobic reactants prevent effective mixing. In this instance, undesirable homopolymerisation can occur which causes the monomer to self-react or the polymer degrades and monomer mixing/miscibility is compromised.

In one example, the invention comprises the functionalisation of recycled polypropylene using GMA. Analysis indicated that the particle size of processed GMA-functionalised polypropylene is smaller than non-functionalised material. When the material is processed through an extruder to achieve emulsification and production of a thermoplastic dispersion, it is expected that the smaller particle size would lead to decreased particle size in the resultant thermoplastic dispersion and subsequently improved strength in woodfibre board comprising the dispersion with a cross-linker such as isocyanate.

The coupling agent may be added to the extruder as a powder or other form of solid. The coupling agent may be selected from a grafting compatibiliser, a reactive hydrogen provider, or a combination thereof.

A grafting co-monomer may be used to increase affinity of a coupling agent with a thermoplastic. Styrene may be used to bridge the monomer and polymer as it has affinity for both and acts as a co-solvent.

A grafting compatibiliser facilitates the adhesion between immiscible or incompatible components of a blend or composite. Absence of compatibilisation may result in inferior mechanical properties in the final product. For example, a grafting compatibiliser may improve the cohesion between inherently hydrophilic wood chips and inherently hydrophobic PP/PE. A grafting compatibiliser works by grafting of chemical groups onto a polymer backbone, the impact of which is to alter the polymer chain's fundamental character thereby rendering it "compatible" with composite components. Grafting compatibilisers have functional groups that are compatible with each of the components in the composite. As such, they can "anchor" themselves between the two incompatible components and reduce interfacial tension, promoting finer dispersion and better adhesion between the components.

The coupling agent or grafting compatibiliser may be selected from maleic anhydride, acrylic acid, glycidyl methacrylate, N-vinylformamide, bismaleimide or silanes. The use of N-vinylformamide may increase flexural strength and modulus. Silane grafting compatabilsers may be selected from vinyltriethoxysilane or r-aminopropyl triethoxy silane. The grafting compatibiliser may be selected from titanate coupling agents.

Maleic anhydride (MA) may be used as the grafting compatibiliser or coupling agent to form maleated polyethylene or maleated polypropylene. Maleated polyethylene is formed by reacting polyethylene with maleic anhydride. Maleated polypropylene is formed by reacting polypropylene with maleic anhydride. The anhydride functionalities of the MA can interact with the surface hydroxyls of the wood or lignocellulose polymers during the manufacture of a composite board. Also during the manufacture of the composite board, the carbon chain of the maleate copolymer can then cross-link with the non-functionalised polymer matrix because of their similar polarities. Sufficient maleic anhydride may be added to form a maleated thermoplastic. Without wishing to be restricted by theory, the maleic anhydride can form bonds with the hydroxy groups on lignocellulose fibre during the manufacture of a composite board. The hydroxy group may react with one of the carbonyls on the maleic anhydride forming a covalent bond between the lignocellulose oxygen and one of the carbonyl carbons on the maleic anhydride. This may lead to ring opening and formation of a carboxylic acid moiety at the other carbonyl. The resulting carboxylic acid may then form additional bonds with another lignocellulosic material hydroxy or with a cross linker, such as diisocyanate. The polymer chain attached to the maleic acid may then form favourable interactions with the non-malleated plastic matrix, through chain entanglement, resulting in stronger interfacial adhesion. Hydrogen bonding between the lignocellulose hydroxyls and the carboxylic acid hydroxy may also contribute to favourable interactions.

The inventors carried out experiments in which composite wood fibre boards were created using maleic anhydride functionalized polyethylene (MAPE) along with Luperox 231 as a cross-linker. The binder was prepared by blending and emulsifying LDPE to prepare a thermoplastic dispersion. Results showed that boards with MAPE exhibited significantly higher strength (MoE) compared to those without it. The example demonstrates that MAPE improved the adhesion of LDPE to wood fibre in the preparation of composite boards.

The amount of grafting compatibiliser added may be about 1, 2, 3, 4 or 5% by weight of the thermoplastic, and suitable ranges may be selected from between any of these values (for example, about 1 to about 5, about 1 to about 4, about 1 to about 3, about 2 to about 5, about 2 to about 4, about 3 to about 5 or about 3 to about 4% by weight of the thermoplastic).

In one embodiment, glycidyl methacrylate is used as the grafting compatibiliser or coupling agent to form a functionalised thermoplastic.

An initiator may be added with the grafting compatibiliser, the functionalisation agent, or concurrently with the treatment with heat or catalyst. The initiator is added to facilitate thermo-dissociation and generate free radicals to promote grafting or adhesion between the lignocellulosic feedstock and the binder or cross-linker molecules. In one example the initiator comprises a free-radical generating initiator.

The use of initiators has been explored combined with functionalisation of the thermoplastic. The thermoplastic may be functionalised using Glycidyl Methacrylate (GMA) wherein the thermoplastic may be a high-melt thermoplastic such as poly-propylene, and a low melt thermoplastic such as polyethylene, or a combination thereof. The inventors have found that the processing of high-melt thermoplastics such as PP in the presence of an initiator resulted in an increase in melt flow. This provided enhanced size reduction of the waste plastic and better emulsification.

A method as described herein may provide a thermoplastic dispersion comprising an initial step of processing a high-melt thermoplastic such as PP in the presence of an initiator, then combining the high-melt thermoplastic such as PP with a low melt thermoplastic such as PE prior to emulsification in an extruder to prepare a thermoplastic dispersion as described herein. The high-melt thermoplastic such as poly-propylene, or low melt thermoplastic such as polyethylene, or both may optionally be functionalised. The ratio of high-melt thermoplastic (such as poly-propylene) to low melt thermoplastic (such as polyethylene) may be from 1:4 to 4:1, and suitable ranges may be selected from between any of these values (for example, about 4:1, about 3:1, about 2:1, about 1:1, about 1:2, about 1:3, or about 1:4).

In the context of emulsion-based processes, it has been found that it is preferable to minimise viscosity differences between phases, such as polymer and water because this leads to smaller particle sizes in emulsions. Addition of a high-melt thermoplastic such as polypropylene to form a thermoplastic composition is an example of this as exemplified in examples 8 and 9. Higher melt flow thermoplastics also offer benefits during board formation as they melt and spread more effectively, enhancing mechanical locking between the plastic and lignocellulosic materials. Additionally, the hydrophilic nature of GMA fosters better adhesion to lignocellulosic materials, promoting intimate mixing.

The advantages of GMA grafting extend beyond emulsion processes. GMA's hydrophilic properties aid in reducing surface tension between immiscible phases, leading to smaller droplets and finer dispersions. Additionally, GMA and Maleic Anhydride (MAH) serve as potential compatibilizers, potentially improving the homogeneity of blended plastics, which could positively influence melt flow and other aspects.

The initiator may be selected from organic peroxides, such as benzoyl peroxide, dicumyl peroxide, octanoyl peroxide, lauroyl peroxide, stearoyl peroxide, cumene hydroperoxide, tert-butyl peroxide, Cert-butylperoxy laurate, tert-butylperoxy isopropyl carbonate, tert-butylperoxy acetate, and diisopropylbenzene hydroperoxide. The initiator may comprise irradiation of the thermoplastic with UV or electron beam.

The initiator may be selected from dicumyl peroxide and dicumene.

Figure 5C:
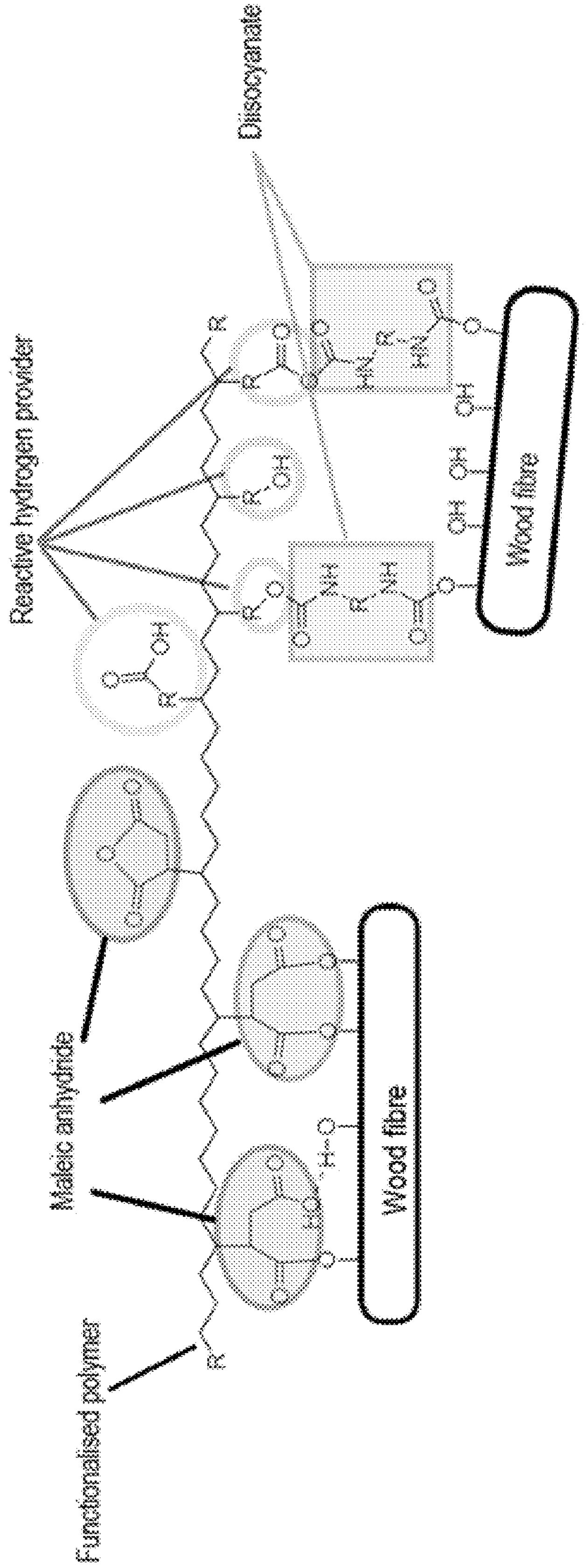
FIGS. 5C and 5D show examples of grafting a reactive hydrogen provider on to the backbone of a polymer to form bonds with the lignocellulosic material fibre or cross linkers.
Figure 5D:
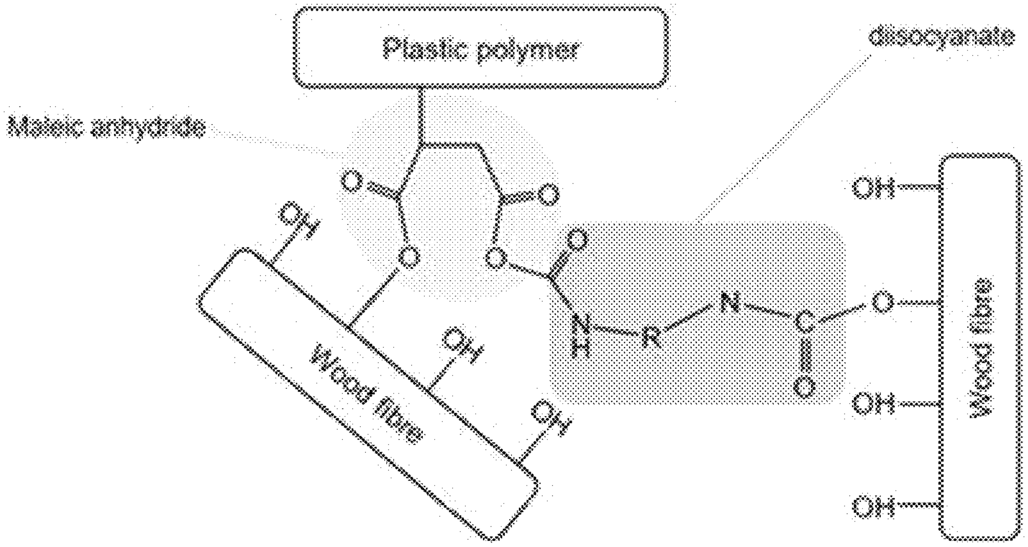

Additionally, functionalisation can be achieved using groups which provide "available hydrogen". The reactive hydrogen provider is a coupling agent and can be selected from acids such as acrylic acid and itaconic acid or alcohols such as polyvinyl alcohol. The reactive hydrogen provider can be grafted on to the backbone of the polymer to form bonds with the lignocellulosic material fibre or covalent bonds with cross linkers if included as shown in FIGS. 5C and 5D.

The amount of reactive hydrogen provider or coupling agent added may be about 1, 2, 3, 4 or 5% by weight of the thermoplastic, and suitable ranges may be selected from between any of these values (for example, about 1 to about 5, about 1 to about 4, about 1 to about 3, about 2 to about 5, about 2 to about 4, about 3 to about 5 or about 3 to about 4% by weight of the thermoplastic).

Suitable reactive hydrogen providers may be selected from compounds containing at least one reactive functional group for isocyanate, and a functional group suitable for grafting onto a polyolefin backbone. A reactive functional group for isocyanate is one containing a reactive, active or Zerewitinoff-reactive hydrogen.

Where compounds with an isocyanate-reactive functional group are not suitable for grafting onto a polyolefin, it will be understood by persons skilled in the art to modify the compound to be suitable for grafting, such as by inclusion of an alkene functionality or short chain alkene side-chain. Examples of coupling agent compounds containing isocyanate-reactive hydrogen atoms include alcohols, glycols, mercaptans, carboxylic acids such as polybasic acids, amines, ureas, silanes and amides.

The reactive hydrogen providers may be selected from compounds that provide an acidic functional group, or an alcohol functional group, or an amine functional group. Without wishing to be restricted by theory, the groups with available hydrogen may hydrogen bond with the hydroxyls on the wood fibres which also creates favourable, albeit weaker, interactions. The groups with available hydrogen also provide the necessary hydrogen and subsequent interactions to form urethane bonds with the diisocyanate.

Preferred reactive hydrogen providers or coupling agents are selected from short to medium chain compounds containing an alkene and at least one of an alcohol, carboxylic acid or amine functionality. This may include vinyl alcohol, acrylic acid or itaconic acid.

Examples of suitable reactive hydrogen providers or coupling agents suitable for grafting which contain a carboxylic acid functionality include methacrylic acid, acrylic acid, maleic acid or a monoester thereof (such as monomethyl maleate), maleic anhydride, ethacrylic acid, fumaric acid or a monoester thereof (such as monomethyl fumarate), crotonic acid, itaconic acid or a monoester thereof (such as monomethyl itaconate), itaconic anhydride, vinyl sulfonic acid, 2-methacryloyloxy-ethanesulfonate, styrenesulfonic acid, 2-acrylamido-2-methylpropane sulfonic acid (AMPS), vinylphosphonic acid, 2-(methacryloyloxy)ethylphosphate, mesaconic acid, citraconic acid or a monoester thereof (such as monomethyl citraconic acid), glutaconic acid or a monoester thereof (such as monomethyl glutaconate), methylmaleic acid or a monoester thereof (such as monomethyl methylmaleate), methylmaleic anhydride, citraconic anhydride, glutaconic anhydride, endobicyclo-[2,2,1]-5-heptene-2,3-dicarboxylic acid or a monoester thereof (such as monomethyl ester of heptene-2,3-dicarboxylic acid), and endobicyclo-[2,2,1]-5-heptene-2,3-dicarboxylic acid anhydride.

Reactive hydrogen providers that may be suitable for grafting may include alkene derivatives of glycols such as ethylene glycol, diethylene glycol, propylene glycol, dipropylene glycol, 1,3-propanediol, 1,3-butanediol, 1,4-butanediol, 1,5-pentanediol and other pentane diols, 2-ethyl-1,3-hexanediol, 2-ethyl-1,6-hexanediol, other 2-ethylhexanediols, 1,6-hexanediol and other hexanediols, 2,2,4-trimethylpentane-1,3-diol, decanediols, dodecanediols, bisphenol A, hydrogenated bisphenol A, 1,4-cyclohexanediol, 1,4-bis(2-hydroxyethoxy)-cyclohexane, 1,3-cyclohexanedimethanol, 1,4-cyclohexanediol, 1,4-bis(2-hydroxyethoxy)benzene, Esterdiol 204 (propanoic acid, 3-hydroxy-2,2-dimethyl-, 3-hydroxy-2,2-dimethylpropyl ester available from TCI America).

Amines which may be suitable for grafting include alkene derivatives of: N-methylethanolamine, N-methyl iso-propylamine, 4-aminocyclo-hexanol, 1,2-diaminotheane, 1,3-diaminopropane, diethylenetriamine, toluene-2,4-diamine, and toluene-1,6-diamine. Aliphatic compounds containing from 2 to 8 carbon atoms are preferred. ethylenediamine, monomethanolamine, and propylenediamine.

Other acids that may be suitable for grafting include alkene derivatives of bis(hydroxymethyl) propionic acid, diaminobenzoic acid, bis(hydroxymethyl)acetic acid, 2,2,2-tri(hydroxymethyl)acetic acid, 2,2-bis(hydroxymethyl)propionic acid, 2,2-bis(hydroxymethyl)butyric acid, 2,2-bis(hydroxymethyl)pentanoic acid, 2,5-dihydroxy-3-methylpentanoic acid, 3,5-dihydroxy-3-methylpentanoic acid, 4,5-dihydroxy-3-methylpentanoic acid, 3,4-dihydroxy-3-methylpentanoic acid, 2,3-dihydroxy-3-methylpentanoic acid, 2,4-dihydroxy-3-methylpentanoic acid, 2,3-dihydroxybenzoic acid, 2,4-dihydroxybenzoic acid, 2,5-dihydroxybenzoic acid, 2,6-dihydroxybenzoic acid, 3,4-dihydroxybenzoic acid, 3,5-dihydroxybenzoic acid, 2,3-dihydroxysuccinic acid, 2,5-diaminopentanoic acid, 3,5-diaminopentanoic acid, 4,5-diaminopentanoic acid, 2,3-dihydroxybenzenesulfonic acid, 3,4-dihydroxybenzenesulfonic acid, 2,4-dihydroxybenzenelsulfonic acid, 2,5-dihydroxybenzene sulfonic acid, 3,5-dihydroxybenzenesulfonic acid, 2,3-diaminobenzenesulfonic acid, 3,4-diaminobenzenesulfonic acid, 2,4-diaminobenzenesulfonic acid, 2,5-diaminobenzenesulfonic acid, 3,5-diaminobenzenesulfonic acid, 3,4-dihydroxy-2-toluenesulfonic acid, 3,4-xiamino-2-toluenesulfonic acid, 4,5-dihydroxy-2-toluenesulfonic acid, 4,5-diamino-2-toluenesulfonic acid, 5,6-dihydroxy-2-toluenesulfonic acid, 5,6-diamino-2-toluenesulfonic acid, 3,5-dihydroxy-2-toluenesulfonic acid, 3,5-diamino-2-toluenesulfonic acid, 3,6-dihydroxy-2-toluenesulfonic acid, 3,6-diamino-2-toluenesulfonic acid, 4,6-dihydroxy-2-Ttoluenesulfonic acid, 4,6-diamino-2-toluenesulfonic acid, 2,4-dihydroxy-3-toluenesulfonic acid, 2,4-diamino-3-toluenesulfonic acid, 2,5-dihydroxy-3-toluenesulfonic acid, 2,5-diamino-3-toluenesulfonic acid, 2,6-dihydroxy-3-toluenesulfonic acid, 2,6-diamino-3-toluenesulfonic acid, 4,5-dihydroxy-3-toluenesulfonic acid, 4,5-diamino-3-toluenesulfonic acid, 4,6-dihydroxy-3-toluenesulfonic acid, 4,6-dDiamino-3-toluenesulfonic acid, 5,6-dihydroxy-3-toluenesulfonic acid, 5,6-diamino-3-toluenesulfonic acid, 2,3-dihydroxy-4-toluenesulfonic acid, 2,3-diamino-4-toluenesulfonic acid, 2,5-dihydroxy-4-toluenesulfonic acid, 2,5-diamino-4-toluenesulfonic acid, 2,6-dihydroxy-4-toluenesulfonic acid, 2,6-diamino-4-Ttoluenesulfonic acid, 3,5-dihydroxy-4-toluenesulfonic acid, 3,5-diamino-4-toluenesulfonic acid, 3,6-dihydroxy-4-toluenesulfonic acid, 3,6-diamino-4-toluenesulfonic acid, 5,6-dihydroxy-4-toluenesulfonic acid, 5,6-diamino-4-toluenesulfonic acid.

An initiator may be added with the reactive hydrogen provider. The initiator is added and undergoes thermal dissociation to generate free radicals to facilitate and promote grafting. In one configuration the initiator is selected from organic peroxides, such as benzoyl peroxide, dicumyl peroxide, octanoyl peroxide, lauroyl peroxide, stearoyl peroxide, cumene hydroperoxide, tert-butyl peroxide, Cert-butylperoxy laurate, tert-butylperoxy isopropyl carbonate, tert-butylperoxy acetate, and diisopropylbenzene hydroperoxide.

The initiator may be selected from dicumyl peroxide. The initiator may be combined with materials prior to input into the extruder. Alternatively or additionally, the initiator may be injected into the extruder in, or after the melt zone. The initiator is preferably injected following effective mixing of the polymer and coupling agent to ensure homogenous dispersion and efficient radical generation. The initiator may be dissolved in the coupling agent (for example GMA), or an appropriate organic solvent (as in the case of maleic anhydride, as it is a solid at room temperature.

The methods described herein result in the production of a thermoplastic dispersion or emulsion. The emulsion may be prepared from different portions of thermoplastic, where one portion of thermoplastic has undergone functionalisation with a coupling/functionalisation agent to form a functionalised thermoplastic portion, and another portion may be non-functionalised thermoplastic that has not undergone a process to functionalise it. The resultant thermoplastic dispersion or emulsion may comprise particularised thermoplastic, in which about 10, 20, 30, 40, 50, 60, 70, 80, 90 or 100% by weight of the particularised thermoplastic in the emulsion is functionalised thermoplastic, and the remainder of the thermoplastic, if any, is non-functionalised. Accordingly only a portion of the waste used for downstream binder production purposes may be functionalised and this has been found to have beneficial effects in terms of processing speed and efficiency, as well as the cost of functionalisation agents.

The functionalised thermoplastic, for processing by the extruder or TSE in an emulsification zone, may be prepared by the first module of the extruder or TSE that provides melting and functionalisation of the thermoplastic.

Some or all of the functionalised thermoplastic may be obtained from commercially available compatibilised thermoplastic, such as compatibilised PE that is functionalised by, for example, maleic anhydride. The inventors have demonstrated the production of composite boards comprising functionalised thermoplastic.

Commercially available compatibilised thermoplastic may be mixed with non-functionalised thermoplastic that has been processed by a first module (melt zone), functionalised thermoplastic that has been processed by the first module (melt zone with one or more coupling agents) or a combination thereof; for subsequent emulsification.

A dispersant may be added to promote the formation of a stable dispersion or emulsion. In selected embodiments, the dispersant may be a surfactant, a polymer or mixtures thereof. In certain embodiments, the polymer may be a polar polymer, having a polar group as either a co-monomer or grafted monomer. In preferred embodiments, the dispersant may comprise a stabilising agent comprising one or more polar polyolefins, having a polar group as either a co-monomer or grafted monomer.

The dispersant may comprise at least one carboxylic acid, a salt of at least one carboxylic acid, or carboxylic acid ester or salt of the carboxylic acid ester. The carboxylic acid, the salt of the carboxylic acid, or the carboxylic acid portion of the carboxylic acid ester or the salt of such ester can have up to 60, or up to 50, or up to 40, or up to 30, or up to 25 carbon atoms. The carboxylic acid, the salt of the carboxylic acid, or the carboxylic acid portion of the carboxylic acid ester or the salt of such ester can have at least 12, at least or at least 15, or at least 20, or at least 25 carbon atoms. If in salt form, the dispersant comprise a cation selected from the group consisting of an alkali metal cation, alkaline earth metal cation, or ammonium or alkyl ammonium cation. The dispersant may be an olefin (e.g. ethylene) carboxylic acid polymer, or its salt, such as ethylene acrylic acid copolymers or ethylene methacrylic acid copolymers.

For example, the dispersant may include an ethylene/alpha-beta unsaturated carboxylic acid copolymer. In some embodiments, the ethylene/alpha-beta unsaturated carboxylic acid copolymer may include an ethylene-acid copolymer, such as an ethylene-acrylic acid copolymer or an ethylene methacrylic acid copolymer. Typical copolymers include ethylene-acrylic acid (EAA) and ethylene-methacrylic acid copolymers, such as those available under the trademarks PRIMACOR™ (trademark of The Dow Chemical Company), NUCREL™ (trademark of E.I. DuPont de Nemours), and ESCOR™ (trademark of ExxonMobil). Other copolymers include ethylene ethyl acrylate (EEA) copolymer, ethylene methyl methacrylate (EMMA), and ethylene butyl acrylate (EBA). Other ethylene-carboxylic acid copolymer may also be used.

Alternatively, the dispersant can be selected from alkyl ether carboxylates, petroleum sulfonates, sulfonated polyoxyethylenated alcohol, sulfated or phosphated polyoxyethylenated alcohols, polymeric ethylene oxide/propylene oxide dispersing agents, primary and secondary alcohol ethoxylates, alkyl glycosides and alkyl glycerides.

Combinations of the above dispersants can be used.

With certain dispersants or compatibilisers it can be desirable to include a neutralizer to improve the effectiveness of the dispersant. For example, if the polar group of the thermoplastic polymer is acidic or basic in nature, the dispersant may be partially or fully neutralized with a neutralizing agent to form the corresponding salt. In certain embodiments, neutralization of the dispersant, such as a long chain fatty acid or EAA, may be from 25% to 200% on a molar basis; from 50% to 110% on a molar basis in other embodiments. For example, for EAA, the neutralizing agent is a base, such as ammonium hydroxide or potassium hydroxide, for example. Other neutralizing agents may include lithium hydroxide or sodium hydroxide, for example. Those having ordinary skill in the art will appreciate that the selection of an appropriate neutralizing agent depends on the specific composition formulated, and that such a choice is within the knowledge of those of ordinary skill in the art.

Described herein is a method of forming a plastic-containing polymer-water dispersion, optionally an emulsion. The dispersion may be formed in one or more extruders, for example single or twin-screw extruders (TSE). The single or twin screw extruders comprise a housing having an inlet end and outlet end and one or two rotating screws within the housing between the inlet end and the outlet end. The thermoplastic is introduced into an inlet end of the one or more single or twin-screw extruders. The one or more single or twin-screw extruders substantially melts the thermoplastic to define a melt zone. In one example, at least a portion thereof of the thermoplastic is reacted with a coupling agent selected from at least one of a grafting compatibiliser, a reactive hydrogen provider and a functionalising agent to define a functionalised thermoplastic. In another example, the thermoplastic (optionally functionalised) undergoes a treatment comprising a heat treatment and/or a catalyst treatment to increase MFI.

Particle size reduction in an extruder is via capillary break-up. In the melt zone there is molten polymer. The melt zone may be followed by a molten polymer seal. Past the seal, there is water and optionally surfactant which undergoes high shear mixing to achieve striata—small fibres—that are meta-stable particles. The energy required to obtain particle size reduction using these methods is much lower than standard size reduction techniques.

In some embodiments at least 10% by weight of the thermoplastic may be functionalised. A further portion of thermoplastic comprising 90% or less by weight of the thermoplastic may be non-functionalised. Other proportions of functionalised and non-functionalised material may be used. The degree of functionalised of the functionalised thermoplastic portion may vary according to reaction conditions and reactant availability. In some embodiments the degree of functionalisation of the thermoplastic polymer in a portion of functionalised thermoplastic may be between 0.5% and 6% as discussed earlier.

Twin-screw extruders (TSE) consist of two screws mounted in a barrel having a "Figure-eight" cross section. The "Figure-eight" cross section comes from the machining of two cylindrical bores whose centres are less than two radii apart. Twin screw extruders typically use segmented screws that are assembled on high-torque splined shafts or with solid screws machined from round bar stock. The barrels of the TSEs may be modular. The TSE may also use liquid cooling. The motor of the TSE inputs energy into the process via rotating screws. Feeders meter materials into the TSE. The screws' rpm may be independent of other processing conditions and thus can be set to optimise processing efficiencies. Segmented screws and barrels, in combination with the controlled pumping and wiping characteristics of co-rotating screws, may allow screw/barrel geometries to be matched to the process tasks.

The TSE or other extruder may be modular, with a first module comprising at least the melt zone of the TSE or other extruder and a second module comprising at least the emulsification zone of the TSE or other extruder.

Figure 5E:
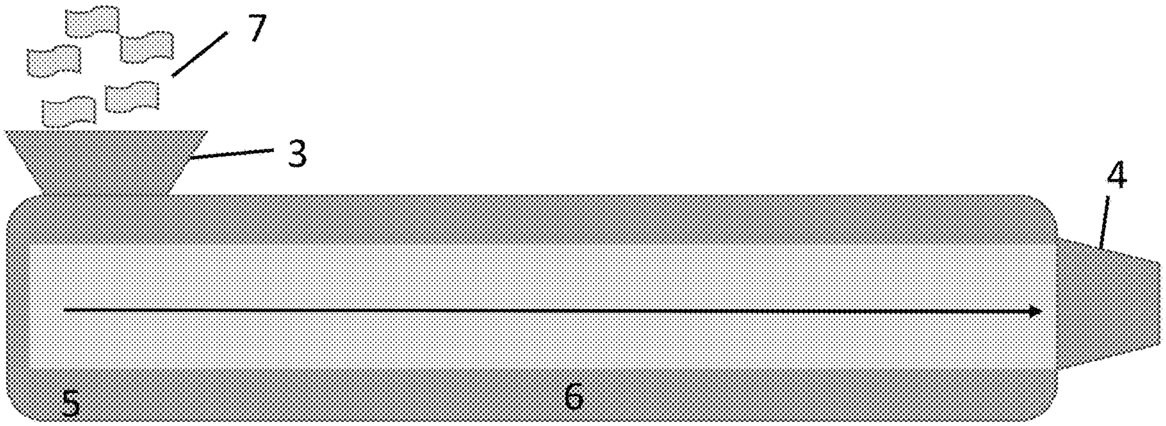
FIGS. 5E to 5S show examples of processes of the invention.

In the case of a single non-modular twin-screw extruder, as shown in FIG. 5E, the thermoplastic 7 will progress directly from the inlet 3 to the outlet 4 passing through each of the various zones of the TSE, such as the melt zone 5 and the emulsification zone 6. Similar zones and modes of operation are found in other extruders which may be substituted for references to twin-screw extruders herein. In one example, all of the thermoplastic being extruded is subjected to the functionalisation reaction(s) to compatibilise the thermoplastic. It will be understood by those of skill in the art that this does not mean that all the thermoplastic polymer groups are actually functionalised. Often only a small proportion of groups will be functionalised, for example, between 0.5% to 6%. There are various reasons for the lack of functionalisation of all polymer functional groups including—blocking of functional groups by other chemical moieties, incomplete melting, mixing or particularisation of the thermoplastic. Where the thermoplastic is treated, optionally in addition to functionalisation, the thermoplastic may be treated in the melt zone 5.

Figure 5F:
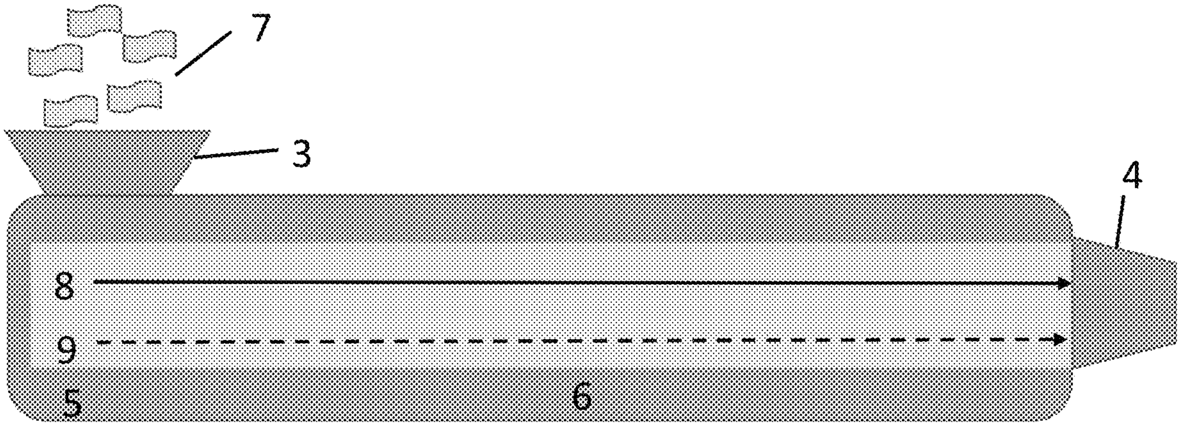

In some instances it may be desirable to provide an emulsion that comprises a mixture of particularised functionalised thermoplastic and particularised non-functionalised thermoplastic. In some instances, the particularisation may be achieved within the extruder and does not need to be carried out as a pre-processing step beforehand. A method to achieve this may be to process thermoplastic through a single modular or non-modular extruder in batches with one batch 8 including the addition of one or more coupling agents and/or cross-linker(s), and with a second batch 9 not including the addition of coupling agents nor cross-linker(s). The two resultant thermoplastic dispersions or emulsions could then be subsequently mixed to form a combined thermoplastic dispersion or emulsion having a desired mix of functionalised and non-functionalised particularised thermoplastic. Alternately, as shown in FIG. 5F the functionalised thermoplastic 8 and unfunctionalised thermoplastic 9 may be processed through a single melt zone 5 and then run through an extruder/TSE emulsification zone 6 to produce an emulsion.

Figure 5G:
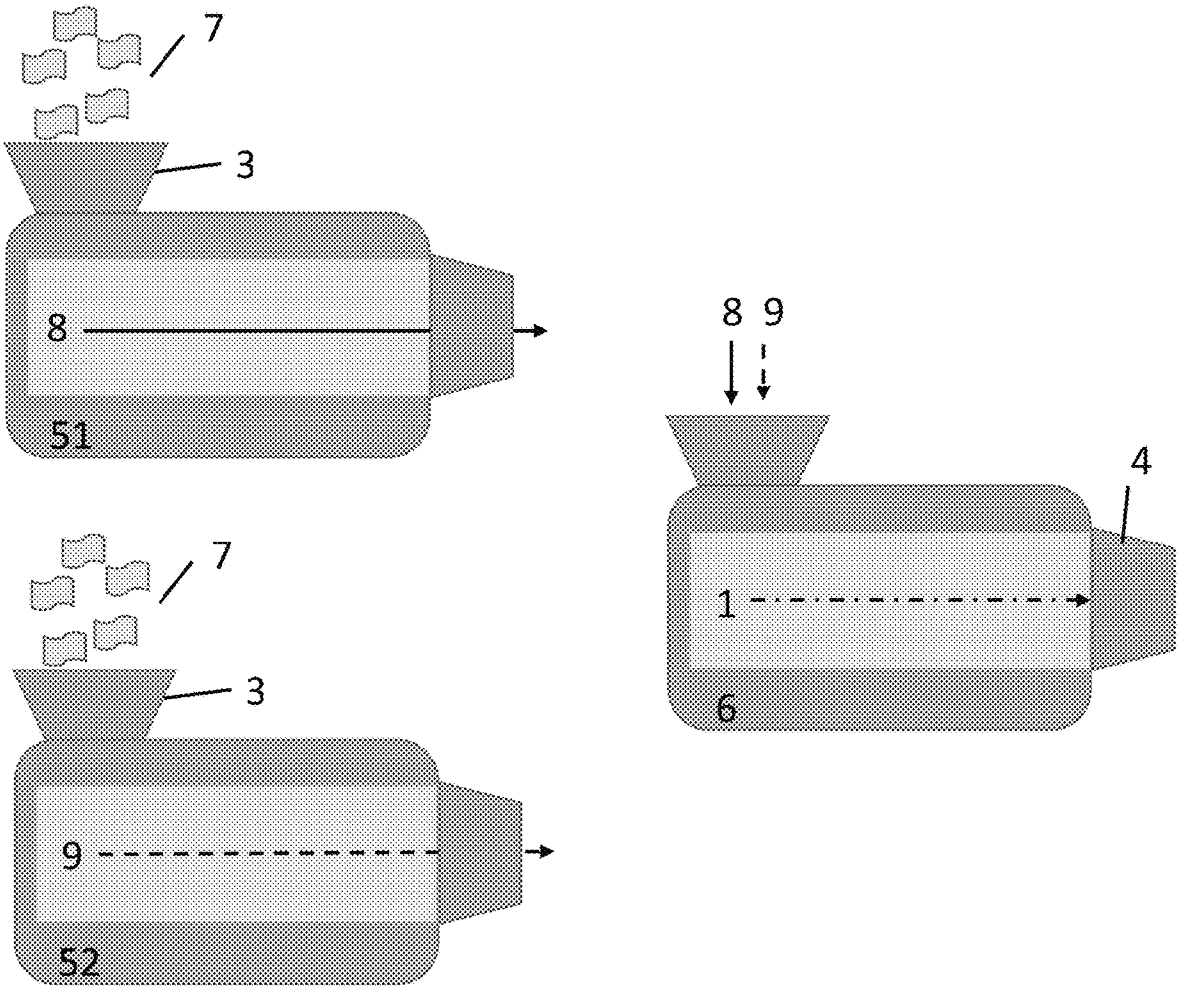

Alternately, a combination of extruder/TSE modules, or extruders or TSEs, may be used. For example, as shown in FIG. 5G the method may comprise a plurality of first modules (51 and 52) comprising the melt zone. Thermoplastic in one melt zone module 51 may be reacted with one or more coupling agents, whereas thermoplastic in a second melt zone module 52 may not be reacted with a coupling agent. The resultant melted thermoplastic from both modules may be fed into a second module 6 (i.e. the emulsification module) to provide a resultant thermoplastic dispersion or emulsion having a mixture of functionalised and non-functionalised thermoplastic.

Figure 5H:
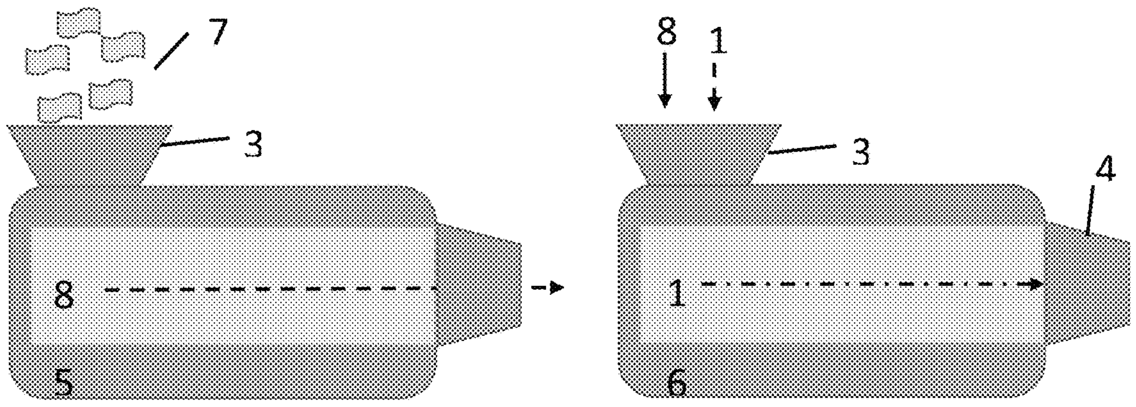
Figure 5I:
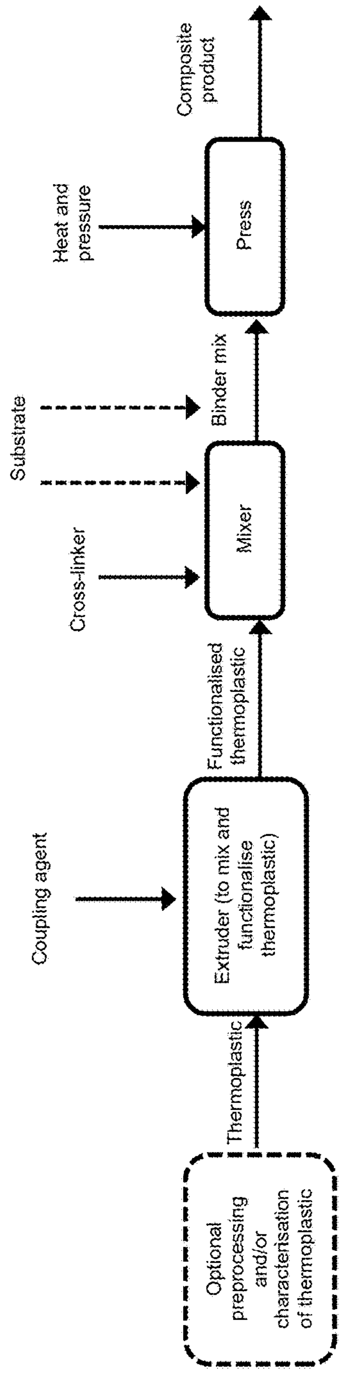
Figure 5J:
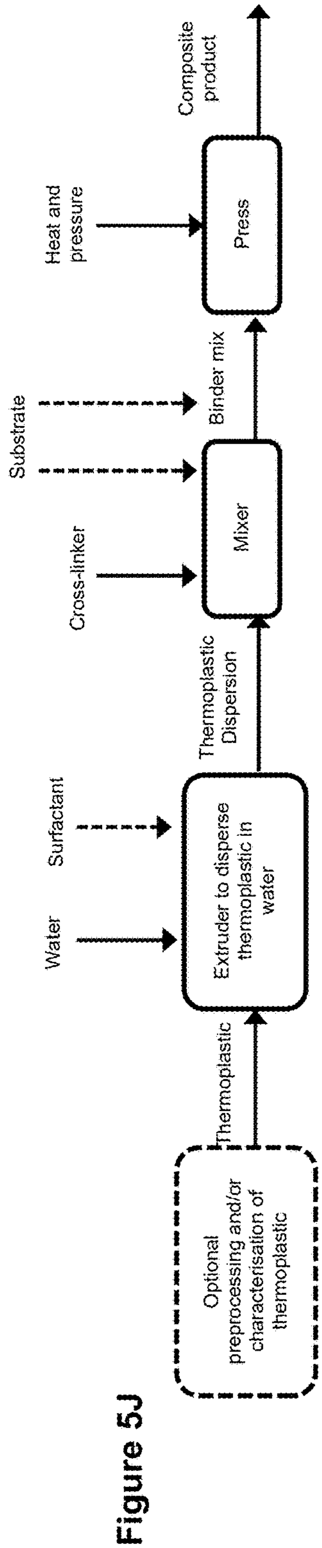
Figure 5K:
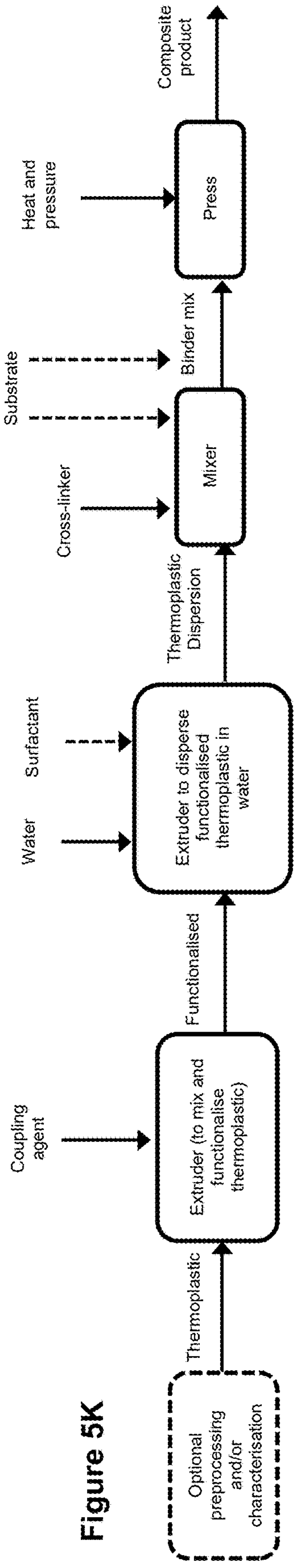
Figure 5L:
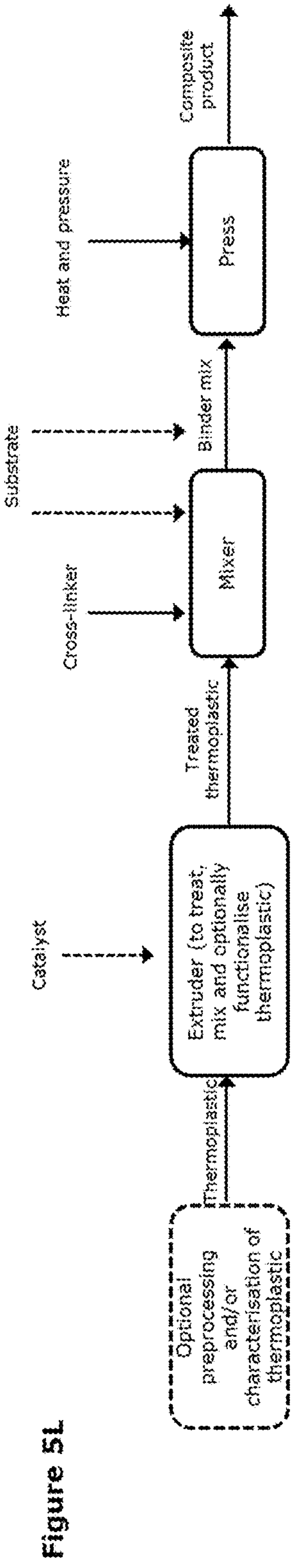
Figure 5M:
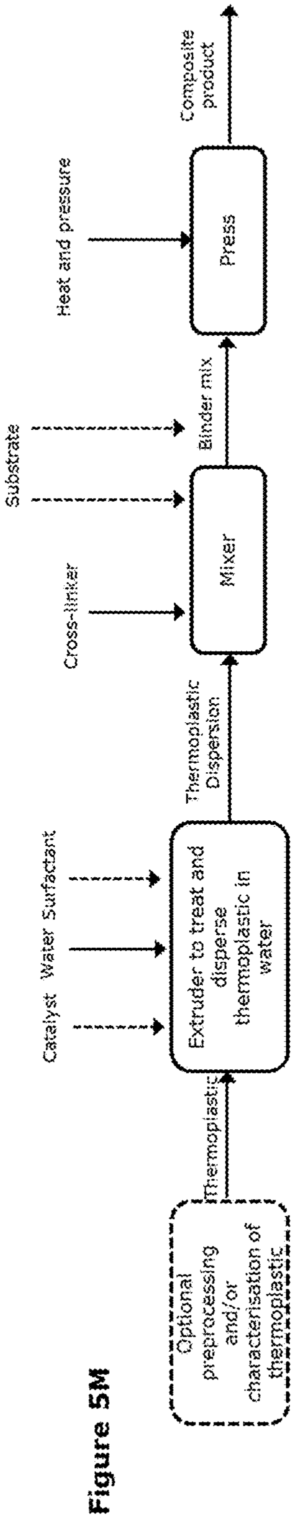
Figure 5N:
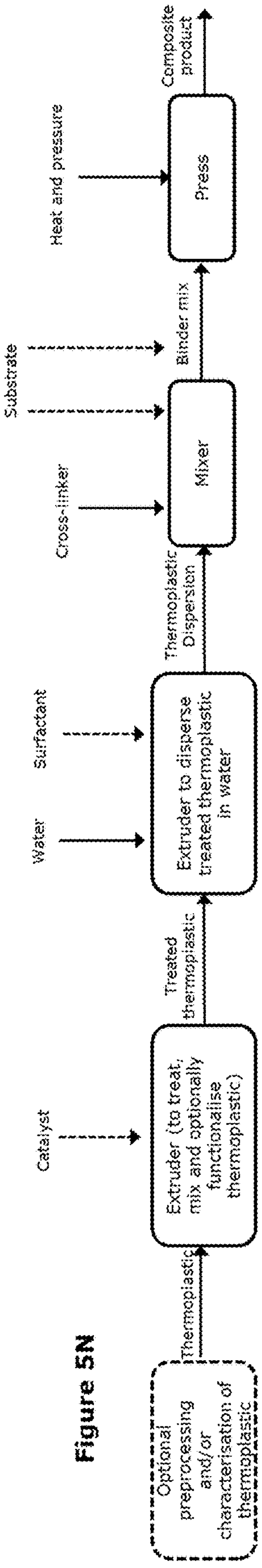

Alternately, as shown in FIG. 5H, thermoplastic 7 may be fed into an extruder/TSE module having a melt zone 5 and reacted with one or more coupling agents to produce melted functionalised thermoplastic 8. The melted functionalised thermoplastic 8 may then be fed into a second module comprising the emulsification zone 6 along with non-melted non-functionalised thermoplastic 1.

The functionalised molten thermoplastic may be emulsified in an emulsification zone of the twin screw extruder by exposing the functionalised molten thermoplastic to water, a surfactant and shear force sufficient to form functionalised thermoplastic having an average particle size (Dv50) of less than 0.5 mm, to produce a functionalised thermoplastic dispersion or emulsion having the water as the continuous phase. The functionalised thermoplastic dispersion or emulsion is then extruded via the outlet end of one of the one or more twin-screw extruders, the emulsion comprising functionalised plastic particles with an average particle size (Dv50) of less than 0.5 mm.

Example 13 provides examples relating to the preparation of wood fibre boards from a variety of recycled thermoplastic feedstocks.

The method may further include the addition of a cross-linker in liquid form, and optionally further water, to the functionalised thermoplastic emulsion at a temperature, within the one or more extruders or twin-screw extruders, insufficient to chemically activate the cross-linker.

The thermoplastic dispersion/emulsion derived from the emulsification/TSE process may be used as a binder. The binder may then be mixed with lignocellulosic material fibre to form a composite mixture and added to a press that applies heat and pressure to the composite mixture to form a lignocellulose-thermoplastic composite.

The extruder or twin-screw extruder may be modular. That is, a first module may comprise the melting zone of the twin-screw extruder, which may include the addition of coupling agents and optionally treatment using heat or catalyst, and a second module may comprise the emulsification zone of the extruder or twin-screw extruder, which includes at least the addition of water and surfactant and optionally a treatment such as a catalyst.

In examples shown in FIGS. 5O to 5S, the extruder comprises zones adapted for specific processing steps. The extruder or TSE is configured with different zones which treat the thermoplastic. In one example, thermoplastic conveying and melting occurs in the first portion of the extruder or TSE, termed the "melt zone". The melt zone may also include a zone for functionalisation, heat treatment or catalysis of the thermoplastic, which occurs downstream of where the thermoplastic melts. The zone for functionalisation or catalysis may include the addition of one or more coupling agents to functionalise the thermoplastic, such that the coupling agents functionalise the thermoplastic after the thermoplastic has melted. The coupling agents and/or catalyst may be combined with the thermoplastic prior to feeding into the extruder or TSE, or the coupling agents and/or catalyst may be added into the extruder or TSE via an injection port at or after the melting of the thermoplastic in the melt zone.

Figure 5O:
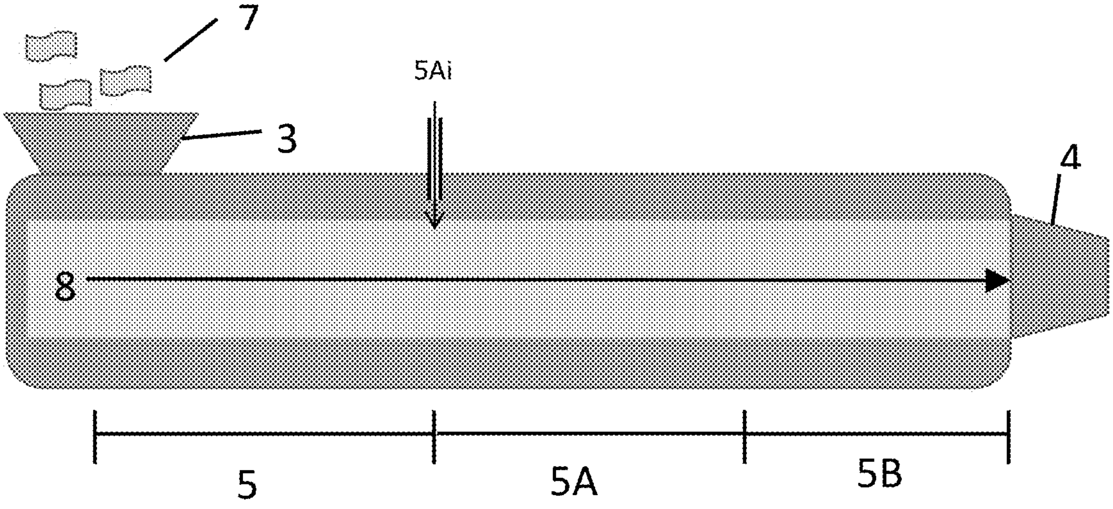

FIGS. 5O to 5S show examples in which thermoplastic 7 is processed in an extruder. In FIG. 5O, thermoplastic 7 is fed via a feeder 3 into to an extruder and progresses 8 through a melt zone 5 to provide a melted thermoplastic. The melted thermoplastic progresses to a functionalisation or treatment zone 5A where it is mixed with a coupling agent or catalyst that may be injected at injection port 5Ai, or added concurrently or sequentially with the thermoplastic 7 through the feeder 3. In one example, the functionalisation or treatment zone 5A is controlled to provide optimal temperature for functionalisation or heat/catalyst treatment of the thermoplastic. In another example, the functionalisation or treatment zone 5A is adapted for heating to a treatment activation temperature to achieve increase of the MFI as described herein. For example the heat treatment may be to an activation temperature substantially above the melting temperature of the thermoplastic or mixture of thermoplastics. The thermoplastic subsequently enters a mixing zone 5B where it is mixed prior to extrusion through outlet 4 to provide a functionalised and/or treated thermoplastic. The functionalised or treated thermoplastic may be passed through a further extruder to achieve emulsification to provide a thermoplastic dispersion.

Figure 5P:
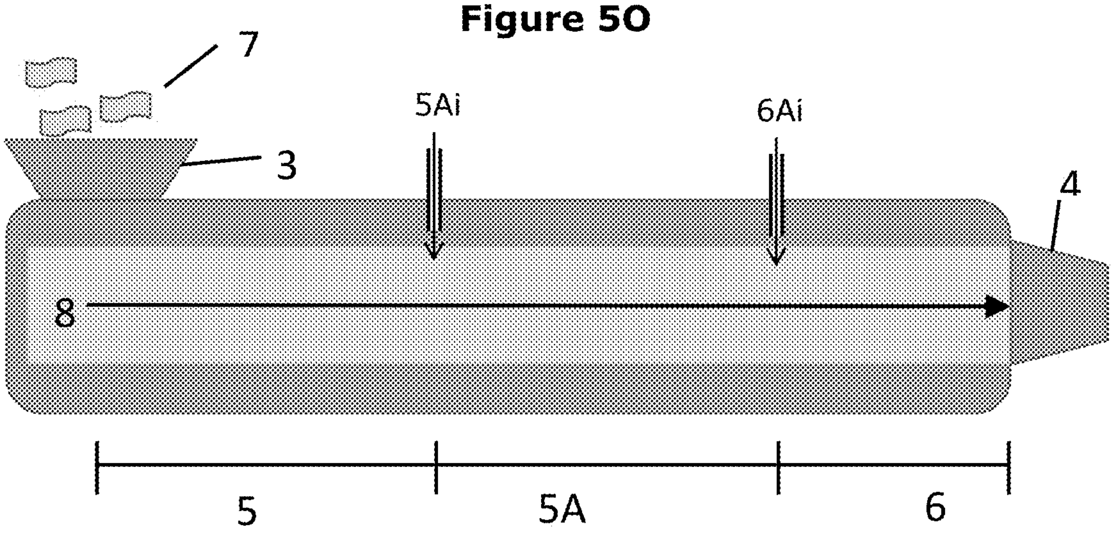

In a further example shown in FIG. 5P, the mixing zone of 7*a* may be replaced or combined with an emulsification zone 6. In this example, water, optionally surfactant and optionally catalyst is injected at injection port 6Ai and mixed throughout the emulsification zone to provide a thermoplastic dispersion that is extruded through an outlet 4.

Figure 5Q:
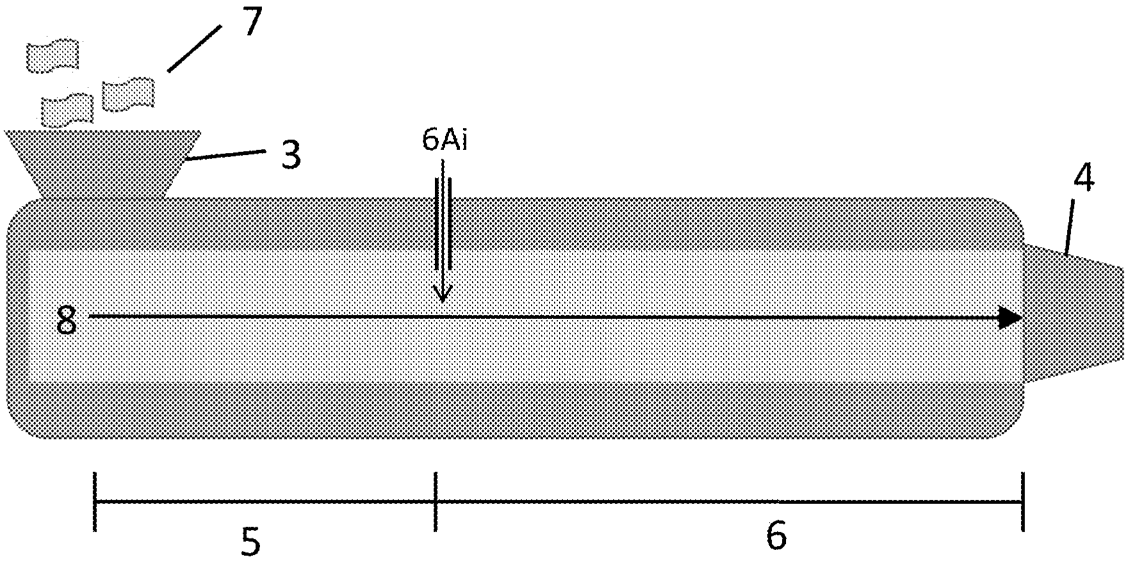

In a further example shown in FIG. 5Q, thermoplastic proceeds through a melt zone 5 that may include a treatment of the thermoplastic to an emulsification zone 6. In this example, water optionally catalyst and optionally surfactant is injected at injection port 6Ai and mixed throughout the emulsification zone to provide a thermoplastic dispersion that is extruded through an outlet 4.

Figure 5R:
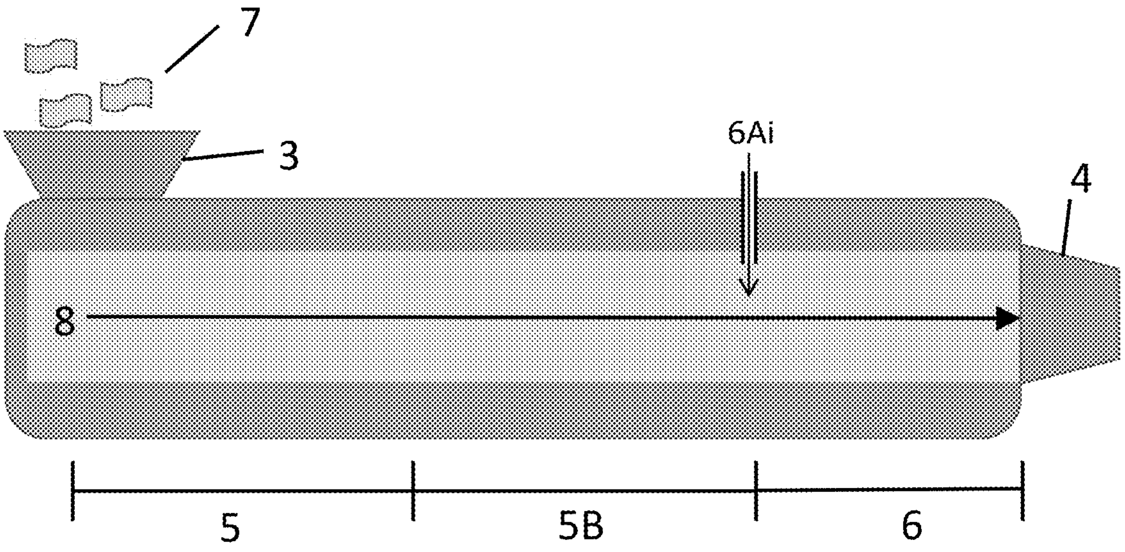

In a further example shown in FIG. 5R, thermoplastic proceeds through a melt zone 5 that may include a treatment of the thermoplastic to a mixing zone 5B where it is mixed, optionally with a catalyst. In this example, water, optionally catalyst and optionally surfactant is injected at injection port 6Ai and mixed throughout the emulsification zone 6 to provide a thermoplastic dispersion that is extruded through an outlet 4.

In one example, the extrusion process described in 5R occurs after the process described in FIG. 5O.

The extruder may comprise multiple mixing, heat treatment and injection zones.

Figure 5S:
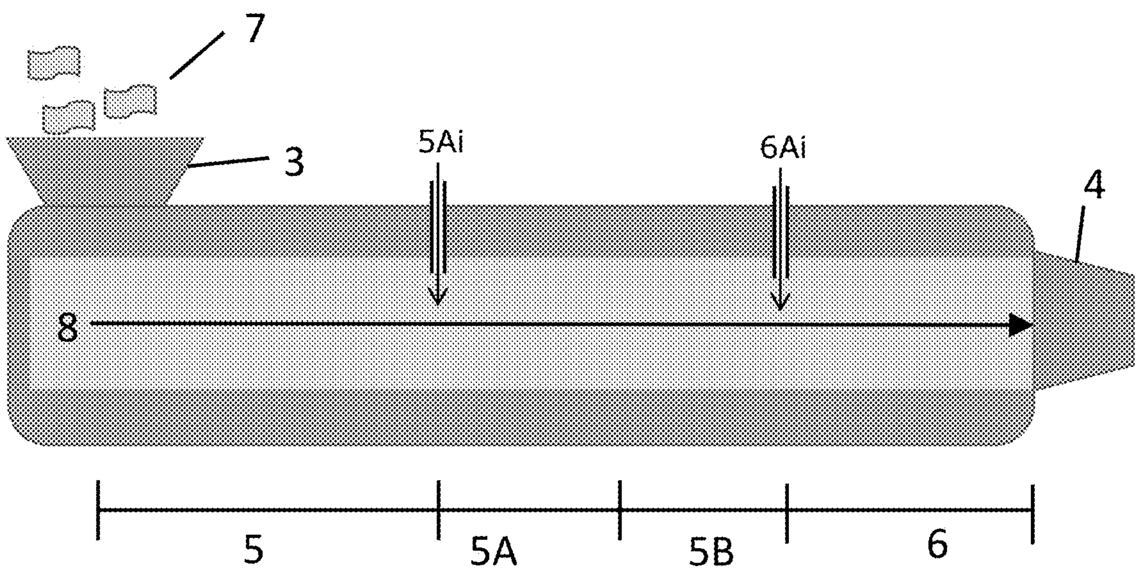
Figure 7A:
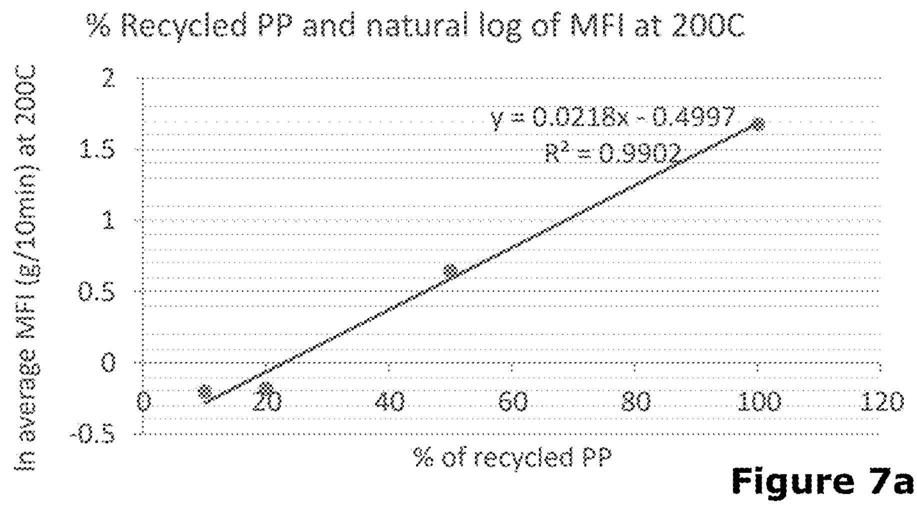
FIG. 7*a*-7*e* show calibration graphs of varying recycled PP compositions with the natural log of average MFI at different set-point temperatures from 190° C. to 230° C.
Figure 7B:
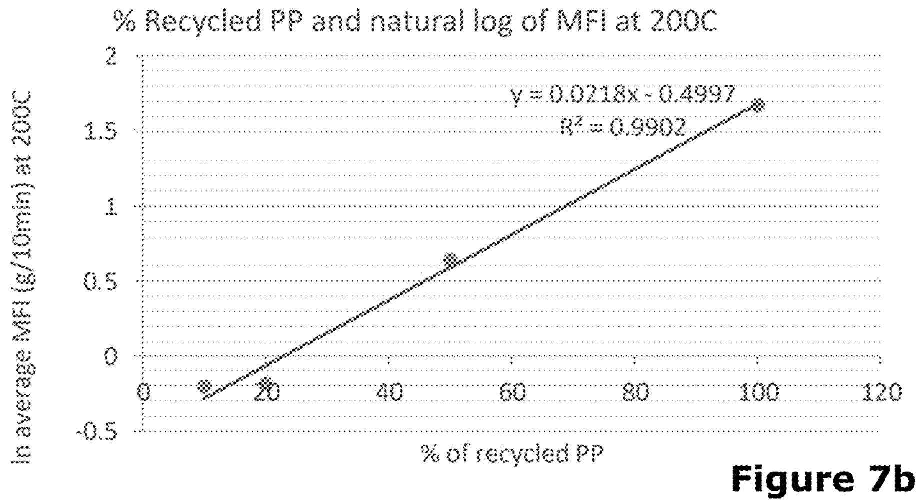
Figure 7C:
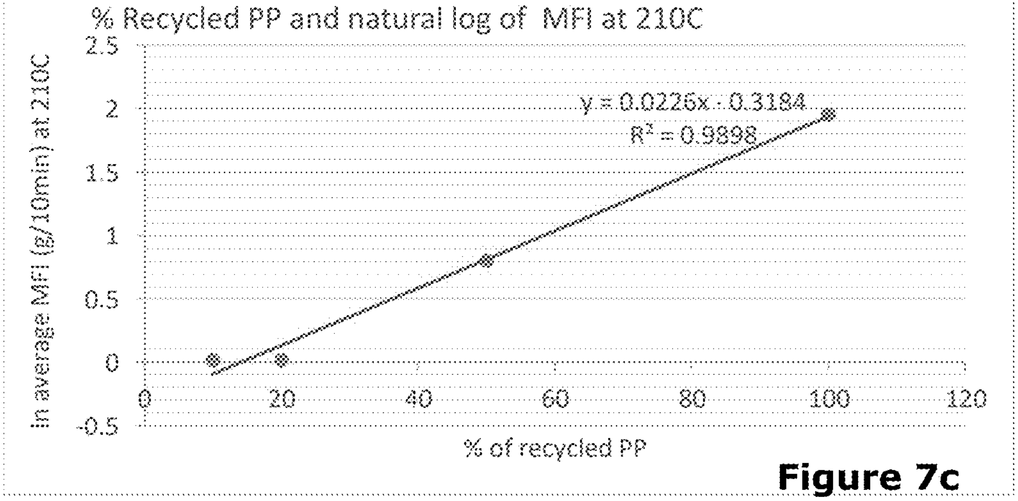
Figure 7D:
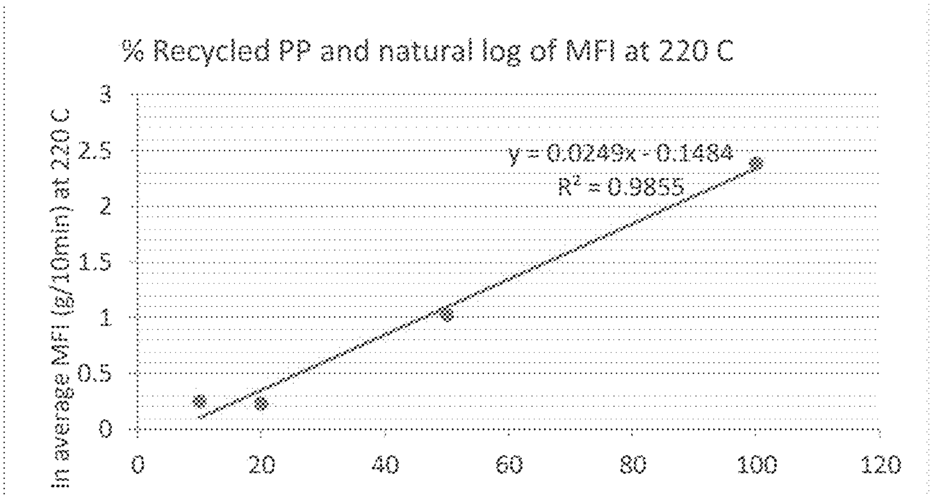
Figure 7E:
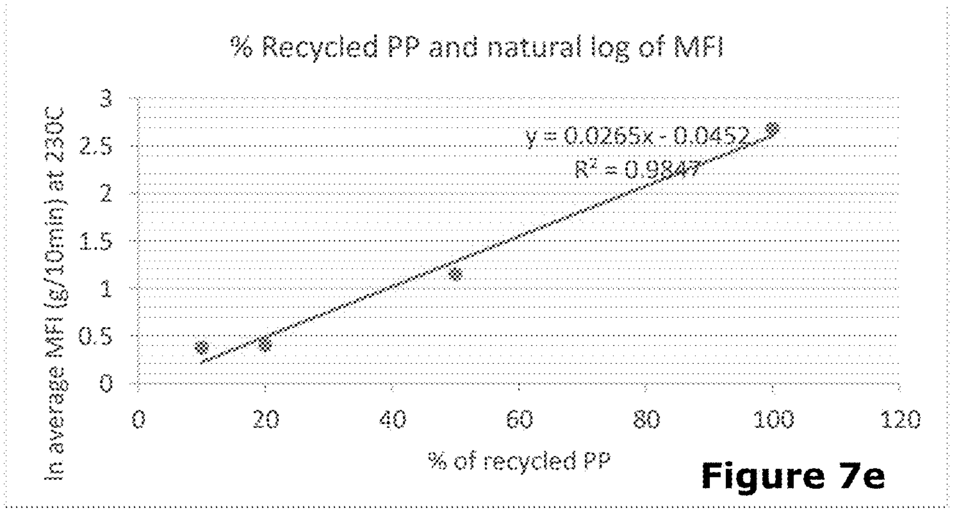

In a further example shown in FIG. 5S, thermoplastic 7 is fed via a feeder 3 into to an extruder and progresses 8 through a melt zone 5 to provide a melted thermoplastic. The melted thermoplastic progresses to a functionalisation/treatment zone 5A where it is mixed with at least one of a coupling agent and a catalyst that may be injected at injection port 5Ai, or added concurrently or sequentially with the thermoplastic 7 through the feeder 3. In one example, the functionalisation/treatment zone 5A is controlled to provide optimal temperature for functionalisation and/or treatment of the thermoplastic. The thermoplastic subsequently enters a mixing zone 5B where it is mixed prior to passing to an emulsification zone 6. Water and optionally surfactant is injected at injection port 6Ai and mixed throughout the emulsification zone to provide a functionalised and/or treated thermoplastic dispersion. The dispersion may be subjected to a further mixing zone (not shown) or a conveying zone (not shown) prior to being extruded through an outlet 4.

In one example, the apparatus comprises a sequential combination of a melt zone, mixing/treatment zone then emulsification zone. This example provides a particularly effective size-reduction and dispersion preparation. This is believed to be due to the injector port 6Ai being positioned after the mixing zone. In one example, an effect of the injector port 6Ai is to reduce the temperature due to the addition of liquid (i.e. water and surfactant) at a significantly lower temperature than the melted material.

The temperature configuration of the extruder may depend on the reaction requirements. A melt zone is defined as requiring a temperature set point greater than the melting temperature of the thermoplastic being processed. That temperature may be above 130° C. for LDPE, and 160-220° C. for PP. The mixing zone comprises a temperature of approximately the same melt temperature to maintain the molten state of the thermoplastic. An optional venting zone is defined after the mixing zone to enable unreacted monomers to evaporate and purify the thermoplastic output. The temperature in the venting zone is set to enable volatilisation of the coupling agent and may be up to 20° C. hotter than the melting zone, for example greater than 200° C. Prior to exiting the extruder, the temperature may be reduced to reduce viscosity of the extruded material.

In one example the thermoplastic undergoes a treatment comprising a heat treatment. This involves heating the thermoplastic to an "activation temperature" substantially above the melting temperature of the thermoplastic. As shown in example 2A and 2B, this heat treatment has been shown to significantly increase the melt-flow index as well as improve the performance of boards when compared to using a low temperature processed thermoplastic. Further discussion of the activation temperature is provided below.

The definition of the zones described above will be clear to those of skill in the art. However, by way of example, a melt zone comprises a zone of the extruder with a temperature set point which achieves substantially complete melting of the polymer feedstock. The melt zone may be defined by an aggressive melting-zone design. For example, through the use of neutral/wide kneading-block elements. The melt zone may also use a reverse element. The reverse element may achieve full melting of the thermoplastic polymer. Alternately, the melt zone may be defined by an extended screw design that uses narrow disk kneading-block elements. The narrow disk kneading-block elements may result in less intensive shear-stress input into the thermoplastic polymer, which results in more gradual melting of the polymer.

The extruder screw elements are chosen to perform different unit operations as the ingredients pass down the length of the screw. In one example, there is first a melting then mixing and conveying zone, next an emulsification zone, and finally a dilution and cooling zone. Steam pressure at the feed end is contained by placing kneading blocks and blister elements between the melt mixing zone and is contained and controlled by using a Back-Pressure Regulator. The polyolefin, dispersing agent, compatibilizer and water are melt kneaded in the extruder.

The melt zone may be heated to about 140° C. to about 240° C., or as required to melt the thermoplastic in the melt zone. For some low-melt-point thermoplastics, the melt zone may be set to 95° C. to 140° C. During start-up, the extruder temperature is raised to a higher set-point compared to the operating temperature. In one example the start-up temperature is raised to at least about 150° C. In another example, in which the melting temperature of the thermoplastic is higher, the temperature is raised to about 180° C.

The melt zone may use external heating elements to heat the melt zone. It will be appreciated that when the extruder or TSE initiates, the extruder or TSE will include heat input (such as a heating element or heating jacket). However, once the extruder or TSE has been running for a sufficient period the extruder or TSE will generate heat via frictional heating. As the frictional heat increases, the external heat input may be decreased (potentially removed) so as to prevent overheating. Overheating can lead to degradation of the thermoplastic indicated by smoke and discoloration. The extruder or TSE may include cooling elements in the melt zone to prevent over-heating. The cooling elements may be in the form of cooling passages. A cooling liquid, such as water, may be run through the cooling passages to cool the extruder or TSE. During operation, the extruder or twin-screw extruder is maintained at set-point temperatures for the zones along the barrel. In one example, the barrel comprises one or more water cooled zones.

The temperature set-point of the barrel may be automatically adjusted to be maintained at or about a barrel zone temperature set-point. This automated feedback mechanism is achieved using a temperature regulating apparatus. In this apparatus, temperature is sensed using a temperature sensor positioned in or near the barrel then data is fed to a temperature controller. Based on the barrel zone temperature set-point, the controller regulates the temperature using part of the temperature regulating apparatus. The temperature may be regulated by a water-cooling apparatus adapted to cool the barrel. The temperature may be regulated by heating elements adapted to heat the barrel.

There may be multiple extruder zones each comprising a temperature regulating apparatus. The examples discuss experiments using waste polymers. These experiments indicated that to achieve more effective emulsification of waste polymers, the temperature set-point of the extruder may be set above the melting temperature of the polymers being processed. For example 20% above.

In further experiments, the inventors have found that applying an average barrel temperature that is substantially higher than the melting point of the polymer has beneficial effects on the MFI and board performance. Example 2A and 2B illustrate this surprising effect and FIG. 2A(i) shows the unexpected increase in MFI when a substantially higher temperature (referred to as an "activation temperature" herein) is reached.

Accordingly, in one example the melt zone temperature may be the activation temperature as previously described. The melt zone temperature may be calculated by taking the average temperature across the melt zone. The melt zone may comprise no, or substantially no, water. The melt zone may comprise less than 5, 4, 3, 2, or 1% water by weight of the thermoplastic and suitable ranges may be selected from between any of these values.

Once processed through the melt zone the thermoplastic may be processed by a different section of the extruder or TSE. In one example, the next zone comprises a mixing zone. A mixing zone may comprise kneading and mixing elements. Treatments including heat treatment and catalyst treatment may be achieved prior to, concurrently with, or after mixing in the mixing zone.

Examples provided herein may also comprise an emulsification or dispersion zone, which includes the addition of water and optionally a surfactant.

Once in the emulsification zone of the extruder or TSE, water and optionally surfactant is added to the thermoplastic that may also be functionalised. As the water and surfactant is added, the thermoplastic may form a bi-continuous phase in the first section of the emulsification zone. A bi-continuous phase is an intermediate phase of water-in-oil and oil-in-water mixture. The bi-continuous phase may be an intermediate phase of water-in-polymer and polymer-in-water mixture. As additional water is added into the emulsification zone the emulsion forms an emulsion with the water as the continuous phase.

The emulsion is formed while being subjected to shear force in the emulsification zone of the extruder or TSE. The shear force is provided for by the design of the extruder, for example the screw or screws in the emulsification zone of the extruder or TSE that impart shear force (or shear stress).

The emulsification zone may comprise a water mixing zone where the water and surfactant is initially mixed, with a shear zone downstream of the water mixing zone to impart shear force. In one example, the water (and optionally surfactant) mixing zone and shear zone are combined to define a dispersion zone. The dispersion zone comes before the dilution zone.

The emulsification zone may include a dilution zone which comprises ports for the addition of further water. That is, an initial amount of water is added prior to the mixing zone optionally along with surfactant. As the material moves downstream of the water mixing zone additional water is injected at the dilution zone. The additional water may be where the bi-continuous phase changes to an oil in water or polymer-in-water phase (having water as the continuous phase).

A surfactant may be blended with the feed mixture prior to entry into the extruder, this is especially effective where solid surfactants such as PVOH are used. Alternately, the surfactant may be injected into the extruder at a position downstream of the feed, and preferably downstream of the melt zone.

The water may be injected via water injection ports, for example see FIGS. 5O to 5S and optionally further injection ports. That is, the water injection line that terminates in the injection port may include a flow meter and valve to control the amount of water that is added to the extruder or TSE.

The water flow rate may be to achieve a set moisture content of the thermoplastic dispersion being produced. Given that amount is scale dependent, it is typically described in terms of the resin:water ratio w/v. In the method described herein, the resin comprises thermoplastic. In some embodiments, the resin:water ratio is in the range of from 1:1 to 5:1. The resin:water ratio post-mixing zone may be at a ratio of 2:1 to 5:1. This provides water but still maintains a high resin load during the particle breakdown stage. The water input to the dilution zone may be adjusted to achieve a resin:water ratio in the dilution zone of between about 0.8:1 to 1.8:1. The increased amount of water added to the dilution zone, optionally in combination with a surfactant, causes dispersion of the particles to form the thermoplastic dispersion.

The resin:water ratio may be adjusted to achieve a target moisture content of the thermoplastic dispersion. Moisture content is a critical parameter in the production of composite boards such as lignocellulosic material composite boards because too much moisture results in a weak board. Similarly, too little moisture can compromise the ability of certain cross-linkers to effectively bind to the lignocellulosic material.

The thermoplastic dispersion may comprise a moisture content of between 25-75%. The moisture content may be adapted to ensure that the moisture content of a board prepared using the thermoplastic dispersion is in a preferred range. Accordingly, the moisture content of the thermoplastic dispersion is preferably in a range of from 35% to 55%. The moisture content of the dispersion may be adjusted by dilution, for example within the dilution zone of the extruder. Alternatively, it may further be adjusted by drying following extrusion. Achieving a specific preferred moisture content reduces the requirement for drying of the dispersion which has commensurate benefits in reduced energy usage and time for preparation. In this example, the moisture content of the thermoplastic dispersion is between about 40-50%.

The water injection system may be a high pressure low volume system. For example, the system may include an injector, that may be based on a spring loaded ball that mounts in an inlet chamber of the extruder, a manifold and pump. The manifold may include a gate valve, needle valve for adjustment and flow meter.

The inventors have found that the properties of the thermoplastic dispersion obtained following emulsification can affect the properties of materials made with a binder containing the thermoplastic dispersion. In particular, the properties effected a change including particle size, particle size distribution and melt-flow index.

In addition, the properties of the thermoplastic introduced to the extruder also affect the properties of the thermoplastic dispersions produced following emulsification. The inventors have found that using thermoplastic with a higher melt-flow index provides a thermoplastic dispersion with a lower particle size. Smaller particle sizes are more easily mixed with lignocellulosic materials to form a composite panel. Further, smaller particle sizes provide enhanced integration of the binder with the lignocellulosic material Described is a method of processing a thermoplastic to increase the melt-flow index, then carrying out steps to prepare a thermoplastic dispersion and optionally producing a board. The preparation of the dispersion and board are carried out according to the methods described herein. Thermoplastic dispersions with a higher melt-flow index may be correlated to reduced particle size and reduced particle size distribution.

As discussed herein, the inventors have found specific methods of achieving an unexpectedly high MFI by certain treatment steps applied within the processing of the thermoplastic. For example heat treatment to an activation temperature and catalyst treatment were identified as methods that unexpectedly achieve this effect for both virgin and waste plastics. This effect is particularly important for waste plastics due to them typically having lower MFI and higher branching than virgin polymers which are intended to be melted and formed.

Cross linkers are added prior to the manufacture of a composite board. The cross-linker may be added in the extruder/TSE or to the extruded thermoplastic dispersion/emulsion or to both the extruder/TSE and the extruded emulsion.

The cross linker may be selected from a participant cross-linker or non-participant cross-linker. A participant cross-linker is one that directly participates in the bonding between the two compounds which are being linked. That is, one end of the participant cross-linker forms a bond with one of the compounds and another end of the participant cross-linker forms a bond with the other compound.

A non-participant cross-linker is one that does not directly participate in the bonding between the two compounds. That is, it does not form bonds with the two compounds being linked. Instead the non-participant cross-linker interacts with one or more of the compounds to provide an active site on at least one of the compounds. This active site then provides a site for bonding between the two compounds.

The temperature of the extruder or TSE may be modified prior to, or during, the addition of the participant cross-linker. The temperature of the extruder/TSE may be reduced by a water based cooling system such as a high pressure water cooling system, barrel cooling or water jacket. The temperature of the extruder/TSE may be reduced by the addition of water. The temperature of the extruder/TSE may be reduced by a combination of both water additional and an active cooling system.

The participant cross-linker may be an isocyanate. Without wishing to be restricted by theory, the addition of isocyanates may also have the effect of reducing the hydrophilicity of the lignocellulosic fibre/material.

The temperature of the extruder/TSE may be modified prior to, or during, the addition of the non-participant cross-linker. The temperature of the extruder/TSE may be reduced by a water based cooling system such as a high pressure water cooling system, barrel cooling or water jacket. The temperature of the extruder/TSE may be reduced by the addition of water. The temperature of the extruder/TSE may be reduced by a combination of both water additional and an active cooling system.

The non-participant cross-linker may be an organic peroxide.

If adding a non-participant cross-linker such as organic peroxide, this may be added at about 0.1, 0.5, 1, 2, 3, 4, or 5% by weight of the thermoplastic dispersion/emulsion, and suitable ranges may be selected from between any of these values. A non-participant cross-linker such as organic peroxide may be added when a grafting compatibilizer or reactive hydrogen provider has been added.

The inventors have prepared wood-fibre composite boards using an organic peroxide cross-linker. Specifically, 1,1-di-(tert-butylperoxy)-3,3,5-trimethylcyclohexane enhanced strength of wood-fibre composite boards prepared with a thermoplastic dispersion of LDPE in water. The organic peroxide cross-linker may be added to a thermoplastic dispersion to form a binder comprising between 1-10% organic peroxide to provide enhanced strength. In some embodiments, where lower strength may be acceptable, the organic peroxide cross-linker is added at between 2 and 8%.

As described, binders may comprise the following:

organic peroxide (e.g. luprox) 3-5%.

MAPE 10-20%

Thermoplastic dispersion 75-87%

As described, a composite board of the invention may comprises the following composition (w/w):

95% Lignocellulosic material (e.g. wood fibre);

4% thermoplastic dispersion 0.75% MAPE 0.25% organic peroxide (e.g. luprox)

The organic peroxide may be provided in powder or liquid form. Experiments carried out by the inventors indicated that powder form enabled easier mixing. The powdered organic peroxide may comprise 40% benzoyl peroxide.

If adding a participant cross-linker such as an isocyanate, this may be added at about 0.1, 0.5, 1, 2, 3, 4, 5, 6, 7, 8, 9, 10, 11, 12, 13, 14 or 15% by weight of the thermoplastic dispersion/emulsion, and suitable ranges may be selected from between any of these values (for example, about 0.1 to about 15, about 0.1 to about 13, about 0.1 to about 10, about 0.1 to about 8, about 0.1 to about 5, about 0.5 to about 20, about 0.5 to about 19, about 0.5 to about 17, about 0.5 to about 12, about 0.5 to about 9, about 0.5 to about 5, about 1 to about 20, about 1 to about 18, about 1 to about 16, about 1 to about 14, about 1 to about 10, about 2 to about 20, about 2 to about 18, about 2 to about 16, about 2 to about 14, about 2 to about 10, about 3 to about 20, about 3 to about 17, about 3 to about 15, about 3 to about 11, about 3 to about 9, about 4 to about 20, about 4 to about 18, about 4 to about 16, about 4 to about 10, about 5 to about 20, about 5 to about 18, about 5 to about 17, about 5 to about 11, about 6 to about 20, about 6 to about 18, about 6 to about 16, about 6 to about 12, about 6 to about 10, about 7 to about 20, about 7 to about 18, about 7 to about 15, about 7 to about 12, about 7 to about 10, about 8 to about 20, about 8 to about 17, about 8 to about 15, about 8 to about 13, about 8 to about 10, about 9 to about 20, about 9 to about 16, about 9 to about 13, about 10 to about 20, about 10 to about 16, about 11 to about 20, about 11 to about 17, about 12 to about 20, about 12 to about 17, about 13 to about 20, about 13 to about 18, about 14 to about 20, about 14 to about 18 or about 15 to about 20% by weight of the thermoplastic dispersion/emulsion). The participant cross-linker such as isocyanate may be added when a reactive hydrogen provider has been added as a coupling agent.

The inventors have derived preferred stoichiometric ratios of isocyanate to thermoplastic dispersion which achieve effective reaction kinetics and composite board strength. Accordingly, the binder may comprise between 5-50% isocyanate. In other words, the isocyanate is added at 5% to 50% by weight of the binder. In some examples, the adhesion properties of the cross-linker synergise more effectively with the treated thermoplastic and in these cases the cross-linker may comprise between 5-20% cross-linker, where the cross-linker may be isocyanate. In one particular example, a composite board may comprise the following composition (w/w):

90% Lignocellulosic material (e.g. wood fibre);

9% thermoplastic dispersion;

1% eMDI.

An alternative composite board composition may comprise:

90% Lignocellulosic material;

8% thermoplastic dispersion;

2% eMDI.

An alternative composite board composition may comprise:

90% Lignocellulosic material;

9.5% thermoplastic dispersion;

0.5% eMDI.

An alternative composite board composition may comprise:

87% Lignocellulosic material;

10% thermoplastic dispersion;

3% eMDI.

Examples 2B and 12 provide various further examples of composite board compositions as described. Particle boards comprising thermoplastic binders prepared according to the methodology described in Example 2B across 1%, 2% and 3% pMDI loading exhibited surprisingly good performance characteristics. This example shows that LDPE waste thermoplastic processed using high temperature treatment produces high specification wood fibre boards that outperformed boards produced without thermoplastic binder across all pMDI loadings. Therefore activated waste thermoplastic imparts adhesive qualities that improve the performance of composite boards compared to control.

Without wishing to be restricted by theory, it is believed that isocyanate reacts with the natural fibres modifying their polarity. Urethane links are formed between the isocyanate functionality and the hydroxyl group of the natural fibres, which may block the hydrophilic hydroxyl sites, which results in the wood fibre being less hydrophilic and thus more compatible with the hydrophobic thermoplastic. As described the use of diisocyanates may form bonds with the reactive moieties of the functionalised and/or treated polymer. One isocyanate group of the diisocyanate may react with the hydroxyls on the wood fibre and the other isocyanate group react with the reactive moieties on the functionalised and/or treated polymer. This may form covalent bonds between the reactive moieties on the functionalised and/or treated polymer and the diisocyanate.

The isocyanate may also react with other hydroxyls on the lignocellulosic fibre such as wood fibre, which may mask its hydrophobicity. In this manner, the diisocyanate can be used to block polar hydrophobic hydroxyls on the fibre or be used to form covalent bonds with the reactive moieties on the functionalised and/or treated polymer which can increase the compatibility of the plastic polymer and the wood fibres.

Emulsified isocyanate compounds such as emulsified methylene diphenyl diisocyanate (eMDI) may be used as a cross-linker in conjunction with thermoplastic dispersions to make composite boards. Example 12 demonstrates that when combining an isocyanate with a thermoplastic dispersion (for example one prepared according to the methods described herein), eMDI achieves better mixing properties and enhanced strength compared to pMDI.

Thermoplastic dispersions may be formulated into a binder by combining the dispersion with one or more cross-linking agents as described in detail above. To form a composite board, the binder is then combined with a lignocellulosic material. The binder may comprise between 1% and 50% of a composite mixture. However, providing more than 20% of binder within a board may compromise the properties of the board due to the decreased fibre content which provides a physical matrix to provide enhanced strength.

Accordingly, the binder formulation may comprise 1, 2, 3, 4, 5, 6, 7, 8, 9, 10, 11, 12, 13, 14, 15, 16, 17, 18, 19 or 20% by weight of the composite board, and suitable ranges may be selected from between any of these values (for example, about 1 to about 20, about 1 to about 18, about 1 to about 16, about 1 to about 14, about 1 to about 10, about 2 to about 20, about 2 to about 18, about 2 to about 16, about 2 to about 14, about 2 to about 10, about 3 to about 20, about 3 to about 17, about 3 to about 15, about 3 to about 11, about 3 to about 9, about 4 to about 20, about 4 to about 18, about 4 to about 16, about 4 to about 10, about 5 to about 20, about 5 to about 18, about 5 to about 17, about 5 to about 11, about 6 to about 20, about 6 to about 18, about 6 to about 16, about 6 to about 12, about 6 to about 10, about 7 to about 20, about 7 to about 18, about 7 to about 15, about 7 to about 12, about 7 to about 10, about 8 to about 20, about 8 to about 17, about 8 to about 15, about 8 to about 13, about 8 to about 10, about 9 to about 20, about 9 to about 16, about 9 to about 13, about 10 to about 20, about 10 to about 16, about 11 to about 20, about 11 to about 17, about 12 to about 20, about 12 to about 17, about 13 to about 20, about 13 to about 18, about 14 to about 20, about 14 to about 18 or about 15 to about 20% by weight of the composite board). If too little binder is included in a formulation, the lignocellulosic particles are insufficiently coated to create effective bonds between the particles. This provides a board that breaks apart under load. Accordingly, the lignocellulosic material:binder ratio may be in a range of from approximately 80% lignocellulosic material: 20% binder to 95% lignocellulosic material to 5% binder. In other examples, the lignocellulosic material:binder ratio may be in a range of from approximately 85% lignocellulosic material: 15% binder to 92% lignocellulosic material to 8% binder.

Example 12 shows that composite boards with lower lignocellulosic material experience less swelling and are therefore more suitable for outdoor or humid environments. Accordingly, for boards that exhibit less than 20% swelling over 24 hours the lignocellulosic material:binder ratio comprises a range of approximately 90:10 to 85:15.

Composite boards may be designed to achieve certain minimum strength standards. Example 2B and 12 provide exemplary binder compositions comprising varying levels of cross-linker, thermoplastic dispersion and lignocellulosic material. The modulus of elasticity of a composite board prepared using a thermoplastic dispersion prepared according to the methods described herein is at least 1000 MPa when measured according to ASTM D1037 or EN310. This provides boards suitable for lightweight usage. In alternative examples where stronger boards are required, a composite board may have an MoE of greater than 1200, 1400 or 1600 depending on the end use requirements. Example 2B provides an example of composite boards meeting these strength requirements with varying levels of cross-linker. In examples, the binder comprises thermoplastic dispersion at between 70 to 95% and cross-linker at between 5 to 30%. In another example the binder comprises thermoplastic dispersion at 85-94%, and cross-linker at between 6 and 15%. Where composite boards are prepared according to the methods described herein, the binder may comprise between about 5 to 20% of a composite mixture used to prepare a composite board, the remainder being comprised of lignocellulosic material. In alternative examples, the binder comprises between about 8 and 15% of a composite mixture, the remainder comprising lignocellulosic material such as wood chip.

Combining the binder with a fibre such as a lignocellulosic material may be achieved in a number of ways including mixing with a paddle mixer, mixing by tumbling, and/or spraying of the binder while mixing. The preparation of a thermoplastic dispersion as described herein provides enhanced mixing and resultant board properties compared to simply mixing size-reduced thermoplastic with a cross-linker and lignocellulosic substrate.

In one example, the cross-linker may be added in the form of a powder or another form of solid. The cross-linker is typically added in a small amount to the extruder/TSE and so may be added to the TSE in liquid form, that is, solubilised in water.

Following the addition of the cross-linker, additional water may be added to the TSE.

Where the cross-linker is a non-participant cross-linker such as an organic peroxide, the emulsion may be dried to a water content of less than about 3% by weight.

Where the cross-linker is a participant cross-linker such as an isocyanate, then drying may not be required. That is isocyanates are more aqueous tolerant compared to organic peroxide cross-linkers. The presence of increased water may provide a benefit of heat transfer in the board making process. The isocyanate containing emulsion may have a solids content of about 30, 40, 50, 60 or 70% by weight, and suitable ranges may be selected from between any of these values. In some preferred embodiments the isocyanate containing emulsion may have a solids content of about 50, 55, 60, 65, or 70% by weight, and suitable ranges may be selected from between any of these values. In some embodiments additional water may be used. For example, additional water may be added to dilute the emulsion immediately prior to board making. The addition of water may allow the viscosity to be controlled.

The binder mix comprises at least a thermoplastic dispersion and a cross-linker and may be used in the manufacture of a plastic composite, such as a panel or board. Where the plastic composite is mixed with a fibre such as a lignocellulosic substrate/material, the board may be selected from fibreboard, oriented strand board, wafer board, particle board, softboard, MDF and/or hardboard In alternative examples the binder material is used in the preparation of a composite material comprising a fibre selected from the group consisting of fibre-reinforced polymers (FRPs), glass fibre-reinforced polymer (GFRP or fibreglass), carbon fibre-reinforced polymer (CFRP), aramid fibre-reinforced polymer (AFRP e.g. Kevlar), particle-reinforced composites, polymer cement and concrete, metal matrix composites (MMCs), laminated composites, plywood, laminated safety glass, adhesive-based composites joints or laminates. In an alternative embodiment, the binder may be used as an adhesive with or without combining it with a fibre/substrate.

The composite boards as described may meet an industry need to make use of recycled and waste plastic feedstocks. Further, they composite boards also provide greater durability and water resistance. In particular, using isocyanate cross-linkers integrated into a thermoplastic polymer matrix form bonds through a reaction that is essentially non-reversible. This results in a more durable and moisture-resistant bond, which is particularly advantageous in applications where exposure to wet or humid conditions is expected. Isocyanate-theroplastic binders provide enhanced resistance to water and humidity, ensuring the longevity and integrity of the bond in challenging environments.

The cross-linker may be added in the form of a powder or another form of solid. When added directly to an extruder/TSE, the cross-linker is typically added in a small amount in liquid form, that is, solubilised in water. Following the addition of the cross-linker, additional water may be added to the extruder/TSE.

Where the cross-linker is a non-participant cross-linker such as an organic peroxide, the emulsion may be dried to a water content of less than about 3% by weight.

Where the cross-linker is a participant cross-linker such as an isocyanate, then drying may not be required. That is isocyanates are more aqueous tolerant compared to organic peroxide cross-linkers. The presence of increased water may provide a benefit of heat transfer in the board making process. The isocyanate containing emulsion may have a solids content of about 30, 40, 50, 60 or 70% by weight, and suitable ranges may be selected from between any of these values. In some preferred embodiments the isocyanate containing emulsion may have a solids content of about 50, 55, 60, 65, or 70% by weight, and suitable ranges may be selected from between any of these values. In some embodiments additional water may be used. For example, additional water may be added to dilute the emulsion immediately prior to board making. The addition of water may allow the viscosity to be controlled.

Achieving a target moisture content in binders and composite boards prepared according to the methods described herein may be important in determining binding and strength. Cross-linkers such as isocyanates and organic peroxides are highly reactive chemicals and can react with, or be inhibited by hydroxyl groups present in lignocellulosic fibres. For example isocyanate (—NCO) groups reacting with the hydroxyl group (—OH) to create urethane bonds (—NHCOO—). The moisture content in wood fibres affects the availability of these OH groups. If the wood fibers are too dry, there may not be enough moisture to facilitate the reaction with isocyanates, leading to poor bonding and reduced board quality. Therefore it is particularly important to match the moisture content of the board to the type of cross-linker being used.

The moisture content of the pre-press composite mixture containing isocyanate may be greater than about 5%. This helps ensure that the isocyanate has sufficient binding capacity.

Example 13 describes the preparation of composite mixtures comprising between about 8% and 14% moisture content.

Further, following experimental verification, it has been found that boards comprising a composite mixture produced in a press should have a total pre-press moisture content of less than about 15%. Preferably the pre-press moisture content is less than 12% or 13%. This minimizes the risk of issues like excessive board expansion or warping during pressing and curing. Excessive steam produced in the board leads to bubbles and which can lead to failure. Accordingly, the total pre-press moisture content of a composite mixture may comprise between about 5% to about 15%.

Described is a composite mixture comprising isocyanate cross-linker, lignocellulosic substrate and a thermoplastic dispersion described herein, where the moisture content of the board is between 5 and 15%

Unconditioned lignocellulosic materials such as wood chip often has a moisture content of from 8-12%. Taking this into account, a binder comprising cross-linker plus thermoplastic dispersion preferably comprises less than 45% moisture content.

The inventors have found that higher moisture contents can compromise binding. Accordingly, when the cross-linker comprises an organic peroxide, the total board moisture content may comprise less than 10%. When using binder at 10% of the composite mixture, and organic peroxide at 5% of binder formulation, the moisture content of the thermoplastic dispersion is preferably reduced to below 1% to achieve effective binding.

The method for making a thermoplastic composite board broadly includes the steps of introducing a composite mixture into a press or mould that contains the binder and fibrous or particulate lignocellulosic material. The composite mixture may comprise about 4% to about 30% by weight of the binder, the remainder being provided by the lignocellulosic material-being a fibrous or particulate substrate. The examples provide several examples of different binder and composite mixture ratios.

It will be appreciated by the person skilled in the art that a press or mould may include any apparatus which applies heat and/or pressure to produce a flat or shaped solid product. Non-limiting examples of a press or mould may include a 3-D mould capable of producing complex 3-dimensional product, an injection mould, compression mould, transfer mould or rotational mould.

In another example, the thermoplastic dispersion or binder described herein may be used as a resin in other applications such as 3D printing.

Binders of the invention may be combined with a fibre to produce a composite board. In one example the fibre comprises a lignocellulosic material. The lignocellulosic material or fibrous or particulate substrate may comprise wood (such as sawdust, wood fibre, wood particles, wood chips or wood sheets), coconut husk, rice straw or husk, barley straw, or bamboo. The selection of the lignocellulosic material or fibrous or particulate substrate will define the nature and use of the composite material product.

Examples provided herein describe several instances of the preparation of composite board using wood fibre. In addition, Example 11 describes the preparation of composite boards using a variety of other lignocellulosic materials.

For plywood and glulam style wood products, the wood may be in the form of sheets, that are glued to one another through the use of the binder. In this case the sheets of wood may have at least one dimension that is greater than about 1 m in length.

For other products, such as oriented strand board, wafer board, particle board, softboard, MDF or hardboard, the lignocellulosic-based material/substrates may have at least one dimension (such as the major dimension) less than 500 mm in length. For example an oriented strand board may comprise a lignocellulosic-based material/substrate in which the major dimension is between about 50 mm to about 500 mm. A wafer board may comprise a lignocellulosic-based material/substrate in which the major dimension is between about 10 mm to about 50 mm. A particle board may comprise a lignocellulosic-based material/substrate in which the major dimension is between about 1 mm to about 15 mm. Softboard, MDF and hardboard may comprise a lignocellulosic-based material/substrate in which the major dimension is between about 1 mm and 5 mm.

In relation to lignocellulosic-based material/substrates, the substrate may be sourced from a range of different lignocellulosic-based material products. For example, a fine grade of lignocellulosic-based material/substrate may have an average particle size of about 0.5, 1, 1.5, or 2 mm, and suitable ranges may be selected from between any of these values (for example, about 0.5 to about 2, about 0.5 to about 1.5, about 0.5 to about 1, about 1 to about 2, about 1 to about 1.5 or about 1.5 to about 2 mm). For example, the fine grade of lignocellulosic-based material/substrate may be sourced from sawdust, or wood flour. It will be appreciated that any source that results in a lignocellulosic-based material/substrate having an average particle size as defined above may be appropriate for use. For example, the use of grinding such as the use of a hammer mill. A grinder system may control the size of the particles produced through the use of grinder screens, which are screens having a mesh with set perforation sizes.

The lignocellulosic-based material/substrate may be a coarser grade of substrate having an average particle size of about 1, 2, 3, 4, 5, 6, 7, 8, 9, 10, 11, 12, 13, 14 or 15 mm, and suitable ranges may be selected from between any of these values (for example, about 1 to about 15, about 1 to about 13, about 1 to about 10, about 1 to about 8, about 1 to about 5, about 2 to about 15, about 2 to about 14, about 2 to about 10, about 2 to about 6, about 3 to about 15, about 3 to about 12, about 3 to about 9, about 4 to about 15, about 4 to about 11, about 4 to about 8, about 5 to about 15, about 5 to about 13, about 5 to about 10, about 6 to about 15, about 6 to about 12, about 6 to about 10, about 6 to about 8, about 7 to about 15, about 7 to about 11, about 8 to about 15, about 8 to about 13, about 9 to about 15, about 9 to about 12 or about 10 to about 15 mm). For example, the coarser grade of wood-based substrate may be sourced from wood chips and wood pellets.

When defining the size of the lignocellulosic material particles as the "average particle size" it will be appreciated that lignocellulosic material particles are not uniform in size. Given lignocellulosic material particles are often irregular in shape the average particle size refers to the length of the longest axis.

A conventional method to obtain the particle size distribution is mechanical sieving. American Society of Agricultural and Biological Engineers (ASABE Standard S424.1, 2007) developed the mechanical sieving method as a standard particle size analysis for biomass particles. Mechanical sieving determines the mass percent of particles retaining on each sieve. However, since particles pass through the sieves based on their width the length of the particles is ignored in a sieving process. Given the particles may be mostly irregular and heterogeneous in size and shape two particles that pass through the same sieve may have different shapes.

Rather than the conventional mechanical sieving approach, advanced techniques such as machine vision are able to analyse particle size and shape using image analysis techniques. Image analysis is a practical method to determine the actual dimensions and shape of single particles. Image analysis is not subjective and is repeatable over the same picture.

Another method to characterise the size of lignocellulosic material particles may be to look at the bulk density of a product. Smaller particles will rearrange themselves to a more efficient packing condition thus having a higher bulk density. For example, the bulk density of wood sawdust is about 370 $kg/m^3$ to about 415 $kg/m^3$.

If a lignocellulosic material-composite product is desired then the substrate may include both a fine and coarse wood substrate as mentioned above. The board is formed by first preparing a fine mixture and a course mixture. The fine mixture is prepared by mixing the fine wood fibre with the binder that comprises functionalised thermoplastic and cross linker. The coarse mixture is prepared by mixing the coarse lignocellulosic material fibre with the binder, that comprises functionalised thermoplastic and the cross linker.

When forming a board the board may be formed by first layering the fine composite mixture in the base of the mould, then the coarse composite mixture and then the fine composite mixture on top to sandwich the coarse mixture. The prepared composite material is then pressed under pressure and temperature. In some embodiments the ratio of fine composite mixture to coarse composite mixture is about 20:80 to 80:20. It will be appreciated that when the fine composite mixture is prepared that it can be divided into use as the top and bottom layer. Typically the ratio of division is from 40:60:60:40, and about 50:50 is preferred.

The ratio of coarse composite mixture to the fine composite mixture may be between 20:80 to 80:20 as mentioned above, and a ratio of 40:60 to 60:40 are also contemplated.

In one preferred embodiment the board is formed from 20% by weight fine composite mixture, 60% by weight of the coarse composite mixture and then 20% by weight of the fine composite mixture.

In relation to a plywood style composite product, the binder is placed between the sheets, for example by spraying or spreading of the binder.

The composite material is formed as a mat in a press. The mat may be subjected to pre-compression in a continuous press or a separate stage in a non-continuous press to make the mat more compact prior to placement in a hot press. The thickness of the composite material decreases under pressure such that the cured final product may be about 10, 15, 20, 25, 30 or 35% of the thickness of the original composite material mixture prior to pressure and heat.

The pressure applied to the composite mixture may be about 3, 4, 5, 6, 7, 8, 9 or 10 MPa, and suitable ranges may be selected from between any of these values (for example, about 3 to about 10, about 3 to about 9, about 3 to about 7, about 3 to about 6, about 3 to about 5, about 4 to about 10, about 4 to about 8, about 4 to about 6, about 5 to about 10, about 5 to about 8, about 5 to about 7, about 6 to about 10, about 6 to about 9 or about 7 to about 10 MPa).

The temperature of the press or mould is such that the composite material is heated to about 100 to about 220° C. This is a temperature sufficient to melt the binder allowing it to coat and bind the substrate and form the product. In some embodiments some thermoplastic within the binder may not melt, which may be the case where the binder comprises thermoplastic contaminants. That is, while enough thermoplastic within the binder may be melted to form a continuous phase that coats the substrate, some thermoplastic in the binder may remain unmelted and remain as a particulate in the composite material.

Several factors can influence the hot-pressing process, including press temperature, moisture content (MC) of the mat, press closing speed, characteristics of the resin, and the type of wood chip particles. The rate at which the press temperature increases notably impacts the adhesive curing rate. This not only affects the total press time but also plays a crucial role in creating a vertical density gradient within the material. Among these factors, mat moisture content significantly affects heat transfer within the mat. The speed at which heat penetrates the mat determines the required press time. Higher MC in mats necessitates more energy for water vaporization.

It will be appreciated that the top and bottom fine mixture layers may be exposed to greater heating compared to the inner coarse mixture layer. Given this, the functionalised thermoplastic used in the binder of the fine mixture may comprise functionalised thermoplastics having a higher melting point compared to the plastic used in the binder for the coarse mixture (used in the middle layer of the board).

Each fine layer may comprise 5, 10 or 15% of the total thickness of the mat, and suitable ranges may be selected from between any of these values.

The thermoplastic may be a mixture of low-density or high density PE and PP. The functionalised thermoplastic may comprise a small percentage of contaminant thermoplastic, The composite mixture is subjected to pressure sufficient to decrease the thickness of the composite mixture, and subsequently heating the composite mixture to about 100, 110, 120, 130, 140, 150, 160, 170, 180, 190, 200, 210 or 220° C. to form the wood composite panel, and suitable ranges may be selected from between any of these values.

A releasing agent may be applied to the surface of the press to prevent sticking of the composite to the press platens. In some embodiment the external layers of the composite may include urea formaldehyde to inhibit sticking of the composite to the press, for example the UF fine composite mixture layer referred to above.

The particle size of the thermoplastic may be smaller for the fine fibre compared to the coarse fibre. That is, to achieve effective coating of the fine fibre this may be best achieved by utilising thermoplastic particles with a finer average particle size to ensure good coating of the fine lignocellulosic material fibres.

The cross linker used between the fine mixture and the coarse mixture may be different. For example, the cross linker used in the fine mixture may be selected based on performance at higher temperatures, whereas the cross linker used in the coarse layer may be selected based on its performance at a lower temperature.

The moisture content of the fine layer may be increased relative to the coarse layer.

The composite mixture may also comprise an additive. The additive may be present in the binder. The additive may be selected from any one or more of an accelerator,
a modifier,
an activator, and/or
a catalyst.

In relation to the accelerator, the accelerator may be an amine based accelerator. More particularly the accelerator may be a toluidine based accelerator. Specifically, the accelerator may be selected from N-(2-Hydroxylethyl)-N-Methyl-para-Toluidine, ethoxylated para-Toluidine, N,N-Dimethyl-p-Toluidine, N,N-Dihydroxyethyl-p-Toluidine, Diisopropoxy-p-Toluidine or a combination thereof.

The binder may comprise 0.5, 1.0, 1.5, 2.0, 2.5, or 3.0 by weight of the binder of accelerator, and suitable ranges may be selected from between any of these values.

Without wishing to be bound by theory the accelerator increases the amount of free radicals by the cross linking agent, which increases the rate of polymerisation of the functionalised thermoplastic material to theromoset material.

The boards produced may have a modulus of elasticity (MoE) of about 1,000, 1500, 2000, 2500, 3000, 3500 or 4000 MPa, and suitable ranges may be selected from between any of these values. Static bending is often used for machine stress rating (MSR) of timber-based products. MSR is currently the most common dynamic, mechanical load procedure. Boards are fed through a machine flat wise, longitudinally and bent by rollers upwards and downwards in two sections. The span between the rollers is typically around 1.2 m. Depending on the design, the machine bends the boards to a constant deflection and measures the required force or the machine bends the boards with a constant force and measures the deflection. Using the load deflection relationship, the local MOE can be determined directly by using equations sourced from fundamental mechanics of material on every point of the board except for approximately the first and last 500 mm. This test method allows the stiffness profile of a board to be determined.

The composite boards produced have a Modulus of Rupture (MOR) of about 5, 10, 15, 20 or 25 Mpa, and suitable ranges may be selected from between any of these values. The MOR (sometimes referred to as bending strength), is a measure of a specimen's strength before rupture. It can be used to determine a wood-based products overall strength; unlike the modulus of elasticity, which measures the wood's deflection, but not its ultimate strength. The MOR "sigma" can be calculated using the equation σr=3Fx/yz2 for the load force F and size dimensions in three directions, x, y and z, of the material. In this case, the load is the external force put on the material of interest. The load force is applied to the centre of the composite product of the material elevated slightly above ground.

In some embodiments the composite product as a surface screw holding of about 200, 250, 300, 350, 400, 450 or 500 N, and suitable ranges may be selected from between any of these values (for example, about 200 to about 500, about 200 to about 400, about 200 to about 300, about 250 to about 500, about 250 to about 450, about 250 to about 350, about 300 to about 500, about 300 to about 450, about 350 to about 500, about 350 to about 450 N).

The density of the composite board can be controlled by the degree of compression applied in the press or mould. For example, a lower pressure can be used to provide a low density composite board having a density of about 550, 560, 570, 580, 590, 600, 610, 620, 630, 640 or 650 $kgm^3$, and suitable ranges may be selected from between any of these values.

A greater pressure can be used to provide a mid-density composite board having a density of about 650, 700, 750 or 800 $kgm^3$, and suitable ranges may be selected from between any of these values.

A greater pressure can be used to provide a high density composite board having a density of about 800, 850, 900, 950, 1000, 1050 or 1100 $kgm^3$, and suitable ranges may be selected from between any of these values.

In particleboards made from lignocellulosic fibres, moisture resistance is important to prevent the material from swelling, warping or otherwise deforming. Swelling may lead to a loss in structural integrity, performance and/or durability.

Wood in particular is hydrophilic and when wood fibre or other hydrophilic fibres are used in humid or wet environments, they can absorb water which degrades the material.

Addition of a hydrophobic compound (i.e. a hydrophobe) to the board can increase the moisture resistance of the board and prevent swelling, deformation and the development of mould or rot. The hydrophobe can either be applied to the surface of the board or added to the wood fibre during the manufacturing process.

Common hydrophobes used in board manufacture include natural or synthetic waxes, silicone based compounds and fatty acids and salts (such as stearate). The most common types of waxes used are paraffin wax, slack wax and microcrystalline wax. Typically, where a wax is used to impart moisture resistance in industrial wood fibre board production, it is added at an amount of 0.75% of the total weight of the board. Where a wax is used to impart moisture resistance in particle board production, it is typically added at an amount of 0.5% to 1.5% of the total weight of the board Paraffin wax is a cost-effective and readily available material that can be easily emulsified and sprayed onto wood fibres. It provides effective moisture resistance, reducing thickness swelling and improving dimensional stability. However, paraffin wax has limited thermal stability, which can lead to degradation at high temperatures, potentially affecting its performance during the hot pressing of particleboards. Additionally, it can interfere with the bonding of resins to wood fibres, potentially reducing the internal bond strength of the board.

Slack wax, being less refined than paraffin wax, offers better adhesion properties. It also provides good moisture barrier properties similar to paraffin wax and is relatively inexpensive and widely used in the industry. However, slack wax can have inconsistent quality and composition, leading to variable performance. Like paraffin wax, it also has lower thermal stability and can degrade at high temperatures, impacting its effectiveness during board production.

Microcrystalline wax, on the other hand, has a higher melting point and better thermal stability compared to paraffin and slack wax, making it more suitable for high-temperature processing. It provides improved flexibility and toughness, enhancing the overall durability of the particleboard. Microcrystalline wax offers superior moisture resistance, significantly reducing swelling and improving dimensional stability. However, it is more expensive than paraffin and slack wax, which can increase the production cost of particleboards. Additionally, it may require more complex emulsification processes and equipment for effective application.

When isocyanate and urea formaldehyde-based adhesives are used in conditions exhibiting higher humidity, these resins are usually modified with significantly more expensive compounds such as melamine, phenol or resorcinol (see A. Pizzi (2014). Synthetic adhesives for wood panels: chemistry and technology—a critical review Rev. Adhes. Adhes., 2, pp. 85-126). Addition of wax to isocyanate and urea-formaldehyde particle boards has previously been reported to detrimentally affect internal bonding (see Papadopoulos, A. N. (2006). Property Comparisons and Bonding Efficiency of UF and PMDI Bonded Particleboards as Affected by Key Process Variables. *BioResources,* 1(2), 201-208).

The thermoplastic dispersion of the present disclosure may be used as a hydrophobe. That is the thermoplastic dispersion of the present disclosure may increase the moisture resistance of the board without compromising the strength of the board. In one example the board does not include a moisture resistance compound (such as a wax) other than the thermoplastic dispersion as described herein.

In one example, the use of the thermoplastic dispersion produces a composite product that exhibits a 24 hour swell of less than about 15%, 14%, 13%, 12%, 11%, 10% when tested by a 24 hour swell test. A 24 hour swell test is also called a soak test. An example of a soak test is given by British Standard EN 317-1993: Particle Boards & Wood Fibre Boards—Determination of Swelling after Immersion in Water. The soak test specifies a method of determining the swelling in thickness of flat-pressed particleboards and fibre boards. Swelling in thickness is determined by measuring the increase in thickness of a test piece after complete immersion in water for 2 hours (indicative result) and 24 hours (final result). Water absorption by weight and volume are determined by measuring the increase of weight and volume after complete immersion of test pieces in water for 2 hours (indicative result) and 24 hours (final result).

A method of carrying out the soak test (swell test) is now described, as carried out in the Examples described below. Two test pieces are taken from each board. An example of suitably sized test pieces as used for the swell tests described herein is 50×50 mm±1 mm. As carried out, a hole is drilled (e.g. 3.5 mm hole) near the edge of the test piece with a drill press. The hole is to be able to submerge the samples in the water. The test pieces are conditioned to constant mass in an atmosphere with relative humidity of 65±5% and a temperature of 20±2° C. Constant mass is achieved when the result of two successive weighing operations, carried out at a 24 hr interval, differ by no more than 0.1%. The weight of each test piece ($m_1$) is measured as well as the thicknesses at four points midway along each side using callipers to calculate an average thickness ($t_1$). The width and length of each sample was measured using callipers allowing calculation of the volume ($v_1$). The test pieces are submerged in a thermostatically controlled water bath by hanging the test pieces on a metal wire attached to a steel rod and ensuring that the test pieces are covered by at least 25±5 mm water. The temperature of the water should be maintained at 20±1° C. for the duration of the procedure. After 2 hours, the samples are taken out of the water bath and excess water removed. The weight, thickness and volume of each test piece ($m_2$, $t_2$, $v_2$) is measured in a same way as described above. The test pieces are then re-submerged and after a further 22 hours the test samples are removed from the water bath and excess water removed. The weight, thickness and volume of each test piece ($m_3$, $t_3$, $v_3$) is measured in a same way as described above.

The Swelling in Thickness (TS) for 2 hours ($TS_{2\,h}$) and 24 hours ($TS_{24\,h}$) is calculated according to percentage of original thickness according to the following formulae:

$$TS_{2h} = \frac{t_2 - t_1}{t_1} \times 100$$

$$TS_{24h} = \frac{t_3 - t_1}{t_1} \times 100$$

Where $t_1$ is the thickness of the test piece before immersion, in millimetres $t_2$ is the thickness of the test piece after 2-hour immersion, in millimetres $t_3$ is the thickness of the test piece after 24-hour immersion, in millimetres The Water Absorption by Volume (WA) for 2 hours ($WA_{2\,h}$) and 24 hours ($WA_{24\,h}$) is calculated according to the following formulae:

$$WA_{2h} = \frac{v_2 - v_1}{v_1} \times 100$$

$$WA_{24h} = \frac{v_3 - v_1}{v_1} \times 100$$

Where $v_1$ is the volume of the test piece before immersion, in cubic millimetres ($mm^3$)

$v_2$ is the volume of the test piece after 2-hour immersion, in cubic millimetres ($mm^3$)

$v_3$ is the volume of the test piece after 24-hour immersion, in cubic millimetres ($mm^3$ The Water Absorption by Weight (WA) for 2 hours ($WA_{2\,h}$) and 24 hours ($WA_{24\,h}$) is calculated according to the following formulae:

$$WA_{2h} = \frac{m_2 - m_1}{m_1} \times 100$$

$$WA_{24h} = \frac{m_3 - m_1}{m_1} \times 100$$

Where $m_1$ is the weight of the test piece before immersion, in grams $m_2$ is the weight of the test piece after 2-hour immersion, in grams $m_3$ is the weight of the test piece after 24-hour immersion, in grams As shown in Example 14, boards made with the binder showed reduced swelling in the 24 hour swell test compared to the board made with just isocyanate, even when wax was applied to the board. In relation to the boards made without thermoplastic dispersion, the board with wax applied to the surface had reduced internal bond strength. However, in relation to the boards made with binder, the internal bond strength was identical.

As shown in example 15, the moisture resistance of the board increased with increasing amount of thermoplastic dispersion.

The composite products as described may have a variety of applications in industry.

For example, the moisture-resistant composite products as described may exhibit enhanced durability and stability in humid or wet conditions.

In some examples, such as in the construction and building sector, these products may be provided as composite boards for use as exterior sheathing, providing additional insulation and moisture protection, roof underlay, or acting as a protective layer beneath roofing materials to improve weather resistance. These composite products may serve as a stable and durable base layer for subflooring beneath finished flooring, particularly in areas prone to moisture exposure such as bathrooms and kitchens. Additionally, these composite boards may be utilised in both interior and exterior wall constructions to enhance moisture resistance and structural integrity.

In some examples, such as furniture and cabinetry, the moisture-resistant products may be used in the construction of kitchen cabinets. Kitchen cabinets may frequently be exposed to high humidity and occasional water contact, and bathroom vanities, where resistance to moisture and humidity is essential. Such moisture-resistance products may also be suitable for outdoor furniture, such as garden furniture and decking, due to their ability to withstand exposure to the elements.

In some examples, such as in the packaging industry, moisture-resistant products may be used for protective packaging materials to safeguard goods during transportation and storage. Industrial applications may include their use in the construction of shipping containers and pallets that must endure moisture and rough handling, as well as in soundproofing panels, where moisture resistance contributes to product durability.

In some examples, such as in retail environments, moisture-resistant products may be used in the construction of store fixtures, such as display units and shelving, where they may be exposed to varying humidity levels. Special applications include outdoor signage and display boards that require moisture resistance for longevity, as well as certain types of sports equipment, such as skate ramps and other outdoor sporting structures, where moisture resistance is important.

The moisture-resistant products as described may exhibit versatile and enhanced properties making them suitable for numerous applications where traditional wood fibre boards would not be adequate due to their susceptibility to moisture damage.

There are current standards for moisture resistant wood fibre boards such as the European standard EN 312. European standard EN 312. P3 boards are designed for use in humid conditions as non-load-bearing elements. The P3 classification ensures that the wood fibre boards are suitable for indoor use in humid environments such as kitchens, bathrooms, or utility rooms where moisture levels are higher than in standard living areas. Key features and requirements of P3 boards include:

Moisture Resistance: P3 boards have enhanced moisture resistance compared to standard boards, making them suitable for use in environments where they may be exposed to higher humidity levels but not in direct contact with water.

Internal Bond Strength: P3 boards must meet specific internal bond strength requirements, ensuring they maintain structural integrity under humid conditions.

Swelling in Thickness: The standard sets limits on the swelling in thickness after exposure to moisture, indicating that P3 boards should not swell excessively when exposed to moisture.

Bending Strength (MOR) and Modulus of Elasticity (MOE): P3 boards have defined requirements for bending strength and modulus of elasticity to ensure they can withstand the stresses encountered in humid conditions without deforming or breaking.

In some examples, the moisture-resistant products as described meet the P3 standard as set out above.

EXAMPLES

Standard Methodology

Unless stated otherwise, the following testing methods and board properties were used in the examples provided below:

TABLE 1

Standard methodologies used in the present invention.

| Property | Test Based on |
|---|---|
| Density | ASTM D1505 |
| Melt flow index (190 °C/2.16 kg) | ASTM1238 |
| Melting temperature (°C) | ISO11357 |
| Composition of polymer | ISO11357 |
| Acid number | ASTM 974 |
| Degree of cross-linking (wt %) | ASTM D2765 |
| Modulus of elasticity (MOE) | EN310 |
| Modulus of rupture (MOR) | EN310 |
| Internal bond strength | EN319 |
| Soak/swelling in thickness | EN317 |
| Board Size | 450 × 450 mm |
| Board Thickness | 15 mm |
| Target Board Density | 620 kg/m3 |
| Target Moisture Content in composite mixture | 10-12% |

Example 1—Thermoplastic Polymer Characterisation

Aim

Analyses of various as-received thermoplastic polymers were carried out to understand their composition and identity. This characterisation is an important first step when using unknown waste/recycled plastics, especially where downstream processes (for example catalysis, functionalisation, and emulsification) are sensitive to the feedstock identity and composition.

Methodology

FTIR Analysis

Post-industrial recycled LDPE (Astron), post-agricultural recycled LLDPE (Bale wrap or r-LLDPE), post-construction recycled LDPE (building wrap or r-LDPE) and post-consumer recycled LLDPE (p-LLDPE) were analysed to assess the amount of PE and other polymers. Measurements were performed using the PerkinElmer Spectrum Two FT-IR fitted with a diamond ATR accessory according to manufacturer's instructions. Four scans were averaged at 450-4000 wavenumbers ($cm^{-1}$) with a resolution of 1 $cm^{-1}$. For each blend, Five different thin films prepared from randomly selected pellets were measured. Data was processed using PerkinElmer Spectrum IR software and the peak areas were analysed. The data for recycled polymers was compared to FTIR spectra of virgin LDPE.

The peaks corresponding to $CH_3$ bend and $CH_2$ bend between 1350 $cm^{-1}$ and 1380 $cm^{-1}$ were deconvoluted and analyzed to determine the variation between LLDPE and LDPE.

Differential Scanning Calorimetry

Differential scanning calorimetry (DSC) analysis was carried out for 2-4 mg of cut polymer pellets using a PerkinElmer DSC4000. Each sample was subjected to an initial heating and cooling cycle to remove thermal history. The samples were then analyzed using the following thermal program: hold for 1 minute at 30° C., heat from 30° C. to 140° C. at 20° C. per minute, then cool from 140° C. to 30° C. at 20° C. per minute, hold for 1 minute. The peaks were then integrated using Pyris software. The peak melting temperature, melting enthalpy, peak crystallization temperature and the crystallization enthalpy were recorded.

The following samples were analysed:

TABLE 2

Plastic Samples analysed

| Sample no. | Material | Form |
|---|---|---|
| 1A | Virgin LDPE (LD 104BR from ExxonMobil) | Pellets |
| 1B | Post-construction film (building wrap, r-LDPE) | Pellets |
| 1C | Post-agricultural LDPE film (Bale wrap, r-LLDPE) | Pellets |
| 1D | Post-consumer printed LLDPE (p-LLDPE) | Pellets |
| 1E | Post-industrial recycled LDPE (Astron) | Pellets |

Results

Results and conclusions relating to each plastic are provided below:

1A—Results—Virgin LDPE (Exxon Mobil LD104BR) Pellets

TABLE 3

Properties of sample 1a Virgin LDPE from Exxon Mobil (LD104BR)

| Property | Value |
|---|---|
| Melt-flow index (g/10 mins) | 1.8 |
| Melting temperature, $T_m$ (°C) | 114.3 |
| Melting Enthalpy, DH (J/g) | 113.5 |
| Composition of polymer | LDPE |

FIG. 1*a* shows DSC analysis of virgin LDPE.

The FTIR spectrum exhibits the characteristic peaks for LDPE. The melting peak in the DSC curve is at 114.3° C. and is of broad nature. This peak is indicative of LDPE with non-uniform chain length.

1B—Results—Post-Construction Film (r-LDPE) Analysis

TABLE 4

Properties of sample 1B post-construction film

| Property | Value |
|---|---|
| Melt-flow index (g/10 mins) | 0.335 |
| Melting temperature, $T_m$ (°C) | 110.7 |
| Melting enthalpy, DH (J/g) | 89.7 |
| Composition of polymer | Primarily LDPE |

Figure 1B:
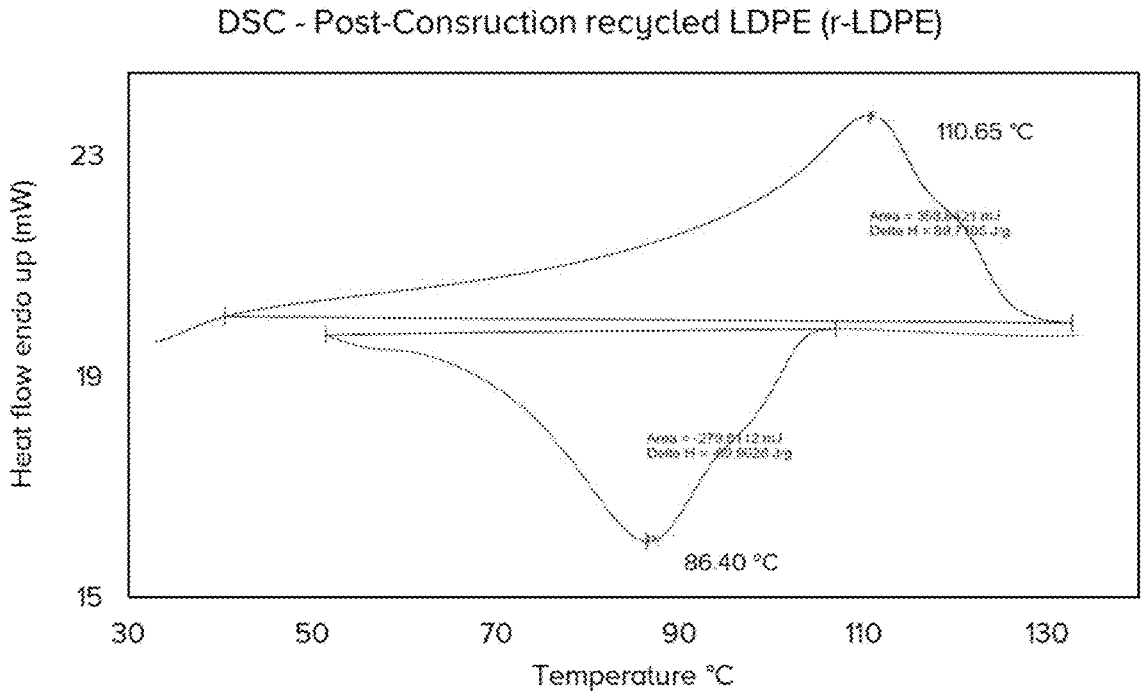
FIG. 1*b* shows the DSC spectrum of post-construction rPE film.

FIG. 1*b* shows DSC analysis for post-construction rPE film.

The FTIR spectrum for post-construction film showed that the sample is primarily composed of LDPE. Broad, singular melting peak in the DSC curve at 110.7° C. is indicative of LDPE with a non-uniform chain length. No MDPE, HDPE or PP contamination visible.

1C—Results—Post-Agricultural Film (Bale Wrap) Analysis

TABLE 5

Properties of sample 1C post-agricultural film (r-LLDPE)

| Property | Value |
|---|---|
| Melt-flow index (g/10 mins) | 0.97 |
| Melting temperature, $T_m$ (°C) | 122.0 & 111.5 |
| Melting enthalpy, DH (J/g) | 78.94 |
| Composition of polymer | Primarily LLDPE |

Figure 1C:
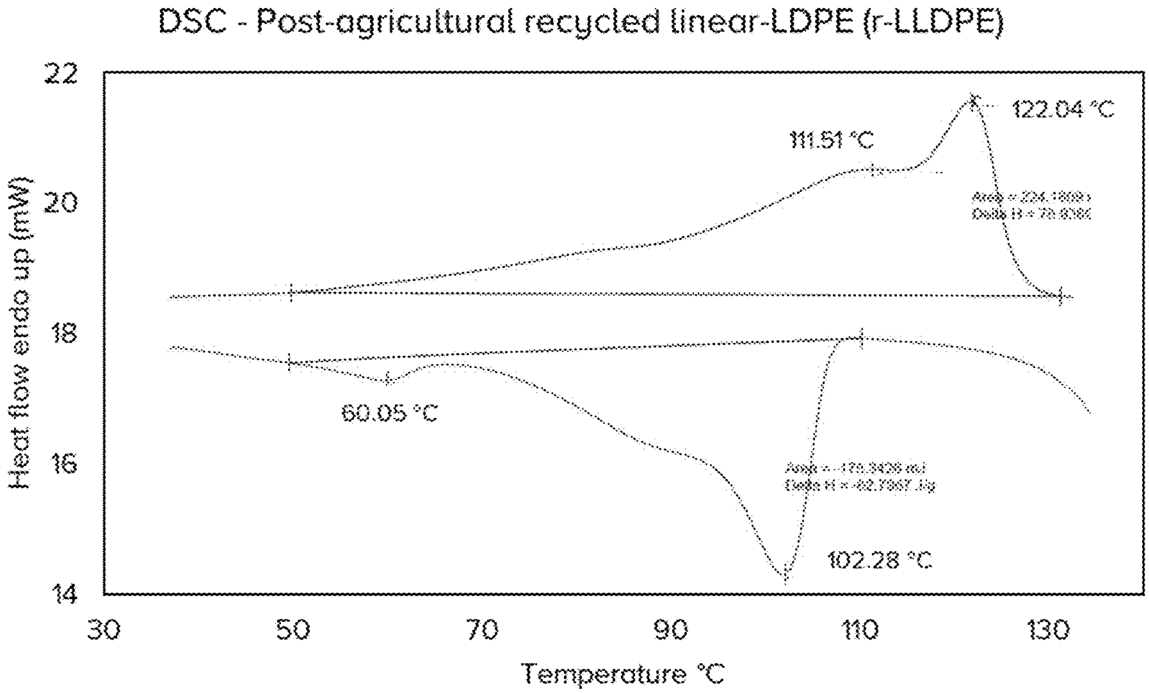
FIG. 1*c* shows the DSC spectrum of post-agricultural r-PE film.

FIG. 1*c* shows DSC analysis of bale wrap post-agricultural r-PE film.

The FTIR spectrum indicated that bale wrap is composed of primarily of LLDPE. The first melting peak in the DSC curve is at 122° C. is indicative of LLDPE. The second peak at 111.5° C. is indicative of LDPE.

1D—Results—Post-Consumer Printed Recycled LLDPE (p-LLDPE)

TABLE 6

Properties of sample 1D post-consumer printed recycled LLDPE (p-LLDPE)

| Property | Value |
|---|---|
| Melt-flow index (g/10 mins) | 0.2 |
| Melting temperature, $T_m$ (°C) | 111.6 and 124.7 |
| Melting enthalpy, DH (J/g) | 102.43 |
| Composition of polymer | Primarily LLDPE |

Figure 1D:
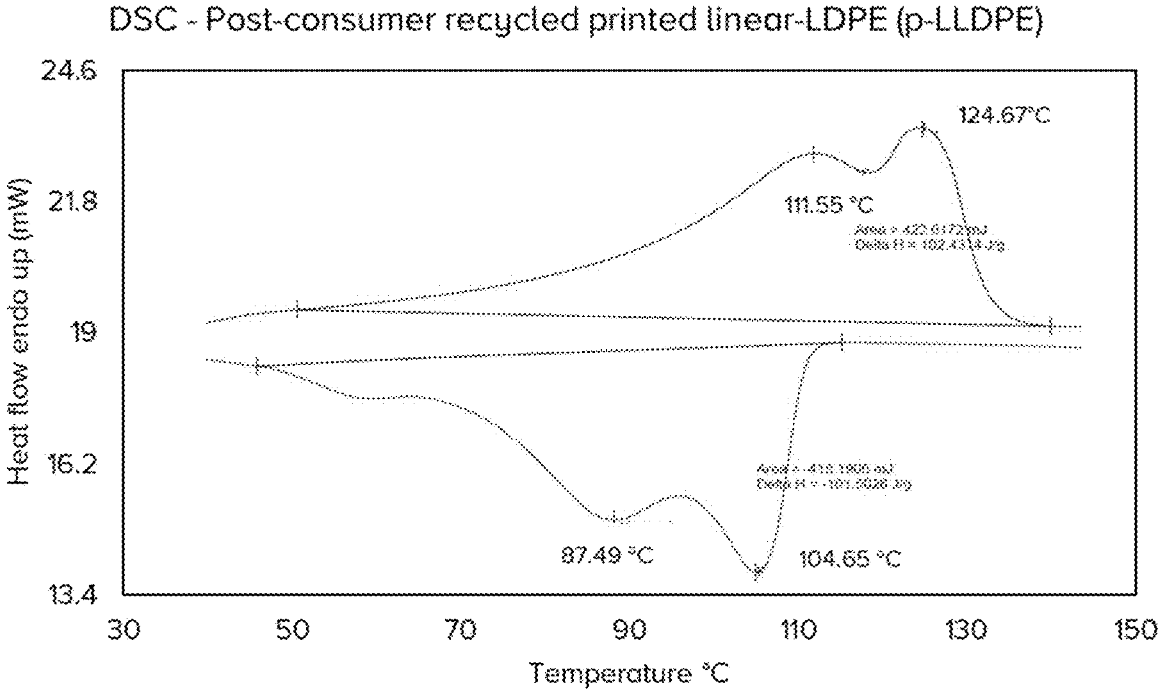
FIG. 1*d* shows the DSC spectrum of post-consumer recycled printed LLDPE.

FIG. 1*d* shows the DSC of p-LLDPE.

The first melting peak in the DSC curve is at 124.7° C. is indicative of LLDPE. The second peak at 111.5° 6 is indicative of LDPE. The peaks are broad indicating the p-LLDPE is composed of polymers with non-uniform chain lengths.

1E—Results—Post-Industrial Pelletised LDPE

Figure 1E:
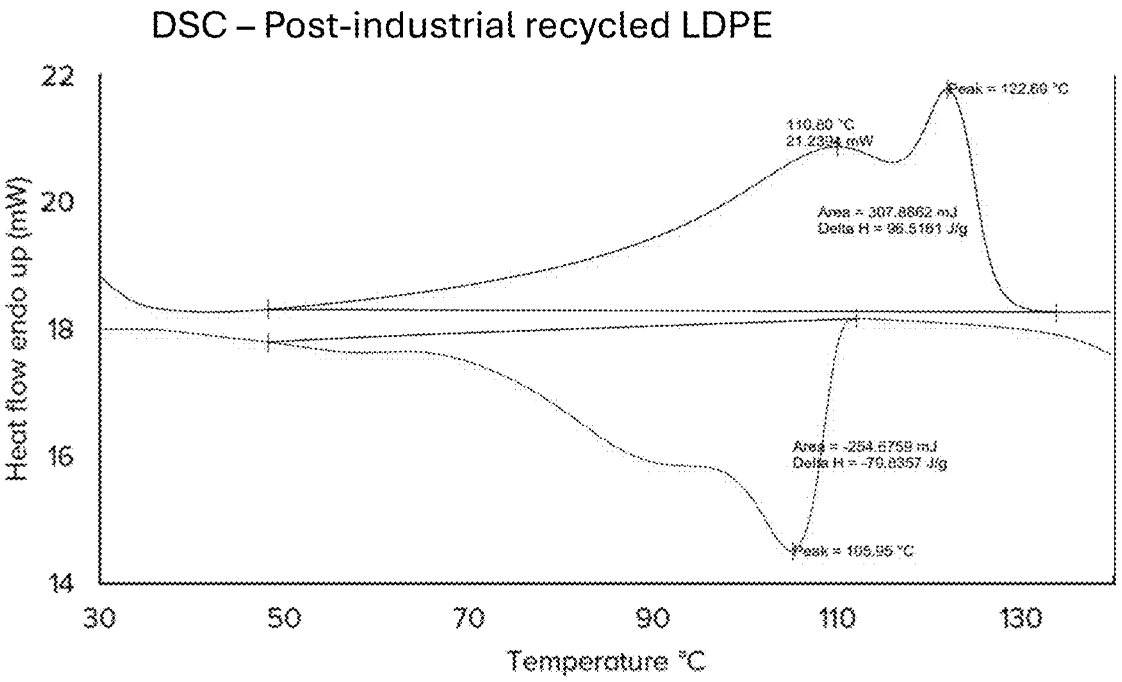
FIG. 1*e* shows DSC analysis of post-industrial pelletised LDPE.

FIG. 1*e* shows DSC analysis of sample 1E—post-industrial pelletised LDPE.

TABLE 7

| Properties of sample 1e post-industrial pelletised LDPE | |
|---|---|
| Property | Value |
| Melt-flow index (190 °C/10 mins) | 0.522 |
| Melting temperature (°C) | 106 and 125 |
| Composition of polymer | LDPE and MDPE |

The first melting peak in the DSC curve at 106° C. is indicative of LDPE. The peak is broad indicating non-uniform chain length. The second melting peak at 125° C. is sharp and indicative of medium density PE with uniform chain length. No HDPE or PP contamination visible.

Example 2A—Heat Treatment of Thermoplastic in an Extruder

This example describes the processing of thermoplastic in an extruder at a temperature well above the thermoplastic's melting temperature. The performance of the high temperature extrudate as an adhesive in wood fibre boards was also investigated.

Methodology

Recycled post-agricultural LDPE film (bale wrap (BWT)) was passed through a twin-screw extruder at several different treatment temperatures as shown below.

The following twin-screw extruder processing conditions were used with the average barrel temperature (activation temperature) being calculated based on zones 3-8.

| Set Temperature Profile (°C) | | | | | | | | | |
|---|---|---|---|---|---|---|---|---|---|
| | Z1 | Z2 | Z3 | Z4 | Z5 | Z6 | Z7 | Z8 | Die |
| BWT1 | 160 | 180 | 180 | 180 | 180 | 220 | 220 | 180 | 180 |
| BWT2 | 160 | 220 | 300 | 300 | 300 | 300 | 300 | 300 | 180 |
| BWT3 | 160 | 220 | 300 | 350 | 350 | 350 | 350 | 300 | 180 |
| BWT4 | 160 | 220 | 350 | 350 | 350 | 350 | 350 | 350 | 180 |

Heat-treated thermoplastic pellets were passed through a twin-screw extruder to prepare a thermoplastic dispersion. The extruder comprised two water injection points and surfactants were used to stabilise the emulsion. Water flow was adjusted to achieve a resin:water ratio post injection point 1 of 3.5 and a resin:water ratio post-injection point 2 of 1.3. Thermoplastic dispersion was mixed with 1% pMDI of composite mixture by weight and mixed for 10 minutes. The mixed formulation was distributed in a mold on a platen and flattened to prepare a mat with a consistent height and uniform distribution of the materials. The mat was pre-compressed with a 5-tonne force then subjected to hot pressing with a press factor of 12 and target density of 620 to produce a compressed wood fibre board. MFI of the treated bale wrap samples was measured.

Building wrap (post-construction r-LDPE film was processed according to the same parameters for BWT4 above and compared to a control building wrap sample extruded at 200° C. Mechanical tests were performed to understand the effect of heat-treated thermoplastic dispersions from recycled polyethylene-modulus of elasticity (MoE) and modulus of rupture (MoR).

Three replicate boards were produced from the different thermoplastic dispersions and their performance was tested according to the standards listed in Table 1.

Results

TABLE 8

| Processing temperatures for r-LLDPE samples extruded at different temperatures | | |
|---|---|---|
| Sample ID | Average barrel temp (°C) | MFI (g/10 min at 190 °C) |
| BWT1 | 193 | 0.816 |
| BWT2 | 300 | 0.96 |
| BWT3 | 333 | 3.33 |
| BWT4 | 350 | 3.86 |

FIG. 2A(i) shows the average MFI for samples BWT1-4 in relation to average barrel temperature. FIGS. 2A(ii) and 2A(iii) show that the boards prepared using heat-treated thermoplastic dispersion from building wrap as an adhesive significantly outperformed the control (not heat-treated to activation temperature).

MFI shows an unexpected increase at an average barrel temperature of between 30° and 333° C.

This is possible due to the high processing temperature of extrudate. These high temperatures may be causing chain scission in polymer chains which lead to a reduction in viscosity and improvements in the melt flow behaviour.

Elevated processing temperatures beyond the melting point may also accelerate the reaction rates for polymers that undergo chemical transformations during processing. Without being bound by theory, the inventors propose that the improved melt behaviour improves polymer-woodchip compatibility thereby enhancing the overall performance of the wood fibre board.

Example 2B—Wood Fibre Board Production Using Thermoplastic Dispersions of Heat-Treated Recycled LDPE and pMDI This example demonstrates the production of wood fibre boards using a thermoplastic dispersion produced from r-LDPE with pMDI as a cross-linker. Control boards using pMDI and no thermoplastic dispersion were prepared for comparison.

Methodology

Thermoplastic dispersion from heat treated recycled LDPE (building wrap pellets) was produced according to the parameters described in Example 2A. Thermoplastic dispersion and pMDI were added to woodchips to produce four replicate 450×450×15 mm wood fibre boards with a press factor of 12 sec/mm. The boards contained 10% (w/w) of thermoplastic dispersion with 1%, 2% and 3% (w/w) of pMDI. Remainder of the board was woodchip. The control boards were prepared using 1%, 2% and 3% (w/w) and woodchip without any thermoplastic dispersion. Four mechanical tests were performed to understand the effect of heat-treated thermoplastic dispersions from recycled polyethylene with pMDI as a cross-linker-modulus of elasticity (MoE), modulus of rupture (MoR), internal bonding strength (IB) and 24-hour soak test.

Results

FIGS. 2B(i) to (iv) show that the boards produced using a combination of pMDI cross-linker and heat-treated thermoplastic dispersions as binders exhibit superior performance to the control boards. The results show that using the thermoplastic dispersions from r-LDPE are effective at enhancing the board performance at all pMDI loadings.

The figures also demonstrate that incorporating the thermoplastic dispersion as a binder into the boards with 1% (w/w) pMDI as a crosslinker provides boards with performance approximately equivalent to 3% pMDI (w/w) control boards.

The example demonstrated that the addition of heat-treated waste LDPE provides a thermoplastic that enhances binding when incorporated into a wood fibre board containing pMDI cross-linker. Without wishing to be bound by theory, it appears that the superior performance of the boards containing thermoplastic dispersion is possible due to the improved compatibility of the dispersion with woodchips and pMDI. It is also possible that the thermoplastic with improved melt behaviour has been chemically activated (i.e., no longer inert) and is more efficient in dispersing through the woodchip matrix.

Example 3—Catalyst Screening

This example demonstrates the treatment of virgin LDPE extruded with various catalysts. 2.5 wt. % of catalyst(s) was added to virgin LDPE during extrusion.

Methodology

Extrudate Production

TABLE 9

Different catalysts used in this example.

| Sample ID | Catalyst |
|---|---|
| C0 | No catalyst |
| C1 | Zeolite |
| C2 | Iron (II) Oxide |
| C3 | Zinc Oxide |
| C4 | Copper powder |
| C5 | Iron (III) Sulphate |
| C6 | Copper (II) oxide |
| C7 | Zinc Acetate |
| C8 | Copper (I) Oxide |
| C9 | Copper (II) Sulphate |

Nine LDPE samples (C1 to C9) blended with different catalysts and one with no catalyst LDPE sample (C0) were processed through a twin-screw extruder at 350° C. Virgin LDPE pellets were premixed with different catalysts (2.5% w/w) and fed into the extruder. The extruded polymer pellets were collected in batches from the twin screw extruder and assessed for their melt behaviour using MFI testing and molecular weight modification via rheology. The zero shear (oscillatory) viscosities of catalysed extrudates were obtained using an Anton Paar MCR 102e rheometer. The equipment contains a 25 mm parallel plate system with Peltier temperature control. The data was analysed using RheoCompass software and the complex viscosities were reported at 160° C. upon their melt. A control sample that had not been processed (heat treated) through the extruder was also included in the analysis ("control"/"as received")

TABLE 10

Rheological properties of catalytically extruded virgin LDPE

| Sample ID | MFI at 190 °C under 2.16 kg load (g/10 mins) | Complex Viscosity (Pa · s) | Weight average molecular weight, MW (kg/mol) |
|---|---|---|---|
| Exxon LDPE control | 1.8 | 19600 | 162.6 |
| C0 | 5.1 | 5190 | 112.5 |
| C1 | 3.6 | 8190 | 127.7 |
| C2 | 4.8 | 6490 | 119.7 |
| C3 | 4.8 | 7110 | 122.7 |
| C4 | 6.6 | 4080 | 105.2 |
| C5 | 2.8 | 8180 | 130.3 |
| C6 | 18 | 1310 | 76.7 |
| C7 | 7.1 | 3525 | 101.0 |
| C8 | 16 | 1255 | 75.8 |
| C9 | 6 | 3511 | 101.0 |

Figure 3B:
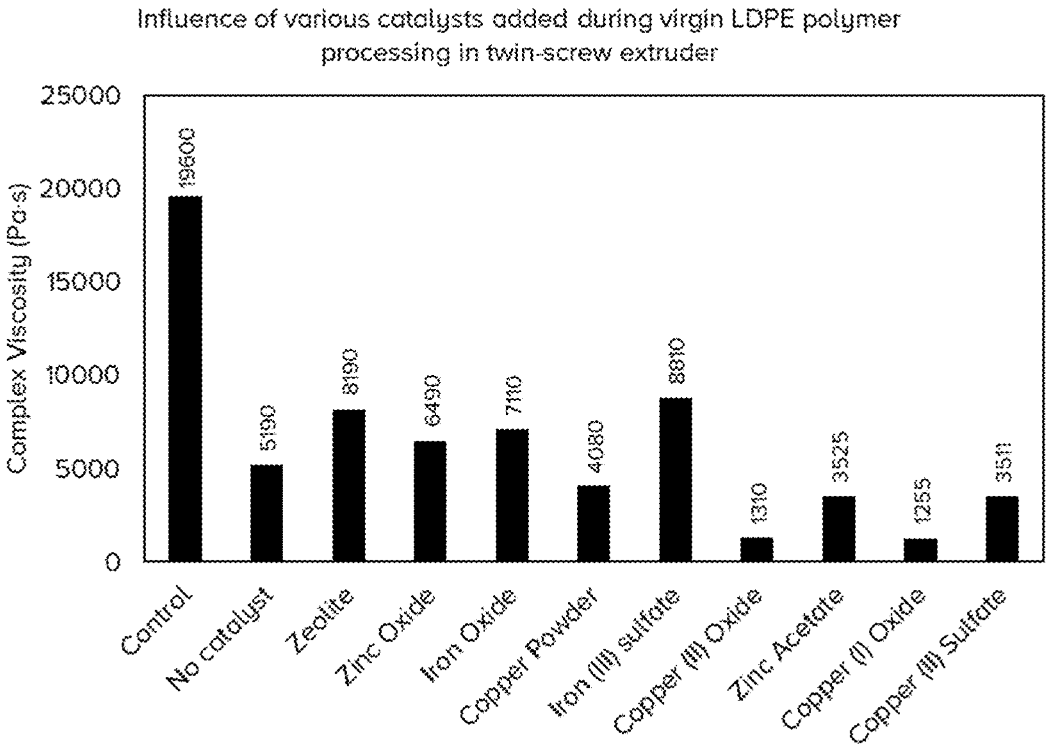

FIGS. 3*a* and 3*b* show a comparison of melt-flow indices and viscosities of the samples listed in Table 11. The data indicated that the samples extruded using Cu—O based catalysts have exceptional flow and complex viscosity characteristics.

Figure 3C:
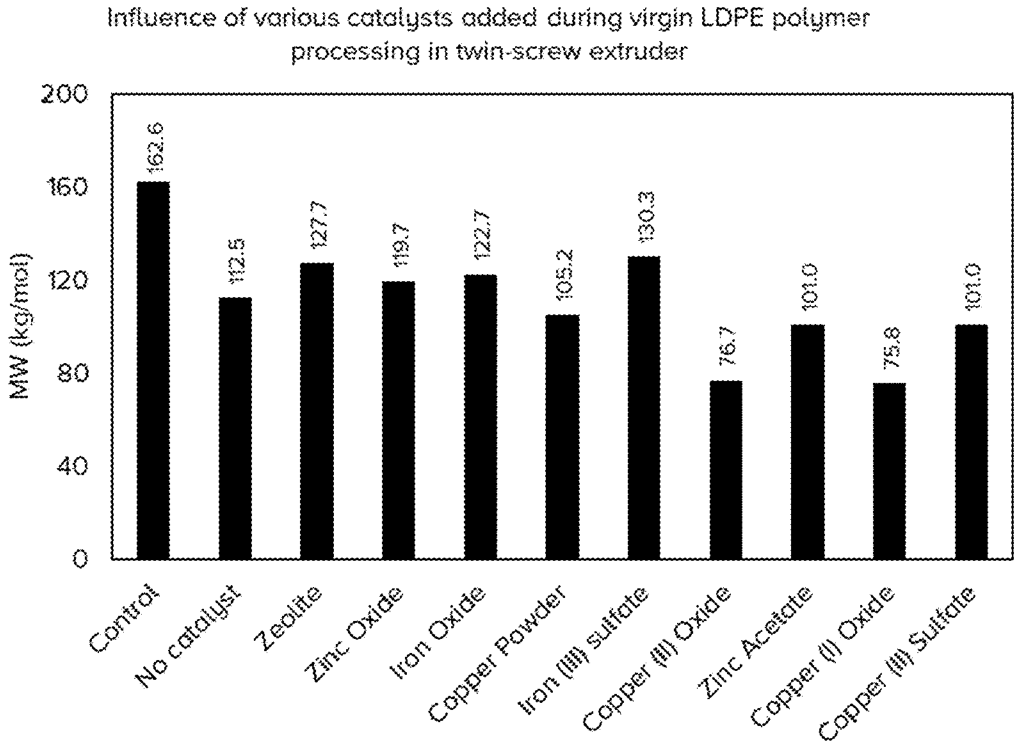

Analysis of molecular weight (FIG. 3*c*) indicated a large drop in molecular weight in copper oxide treated samples. Molecular weight of a copper (II) oxide treated polymer was approximately 50% less than control.

Of the samples presented in this example, the influence of copper oxides is substantially higher than the others. Without wishing to be bound by theory, the inventors believe that Cu outperforms the other compounds due to the following possible mechanism—As a group XI transition metal, $Cu^{2+}$ in copper (II) oxide readily reduces to $Cu^{+1}$ due to its electron configuration. The electron configuration of $C^{2+}$ places a single electron in the high-energy d-orbital to become the more energetically stable $Cu^{1+}$. As a result, the reduction reaction of $Cu^{2+}$ to $Cu^{1+}$ in the presence of atmospheric oxygen, attacks the C—H bonds in LDPE and generates a hydroxyl radical that in-turn promotes the chain scission in LDPE. It is likely that the reduced $Cu^{1+}$ is again oxidized to $Cu^{2+}$ at elevated temperature and propagates the catalytic cycle. Similar high temperature redox behaviour is expected to be observed for other group XI metals such as Ag and Au.

Example 4A—Influence of Copper (II) Oxide on Virgin LDPE

This example demonstrates the influence of copper oxide catalysts on the melt behavior of virgin LDPE.

Methodology

Virgin thermoplastic pellets from Exxon Mobil (LD104BR) were processed through a twin-screw extruder using varying quantities of copper oxide at an average barrel temperature of 350° C. A control sample without Cu catalyst was also pelletized via a twin-screw extruder at 350° C.

Three virgin LDPE samples and one control LDPE from Exxon Mobil (LD104 BR) were extruded through a twin screw using CuO catalyst. The catalyst in this example was fed via a micro-feeder.

TABLE 11

CuO content added to three different virgin LDPE samples.

| Sample ID | Wt. % of CuO |
|---|---|
| EC0 | 0 |
| EC1 | 0.1 |
| EC2 | 1 |
| EC3 | 10 |

Results & Conclusion

TABLE 12

MFI and complex viscosity of CuO-catalysed virgin LDPE

| Sample ID | MFI | Complex viscosity (Pa · s) |
|---|---|---|
| EC0 | 5.1 | 5190 |
| EC1 | 23.6 | 655 |
| EC2 | 25 | 547 |
| EC3 | 22 | 524 |

FIG. 4A(i) shows the variation of melt flow behavior with increasing amount of catalyst dosing and FIG. 4A(ii) shows the variation of complex viscosity with increasing amount of Cu catalysts. The figures indicate that the melt-flow behavior and viscosity have an inversely proportional relationship. The figures also indicate that CuO catalysts exhibit efficacy across a broad range of dosing regimens and may be more efficient in smaller doses for virgin LDPE.

Example 4B—Varying Catalyst Dosage in Post-Construction rPE

Methodology

Recycled LDPE pellets were processed through a twin-screw extruder using varying quantities of copper oxide at 350° C. 1, 2 and 3 wt. % CuO powder were fed into the extruder using a micro feeder. A control r-LDPE sample without CuO catalyst was also extruded for evaluating the variation in molecular properties.

TABLE 13

Catalyst concentration for different samples.

| Sample ID | CuO Concentration |
|---|---|
| BDC0 | 0 wt. % |
| BDC1 | 1 wt. % |
| BDC2 | 2 wt. % |
| BDC3 | 3 wt. % |

Results & Conclusions

The melt flow behavior of the samples and their viscosities were analyzed and compared to a control sample (pure building wrap pellets) extruded at 350° C. to determine the influence of CuO on polymer properties.

| Sample ID | MFI (g/10 mins) | Complex Viscosity (Pa · s) |
|---|---|---|
| BDC0 | 5.4 | 3830 |
| BDC1 | 16.20 | 996 |
| BDC2 | 18.75 | 769 |
| BDC3 | 22.40 | 635 |

FIG. 4B(i) and FIG. 4B(ii) show that r-LDPE behaves in a way similar to that of virgin LDPE described in Example 3A. in this example, CuO reduced the complex viscosity and increased the melt flow by over 60%. While the difference between the properties for control sample and the copper oxide samples is significantly large, the increased Cu dose only marginally modified the properties.

Example 4C—Influence of CuO Catalyst on Recycled Linear-Low Density Polyethylene Methodology Post-agricultural recycled LLDPE (r-LLDPE) and post-consumer printed LLDPE (p-LLDPE) pellets were processed through a twin-screw extruder using 2.5 wt. % (of polymer) copper oxide at 350° C. Control samples without Cu catalyst were also extruded through the twin-screw for comparison.

TABLE 14

Catalyst dosage in different linear-LDPE samples

| Sample ID | Polymer and CuO Conc. |
|---|---|
| BWC0 | r-LLDPE, No CuO |
| BWC1 | r-LLDPE & 2.5% CuO (w/w) |
| PLC0 | p-LLDPE, No CuO |
| PLC1 | p-LLDPE & 2.5% CuO (w/w) |

Results

| Sample ID | MFI (g/10 mins) | Complex Viscosity (Pa · s) |
|---|---|---|
| BWC0 | 5.1 | 1704 (160 °C) |
| BWC1 | 16.7 | 1118 (160 °C) |
| PLC0 | 10.33 | 1852 (150 °C) |
| PLC1 | 30.00 | 376 (150 °C) |

FIG. 4C(i) and FIG. 4C(ii) show that CuO dosing has reduced the complex viscosity and increased the MFI. The reduction in viscosity implies a reduction in molecular weight of the polymer. In this example, for r-LLDPE the introduction of CuO catalyst has reduced the viscosity by 34% and for p-LLDPE the viscosity reduced by 40%.

Example 5—Preparation of a Thermoplastic Dispersion Using CuO Catalyzed Post-Construction r-LDPE (2.5 wt. % of Cu(II)O)

Methodology

Pellets prepared according to methodology described in Example 4B with 2.5 wt % CuO were passed through a twin-screw extruder, with the first zones were set above the melting point of the polymer, and subsequent zones set at 95° C. under a pressure of 10 bar. Water was added to achieve a final moisture content of 50 to 70% in the recycled thermoplastic dispersion.

Heat-treated r-LDPE pellets (control samples) without Cu(II)O catalysis were also passed through the twin-screw extruder under the same conditions as mentioned above.

The particle size distribution (PSD) of thermoplastic dispersions was measured using a Bettersizer 2600 equipped with laser diffraction technology. The measurement tool has a range of 0.02 mm to 2600 mm. The dispersions were added to the measurement compartment with water until an obscuration level of 5%-8% was achieved. The PSD values for $50^{th}$ percentile (D50) of measurements were reported.

Results

The thermoplastic dispersions were collected and analyzed for their PSD D50 prior to blending into woodchip to prepare 15 mm thick particleboards of 450 mm×450 mm. The particle sized for copper oxide-catalysed dispersions reduced by 23%.

TABLE 15

Particle size distributions of thermoplastic dispersions prepared from heat-treated r-LDPE pellets with and without 2.5 wt % Cu(II)O

| Sample ID | MFI of thermoplastic (g/10 mins at 190 °C) | D50 PSD of thermoplastic dispersion (mm) |
|---|---|---|
| TPD0 | (BWC0) 5.1 | 408 |
| TPD2.5 | (BWC1) 16.7 | 315 |

The reduced PSD of CuO-catalysed thermoplastic dispersion improved the performance of the dispersion when passed through a twin-screw extruder. The resultant dispersion appeared to have a unimodal particle size distribution with exceptional stability.

Example 6—WFB Board Prepared Using Thermoplastic Dispersions from Example 4

This example describes the production of composite wood fibre boards made using the thermoplastic dispersion prepared in Example 4. It also provides insights on the potential of using recycled thermoplastics with modified melt behaviour as sustainable alternatives for enhancing processing and/or tailoring the mechanical performance of wood fibre composite boards.

Methodology

Four mechanical tests were performed to understand the effect of thermoplastic dispersions produced from CuO catalysed r-LDPE and r-LLDPE-modulus of elasticity (MoE), modulus of rupture (MoR), internal bonding strength (IB), and percentage of thickness swell (24 hour soak).

Three replicate boards were produced from the different thermoplastic dispersions and their performance was tested according to the standards listed in Table 1.

Results

FIG. 6 shows the average MoE, MOR, IB and swell thickness after a 24-hour soak test. The results show that the CuO catalysed thermoplastic dispersions outperform the control for all tests and surpass the P3 industrial standards for MoE, MoR and IB.

The reduced viscosity of the stable Cu(II)O-catalysed thermoplastic dispersion possibly improved the distribution of dispersion in the woodchip matrix. As a result, the wood fibre boards have exceptional performance.

The improved melt behaviour of the thermoplastic resin and the stability of the dispersion play a crucial role in enhancing the WFB properties. Without being bound by theory, the inventors hypothesise that the viscosity and melt behaviour of the thermoplastic dispersion from CuO-catalysed polymers provides an improved affinity to woodchips compared to the control and thereby improving the MoE, MoR and IB of the composite board. The enhanced compatibility of woodchips and the dispersion indicates that the dispersion has improved wetting behaviour on the woodchips. As a result the woodchips have a more uniform coating of the polymer leading to an improved moisture resistance behaviour.

Example 7—Binder Production

This example demonstrates preparation of wood fibre board from thermoplastic dispersions using various LDPE feedstocks and processing conditions.

Methodology

TABLE 16

Twin screw extruder temperature configuration with different polymer samples

| Polymer description | Temperature profile | PVOH Content | Polymer description |
|---|---|---|---|
| Post-industrial LDPE | 120\|95\|95\|95\|95\|95\|96 | 5 | Post-industrial LDPE |
| Virgin LDPE B | 100\|100\|140\|140\|140\|95\|95\|95 | 5 | Virgin LDPE B |
| Virgin LDPE B | 100\|100\|140\|140\|140\|95\|95\|95 | 10 | Virgin LDPE B |
| Virgin LDPE A | 99\|97\|95\|95\|96\|94\|94 | 10 | Virgin LDPE A |

Three LDPE samples were processed through a twin-screw extruder at the temperature settings shown above. The polymer samples were pre-mixed with polyvinyl alcohol pellets (5% w/w and 10% w/w) and fed into the extruder feed to enhance processing efficiency. The PVOH increased the flow of the sample through the twin screw extruder and no high pressure/torque failures were observed. Water was added to achieve a final moisture content in the thermoplastic dispersion of between 50-70%

Thermoplastic dispersions were collected from the twin-screw extruder and mixed with eMDI and wood fibre using a paddle mixer. Composite mixtures and boards were produced according to the protocol described in example 2A and 2B except emulsified methylene diphenyl diisocyanate (eMDI) was used in place of pMDI.

TABLE 17

Wood fibre board press parameters

| Press factor (s/mm) | Density (g/cm$^3$) | Binder content (wt % of composite mixture) | eMDI content in binder (wt %) |
|---|---|---|---|
| 12 | 620 | 10 | 10 |

Physical test results of different binder sources of wood fibre boards

TABLE 18 test results of wood fibre boards

| Binder base material | PVOH (wt %) | MoE (MPa) | MOR (MPa) | IB (MPa) |
|---|---|---|---|---|
| Post-industrial LDPE | 5 | 1990 | 13.7 | 0.45 |
| Post-industrial LDPE | 5 | 1675 | 11.6 | 0.46 |
| VIRGIN LDPE B | 5 | 2527 | 14.0 | 0.81 |
| VIRGIN LDPE B | 5 | 2390 | 12.8 | 0.65 |
| VIRGIN LDPE B | 10 | 2111 | 12.5 | 0.71 |
| VIRGIN LDPE B | 10 | 2074 | 12.3 | 0.77 |
| VIRGIN LDPE A | 10 | 1970 | 13.3 | Not tested |
| VIRGIN LDPE A | 10 | 2076 | 13.8 | Not tested |

TABLE 19

| Average MoE, MoR and IB | | | | |
|---|---|---|---|---|
| Binder base material | PVOH (wt %) | Average. MoE (MPa) | Average. MOR (MPa) | Average. IB(MPa) |
| Post-industrial LDPE | 5 | 1832.4 | 12.6 | 0.5 |
| VIRGIN LDPE B | 5 | 2458.5 | 13.4 | 0.7 |
| VIRGIN LDPE B | 10 | 2092.5 | 12.39 | 0.74 |
| VIRGIN LDPE A | 10 | 2023.2 | 13.53 | None |

TABLE 20

| Wood fibre board testing with difference in level of PVOH using virgin LDPE B | | | |
|---|---|---|---|
| Binder base material | Surfactant used (wt %) | Average. MoE (MPa) | Average MoR (MPa) |
| VIRGIN LDPE B | 5 | 2458.5 | 13.4 |
| VIRGIN LDPE B | 10 | 2092.5 | 12.39 |

Virgin LDPE B has a MFI of 21.4 whereas Virgin LDPE A MFI is 2 g/10 mins. Both LDPE A and LDPE B provided thermoplastic dispersions which were used to prepare wood fibre boards with excellent board properties. The level of PVOH within the binder affected the mechanical strength of boards produced using the binder. In particular, 5% PVOH provided a stronger board compared to 10% PVOH. In addition, adding 5% PVOH enhanced the melt flow of the thermoplastic through the extruder. The addition of PVOH is believed to provide additional hydroxyl groups which bind with the isocyanate functional group. Oversaturating with 10% PVOH produces adverse effects on the strength of the wood fibre board.

Example 8—Mixed Waste Polymer Binder Production

This example demonstrates production of binder with recycled polypropylene and recycled polyethylene feedstocks. These represent a high melt-point thermoplastic (PP melt-point approx. 171° C.) and a low melt-point thermoplastic (LDPE melt point approx. 106° C.). Three thermoplastic material treatments were tested:

a. Recycled PP (Yuplene):recycled post-industrial LDPE (Astron) 1:1 b. Recycled PP (Yuplene):recycled post-industrial LDPE (Astron) 1:4 c. Recycled Post-industrial LDPE (Astron) 100%

A twin-screw extruder was used to process the three feedstock materials and prepare thermoplastic dispersions. Wood fibre boards were produced using the binder and tested for strength characteristics.

Three mechanical tests were performed to understand the effect of varying the ratios of thermoplastic-modulus of elasticity (MOE), modulus of rupture (MOR), and internal bonding strength (IB). This example provides insights into the potential for using a high melt-point recycled thermoplastic such as PP and a low melt-point recycled thermoplastic such as LDPE as sustainable alternatives for enhancing processing and/or tailoring the mechanical performance of wood fibre composite boards.

Methodology

Binder Preparation

The raw materials were passed through a twin-screw extruder to homogenise the materials and mix the different plastic sources to produce a thermoplastic pellet. The thermoplastic pellets were passed through a twin-screw extruder with water added to induce emulsification and particle size reduction and produce a thermoplastic dispersion.

Three replicate boards were produced using binder prepared from the three thermoplastic dispersions. Identical twin-screw extruder emulsification conditions were used.

TABLE 21

| Temperature profile for twin screw extruded binder Set temperature profile | | | | | | | | |
|---|---|---|---|---|---|---|---|---|
| Z1 | Z2 | Z3 | Z4 | Z5 | Z6 | Z7 | Z8 | Die |
| 120 | 95 | 95 | 95 | 95 | 95 | 95 | 95 | 25 |

The twin-screw extruder temperature profile shown in the table above incorporates a higher initial temperature to melt the thermoplastic prior to mixing.

The extruder comprised two water injection points. Two surfactants were used at the respective first and second injection points—an anionic surfactant—Dowfax 2A-1 and Teric 463—a non-ionic surfactant. Surfactant input was adjusted to achieve 4% surfactant w/w to resin. Water was injected at injection point 1 (post-melting zone) and injection point 2—dilution zone. Water flow was adjusted to achieve a resin:water ratio post injection point 1 of 3.5 and a resin:water ratio post-injection point 2 of 1.3.

During processing, the torque (current in amps) reading on the twin-screw extruder was assessed and graded in a range from 1—least processable/highest current to 5—most processable/lowest current. This indicates the processability of the recycled material and is linked to energy consumption. Initial tests using recycled post-industrial LDPE failed due to high torque/current readings causing shut-down of the extruder.

Following processing in the extruder, the dispersion moisture content was adjusted by drying for 24 hours to achieve a composite mixture moisture content of 8-12%. Thermoplastic dispersion was mixed with emulsified methylene diphenyl diisocyanate (eMDI) for 10 minutes. 1% of composite mixture by weight was eMDI. 500 g of coarse woodchips was added in two batches and mixed for 10 minutes each to prepare the composite mixture.

Board Preparation

The mixed formulation was distributed in a mold on a platen and flattened to prepare a mat with a consistent height and uniform distribution of the materials. The mat was pre-compressed with a 5-tonne force then subjected to hot pressing with a press factor of 12 and target density of 620 to produce a compressed wood fibre board.

Board Testing

MOE, MOR and IB testing was carried out on four strips from three replicate boards per treatment to investigate how different combinations of recycled PP and PE affect mechanical strength. During processing, torque readings were assessed for each sample to provide a processability metric.

Results

TABLE 22

| MOE, MOR and IB for thermoplastic polymer blends | | | | |
|---|---|---|---|---|
| Treatment | MOE | MOR | IB | Processability |
| 50LDPE/50PP (RECYCLED) | 1774 | 11.8 | 0.50 | 5/5 |
| 80LDPE/20PP (RECYCLED) | 1780 | 12.8 | 0.48 | 1.5/5 |
| 100% LDPE RECYCLED | 1811 | 13.1 | 0.43 | 1/5 |

MOE—The table above shows mean modulus of elasticity across the three treatment groups. The 50% recycled PP has the lowest average MOE which is 1774 MPa whereas the MOE with only LDPE was 1811 MPa. There is a non-significant trend (P>0.1) in MOE with higher LDPE indicating higher MOE.

MOR—The table above shows mean MOR across the three treatment groups. The average modulus of rupture of the three treatment groups were 11.817 MPa (50/50=recycled PP/recycled LDPE), 12.82 Mpa (20/80=recycled PP/recycled LDPE) and 13.140 MPa (100% recycled LDPE). There is a non-significant (p>0.05) trend towards higher LDPE content providing higher MOR.

IB—The table above shows the mean IB across three treatment groups. The average internal bonding strength for the three different board compositions showed a negative correlation to the proportion of recycled LDPE. However, the means did not differ significantly across treatment groups (p>0.05).

Processability—The processability of samples with increasing PP content was increased—i.e. lower energy consumption required for processing and less chance of clogging.

Melt-flow index—the table below shows a clear increase in melt-flow index (measured at 1900 C) when proportion of LDPE in a blend is increased.

TABLE 23

| Melt-flow index for PP:LDPR blends | |
|---|---|
| Treatment | MFI |
| PP:LDPE = 10:90 | 0.643 |
| PP:LDPE = 20:80 | 0.683 |
| PP:LDPE = 50:50 | 1.416 |
| PP = 100 | 4.583 |

The results indicate that a recycled high-melt thermoplastic and a recycled low-melt thermoplastic comprising a mixture of PP and LDPE can be used to make wood fibre boards with no detrimental effects on MOE or MOR. The processability of the blend increased with higher PP content. This trial indicates that the described methods enable processing of material with high melt temperatures to make binder and wood fibre boards with improved processability, decreased energy consumption and consistently high strength.

Recycled PP has a higher melting temperature of approx. 171° C. Recycled LDPE has a lower melt temperature of approx. 106° C. Increased PP proportion in blends resulted in increased melt-flow index. This in turn provided advantageous reduction in torque and improved processability through the twin-screw extruder. This example shows that blends of recycled PP and LDPE can provide viable wood fibre boards following processing through an extruder. It also shows that melt-flow index can be increased by adding recycled PP to a blend, for example at least 50% recycled PP in a blend of LDPE and PP provides enhanced processability and mixing.

Example 9—Characterisation of Recycled Thermoplastic Material for Enhanced Processing This example illustrates a pre-processing characterisation step used in some embodiments to customise the extrusion parameters in methods and apparatus described herein. Specifically, this example provides a numerical model for characterisation of a waste thermoplastic polymer to determine the PP:LDPE ratio and adjustment of processing parameters. This enables enhanced processing and energy efficiency of extrusion processes by determining the properties of an unknown thermoplastic, then adjusting the extrusion and optionally functionalisation parameters of the process to prepare an enhanced thermoplastic dispersion for board making. Waste polypropylene (PP) was combined with waste Low-Density Polyethylene (LDPE), and the melt flow index was measured at temperatures from 190° C. to 230° C. in accordance with ASTM D1238 standard.

Results

| Set temperature (°C) | % of PP | Average MFI | Nat. log MFI |
|---|---|---|---|
| 190 | 0 | 0.522 | −0.65009 |
| | 10 | 0.643 | −0.44161 |
| | 20 | 0.683 | −0.38126 |
| | 50 | 1.416 | 0.347836 |
| | 100 | 4.583 | 1.522354 |
| 200 | 10 | 0.816 | −0.20334 |
| | 20 | 0.833 | −0.18272 |
| | 50 | 1.9 | 0.641854 |
| | 100 | 5.33 | 1.673351 |
| 210 | 10 | 1.016 | 0.015873 |
| | 20 | 1.016 | 0.015873 |
| | 50 | 2.23 | 0.802002 |
| | 100 | 7.066 | 1.955295 |
| 220 | 10 | 1.283 | 0.249201 |
| | 20 | 1.253 | 0.225541 |
| | 50 | 2.783 | 1.023529 |
| | 100 | 10.833 | 2.382597 |
| 230 | 10 | 1.45 | 0.371564 |
| | 20 | 1.49 | 0.398776 |
| | 50 | 3.143 | 1.145178 |
| | 100 | 14.516 | 2.675251 |

FIGS. 7*a*-7*e* show calibration graphs showing experimental results of varying recycled PP:LDPE compositions with natural log of average MFI at different set-point temperatures from 190° C. to 230° C.

TABLE 24

| Linear modelling of the different composition of waste PP and waste LDPE at different temperatures. | |
|---|---|
| Set temperature (°C) | Linear model |
| 190 | y = 0.022x − 0.7117 |
| 200 | y = 0.0218x − 0.499 |
| 210 | y = 0.0226x − 0.3184 |
| 220 | y = 0.0249x − 0.1484 |
| 230 | y = 0.0265x − 0.0452 |

Different set temperatures for the melt flow index testing provided a linear regression between the percentage of Polypropylene (PP) and the melt flow index at various temperatures (190, 200, 210, 220, and 230° C.). This linear relationship provides a method for determining the level of PP in mixed waste thermoplastic polymer. The determination of PP and LDPE composition enables the modification of extrusive emulsification to enhance thermoplastic dispersion preparation and wood fibre board mechanical properties.

Example 10—Composite Board Production Using Isocyanates

The experiment describes the production of composite wood-fibre boards made using thermoplastic dispersion and the isocyanate variants polymeric methylene diphenyl diisocyanate (pMDI) and emulsion of pMDI in water (eMDI).

Methodology

Thermoplastic dispersion was prepared from Virgin LDPE A blended with 5% PVOH by twin screw extruder processing according to the methods and twin-screw configuration outlined in example 3. Wood fibre boards were prepared according to the mixing and board press procedures outlined in Example 2A and 2B. Two replicates were prepared.

Results

| Sample name | Actual Density (kg/m3) | Binder content (wt %) | Resin type | MoE (MPa) | MOR (MPa) | IB (MPa) | Swelling after 24 hrs (%) |
|---|---|---|---|---|---|---|---|
| pMDI-S1 | 642 | 10 | pMDI | 2037 | 12.6 | 0.61 | 12.77% |
| pMDI-S2 | 646 | 10 | pMDI | 2206 | 14.4 | 0.6 | 13.58% |
| pMDI-S3 | 641 | 10 | pMDI | 2132 | 13.6 | 0.8 | 13.15% |
| pMDI-S4 | 645 | 10 | pMDI | 2038 | 14.1 | 0.73 | 12.45% |
| pMDI-S5 | 640 | 10 | pMDI | 2054 | 13.6 | 0.74 | 13.04% |
| pMDI-S6 | 641 | 10 | pMDI | 2046 | 13.6 | 0.74 | 13.23% |
| pMDI-S7 | 640 | 10 | pMDI | 2037 | 13.0 | 0.71 | 13.50% |
| pMDI-S8 | 649 | 10 | pMDI | 2070 | 14.1 | 0.67 | 13.34% |
| eMDI-S1 | 657 | 10 | eMDI | 2343 | 16.4 | 0.78 | 13.40% |
| eMDI-S2 | 647 | 10 | eMDI | 2225 | 14.2 | 0.79 | 13.30% |
| eMDI-S3 | 641 | 10 | eMDI | 2108 | 13.6 | 0.83 | 13.60% |
| eMDI-S4 | 642 | 10 | eMDI | 2271 | 15.2 | 0.84 | 12.20% |
| eMDI-S5 | 639 | 10 | eMDI | 2207 | 14.9 | 0.83 | 12.50% |
| eMDI-S6 | 638 | 10 | eMDI | 2328 | 15.8 | 0.88 | 12.80% |

Figure 8A:
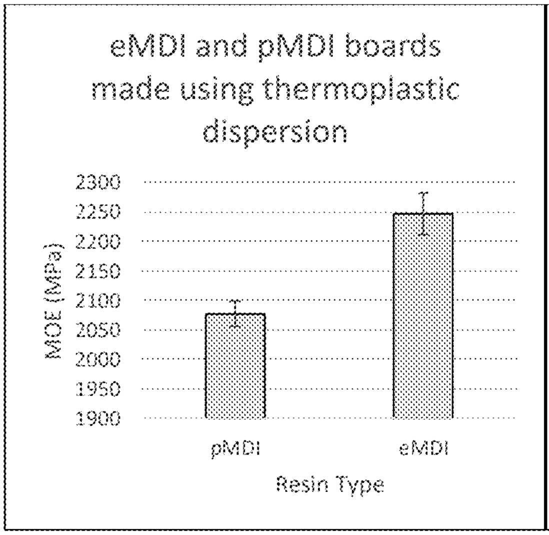
FIGS. 8*a*-8*c* show average MOE, MOR, and IB for boards made using eMDI and pMDI.
Figure 8B:
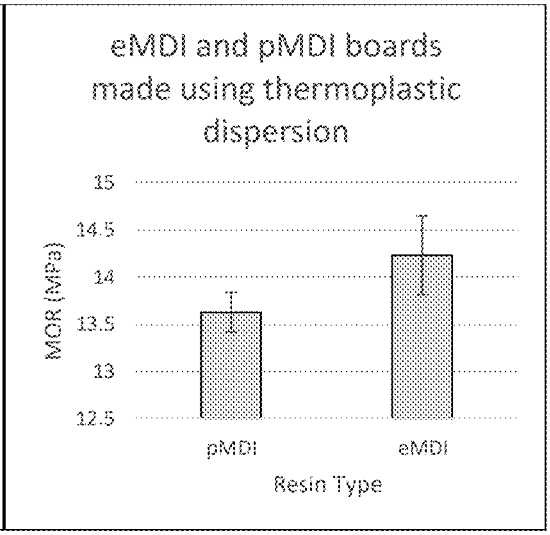
Figure 8C:
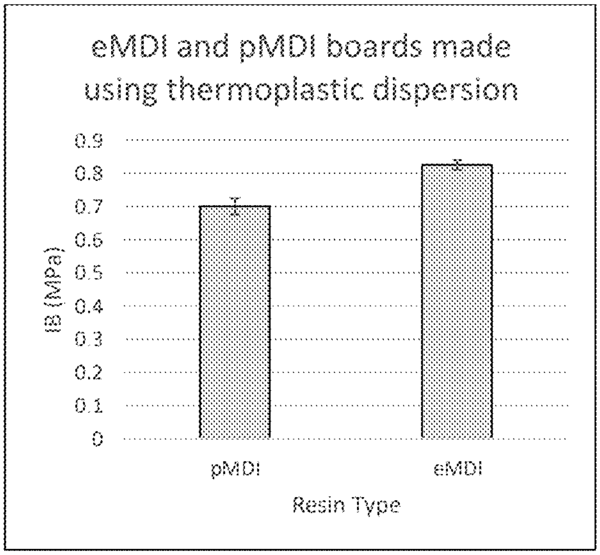

FIGS. 8*a*-8*c* show average MOE, MOR and IB for boards made using eMDI and pMDI. eMDI exhibited a higher mean MOE (2247.07 MPa), MOR (14.23 MPa), and IB (0.825 MPa) compared to pMDI MOE (2077.5 MPa), MOR (13.63 MPa) and IB (0.7 MPa).

LDPE thermoplastic dispersions were used to produce high quality wood fibre boards using eMDI and pMDI. eMDI provided higher strength boards compared to pMDI.

Example 11—Alternative Lignocellulosic Materials

Aim

This example investigates several lignocellulosic substrates that may be included within composite boards comprising thermoplastic dispersions described herein.

Methodology

Two lignocellulosic substrates were trialled in comparison to pine wood chip: pea straw and barley straw. Pea and Barley straw have a coarse and fibrous texture and are often used for water retention in gardening and agricultural applications. Mechanical strength was tested according to the standard methodology.

pMDI was used as cross-linking agent at 10 wt % of the binder. A thermoplastic dispersion comprising LDPE (Exxon) was used. The twin-screw configuration for dispersion preparation is as described in Example 2A and 2B. Melt flow index of the polymer was 2 g/10 mins at 190° C. The moisture content of the lignocellulosic substrates was standardised to 10 wt %. 10 wt % of the board composition was made up of binder. Boards of 10 mm thickness and 620 kg/m$^3$ were prepared for testing.

The table below shows mechanical strength testing results of each board:

TABLE 25 strength testing results of board prepared using alternative substrates.

| Lignocellulosic substrate | Average, MoE (MPa) | Average. MoR (MPa) |
|---|---|---|
| Pea straw | 776.2 | 5.6 |
| Barley straw | 1838.63 | 12.4 |
| Pine tree - soft wood fibre | 1190 | 8.15 |

The mechanical strength of boards made with barley straw exhibited the highest strength as measured by MOR and MOE. Barley straw typically has a higher lignin content compared to some other crop residues. The lignin content in barley straw is estimated to be in the range of 15%-20% and pea straw is in the range of 5-15%.

This experiment shows that a range of lignocellulosic substrates can be used to produce composite boards.

Example 12—Optimisation of Binder Content in Wood Fibre Boards Using Recycled Thermoplastic Dispersions This example investigates various ratios of binder to cross-linker for the production of composite boards comprising wood fibre.

Methodology

Thermoplastic dispersions were prepared in a twin screw extruder.

Thermoplastic comprised Virgin LDPE B (MFI: 20 g/10 mins, 190° C.) with 5% PVOH (wt %) blended in the twin screw feed prior to emulsification to improve processability. Wood fibre board was formulated at 620 kg/m$^3$ density.

TABLE 26

Temperature profile in Twin screw extruder

| Temperature profile (°C) | | | | | | | |
|---|---|---|---|---|---|---|---|
| Z1 | Z2 | Z3 | Z4 | Z5 | Z6 | Z7 | Z8 |
| 100 | 100 | 140 | 140 | 140 | 95 | 95 | 95 |

TABLE 27

Composite board press parameters.

| Parameter | Board formulation |
|---|---|
| Density (kg/m$^3$) | 620 |
| Press factor (mm/seconds) | 12 |
| Isocyanate content (wt %) | 20, 15, 10, 8, 6 |
| Binder content (wt %) | 15, 10, 8 |

Binder ratio and isocyanate (eMDI) content were varied to understand optimal ratios.

Results

TABLE 28

| Composite board characteristics. | | | | | | | | |
|---|---|---|---|---|---|---|---|---|
| Sample name | Wt % Wood chip of composite mixture | Wt % Binder of composite mixture | Wt % eMDI of binder | Wt % eMDI of composite mixture | Mean MoE | Mean MoR | Mean IB (MPa) | Mean TS 24 h (%) |
| 1 | 85 | 15 | 15 | 2.25 | 2120 | 13 | 0.89 | 11.10% |
| 2 | 85 | 15 | 10 | 1.5 | 2145 | 14.2 | 0.97 | 10.25% |
| 3 | 90 | 10 | 20 | 2 | 2311 | 14.7 | 1.19 | 11.05% |
| 4 | 90 | 10 | 15 | 1.5 | 2475 | 15.3 | 0.92 | 14.9% |
| 5 | 90 | 10 | 10 | 1 | 2250 | 13.4 | 0.81 | 18.5% |
| 6 | 92 | 8 | 8 | 0.64 | 2002 | 11.4 | 0.67 | 27.25% |
| 7 | 92 | 8 | 6 | 0.48 | 1902 | 10.3 | 0.54 | 34.2% |

Figure 9A:
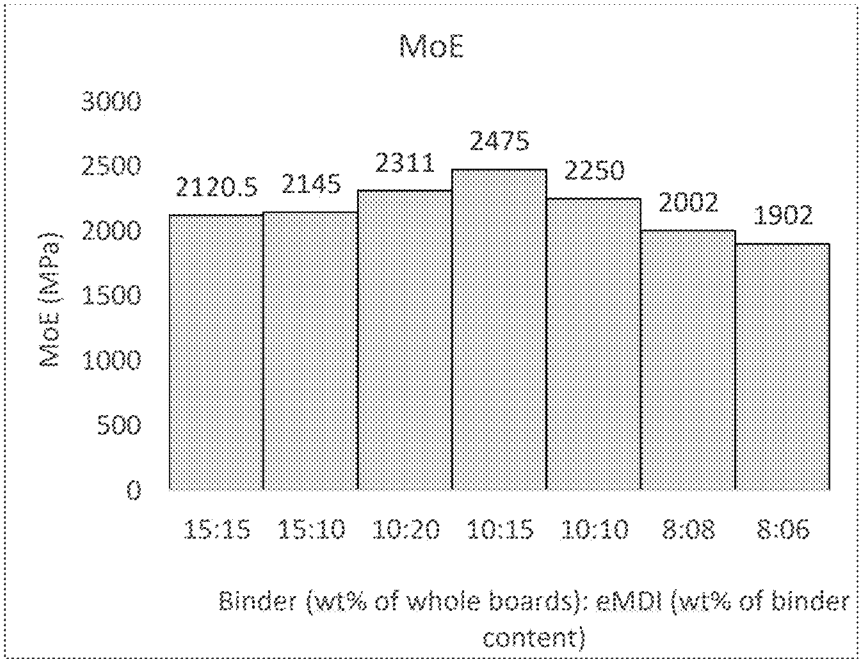
FIGS. 9*a*-9*d* show variations of modulus of elasticity (MoE), modulus of rupture (MoR), internal bonding strength (IB) and swelling rate (SB) in 24 hrs across different board treatments.
Figure 9B:
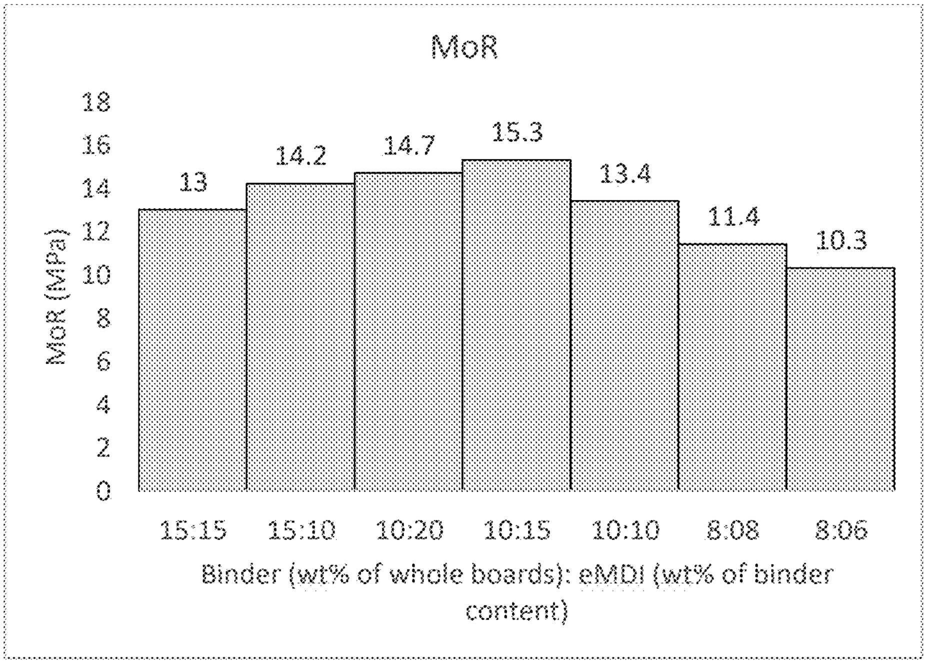
Figure 9C:
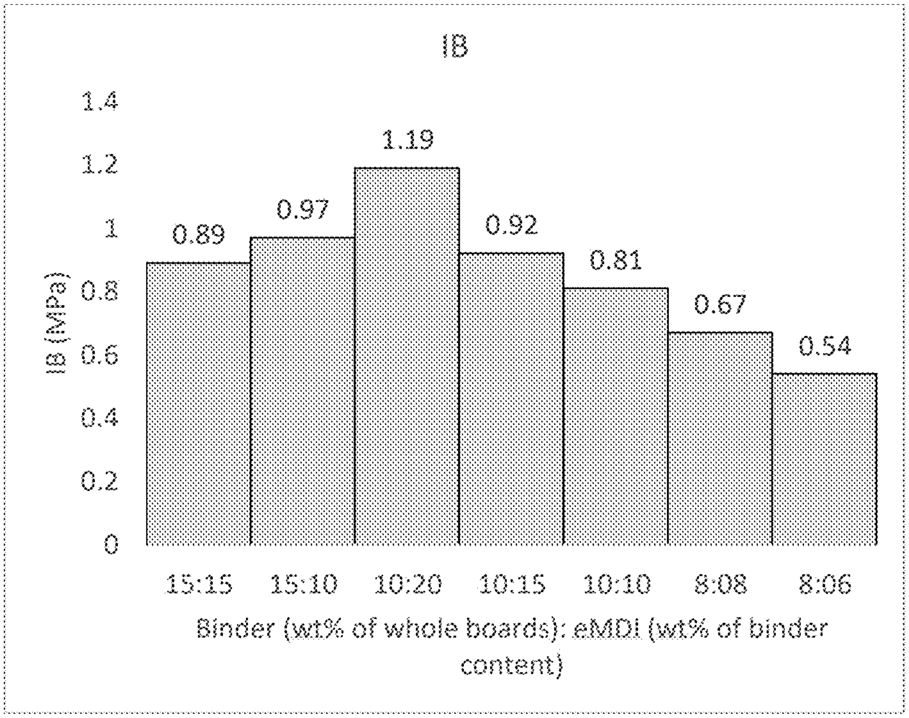
Figure 9D:
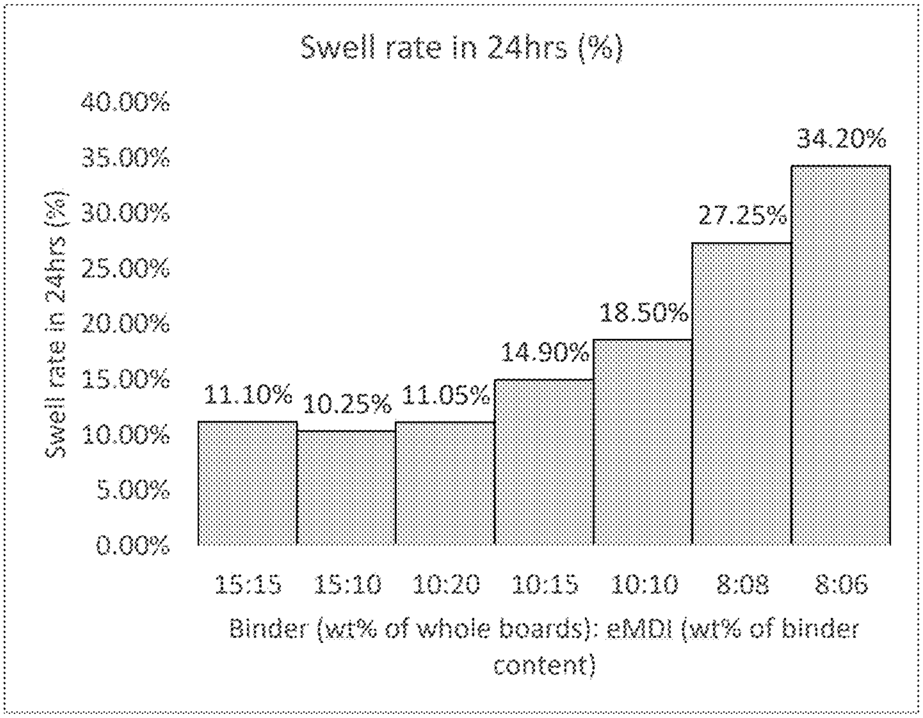
Figure 10A:
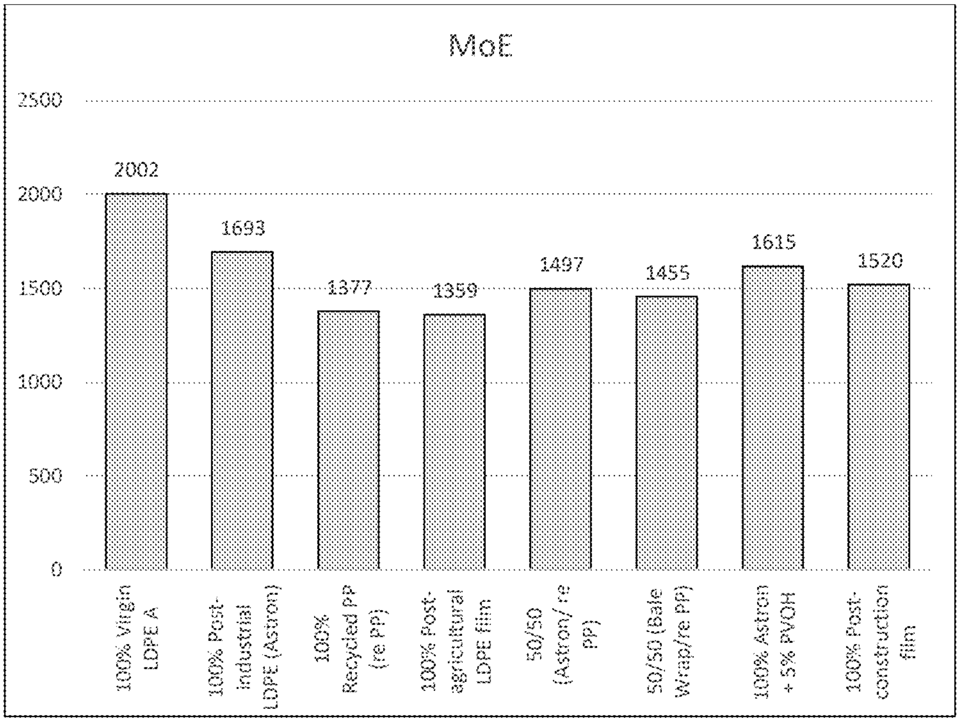
FIGS. 10*a*-10*d* show MoE, MOR, IB, and 24 h swell results for composite boards made using different recycled thermoplastic dispersions.
Figure 10B:
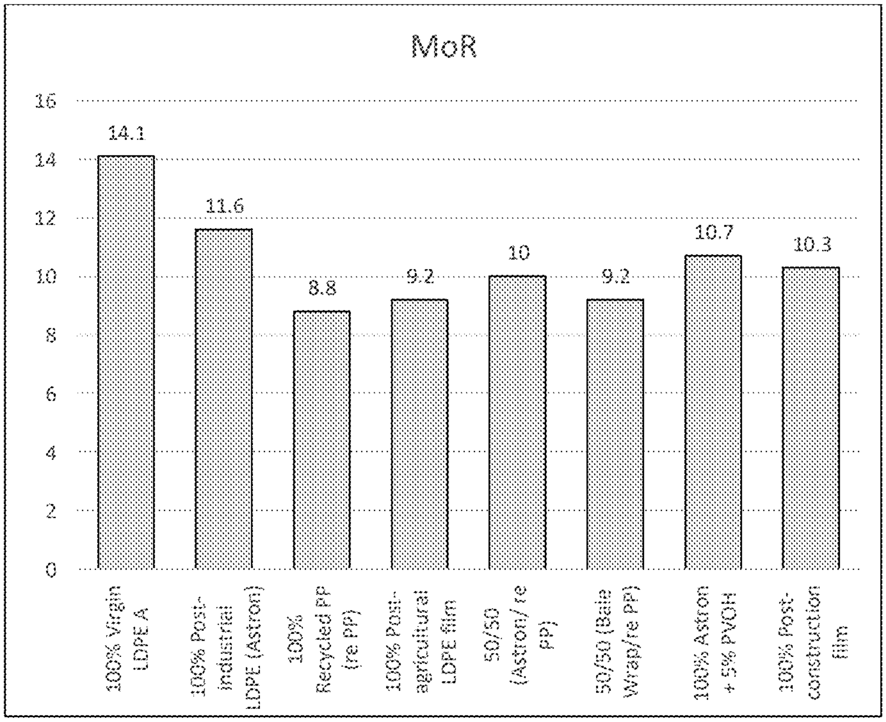
Figure 10C:
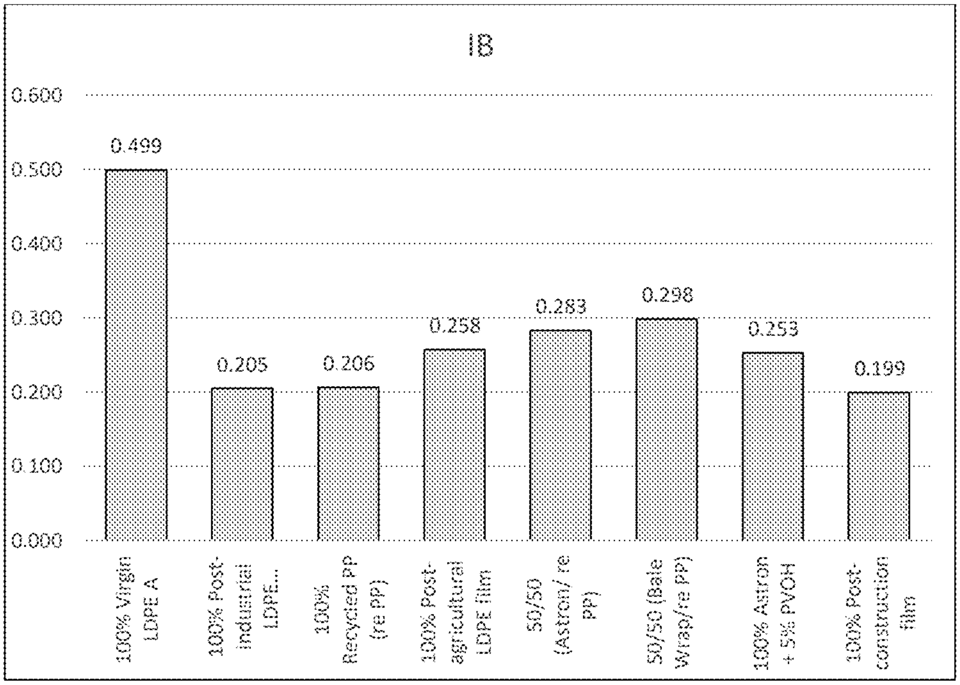
Figure 10D:
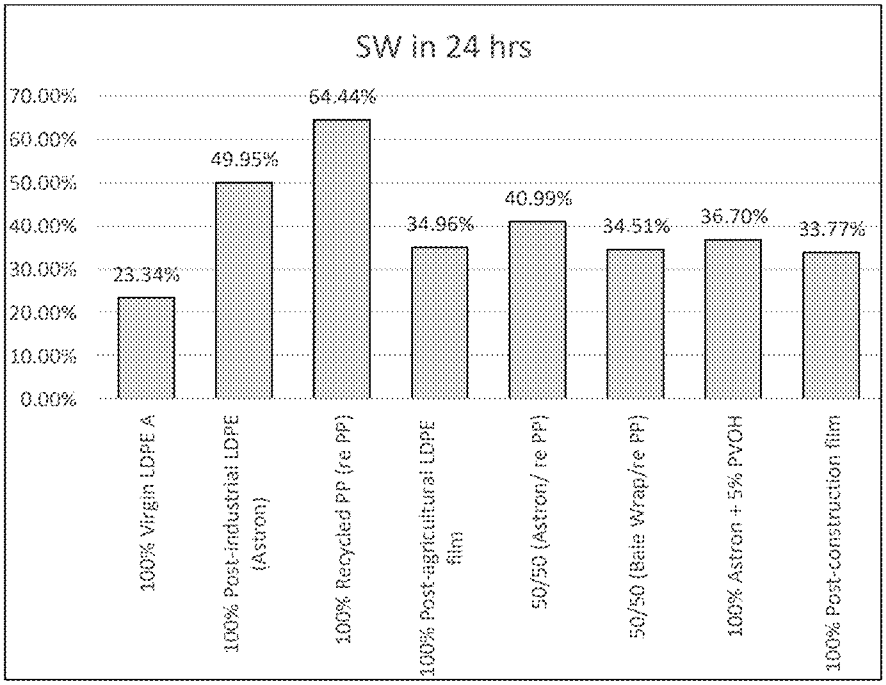

FIG. 9A shows variation of modulus of elasticity (MoE) across different board treatments. FIG. 9*b* shows variation in modulus of rupture (MoR) across different board treatments. FIG. 9*c* shows internal bonding strength (IB) across different board treatments. FIG. 9*d* shows swelling rate (SB) in 24 hrs across different board treatments.

The results show that the high concentration of isocyanate (sample 4) provided best mechanical performance (MoE and MoR). This board comprised 90% by weight of lignocellulosic material. Thermoplastic dispersion and isocyanate mixing provided good dispersion throughout the board and resulted in high strength.

The internal bond strength is determined by the interaction between the lignocellulosic fibres and the binder comprising thermoplastic dispersion. The optimal performance, with a strength of 1.19 MPa, was achieved with 10% binder and 2% isocyanate. The relatively high content of the isocyanate enhances the adhesion between the wood fibre and the binder.

The swell rate of wood particle board is dependent on the wood chip content. FIG. 19*d* shows that increased wood chip content and decreased binder leads to increased swell rate. This could be partly due to the binder providing reduced porosity and therefore increased water resistance within the board. The enhanced hydrophobicity of the binder is also believed to contribute to this beneficial property of the binder containing boards.

Example 13—Recycled Thermoplastic Dispersions Used to Make Wood Fibre Boards

This example describes preparation of thermoplastic dispersions from four different waste thermoplastics (Low density polyethylene and Polypropylene) and one virgin LDPE Preparation of composite boards comprising wood fibre is described.

Methodology

Thermoplastic samples were prepared as pellets and fed into a twin screw extruder with the configuration outlined below. Water flow rate was adjusted to achieve a moisture content in the thermoplastic dispersion of 45% to 55%.

Two samples with 1:1 blended PE/PP mixture was prepared to enhance the processibility and reduce the particle size of the thermoplastic dispersion following extrusion. The first sample comprised 1:1 post-industrial LDPE (Astron) and recycled PP. The second sample comprised 1:1 post-agricultural LDPE film and recycled polypropylene. Each blend is passed through the first twin screw extruder for mixing then through a second twin-screw extruder for preparation of the thermoplastic dispersion.

TABLE 29

| Twin screw extruder temperature profile<br>Set temperature profile | | | | | | | | |
|---|---|---|---|---|---|---|---|---|
| Z1 | Z2 | Z3 | Z4 | Z5 | Z6 | Z7 | Z8 | Die |
| 180 | 180 | 95 | 95 | 95 | 95 | 95 | 95 | 25 |

The TSE temperature profile was maintained constant for all samples.

TABLE 30

| Boards were formed with constant parameters across all samples | |
|---|---|
| Parameter | Board formulation |
| Density (kg/m$^3$) | 650 |
| Press factor (mm/seconds) | 12 |
| Isocyanate content in binder (wt %) | 10 |
| Binder content in composite mixture (wt %) | 10 |

Two replicate boards were prepared for each treatment. Moisture content of the prepared binder was assessed.

Results

| Description | Screw rpm | Screw amps | Torque |
|---|---|---|---|
| 100% Virgin LDPE A | 150 | 6-7 | 9-10 Nm |
| 100% Post-industrial LDPE (Astron) | 150 | 9-10 | 23-28 Nm |
| 100% Recycled PP (re PP) | 150 | 6-7 | 9-10 Nm |
| 100% Post-agricultural LDPE film (Bale wrap) | 150 | 9-10 | 20-25 Nm |
| 50/50 (Astron/re PP) | 150 | 6.5-7.5 | 10-15 Nm |
| 50/50 (Bale Wrap/re PP) | 150 | 6.5-7.5 | 8-12 Nm |
| 100% Astron + 5% PVOH | 150 | 8-9 | 15-20 Nm |
| 100% Post-construction film (building wrap) | 150 | 7.5-8.5 | 15-20 Nm |

Table 31—Shows processability metrics which are dependent on thermoplastic source, and any modifications (e.g. blending with PP).

TABLE 32

| Moisture content and composite board results (mean of 2 replicate boards) | | | | | | | |
|---|---|---|---|---|---|---|---|
| Description | Binder MC (%) | Wood chip MC (%) | Composite mix MC (%) | MoE (MPa) | MoR (MPa) | IB (MPa) | SW in 24 hrs (%) |
| 100% Virgin LDPE A | 51 | 6.0 | 13.86 | 2002 | 14.1 | 0.499 | 23.34% |
| 100% Post-industrial LDPE (Astron) | 21 | 6.0 | 8.04 | 1693 | 11.6 | 0.205 | 49.95% |
| 100% Recycled PP (re PP) | 32 | 6.6 | 9.14 | 1377 | 8.8 | 0.206 | 64.44% |
| 100% Post-agricultural LDPE film (Bale wrap) | 50 | 6.6 | 10.94 | 1359 | 9.2 | 0.258 | 34.96% |
| 50/50 (Astron/re PP) | 44 | 5.7 | 9.53 | 1497 | 10 | 0.283 | 40.99% |
| 50/50 (Bale Wrap/re PP) | 50 | 5.7 | 10.13 | 1455 | 9.2 | 0.298 | 34.51% |
| 100% Astron + 5% PVOH | 51 | 7.5 | 11.81 | 1615 | 10.7 | 0.253 | 36.70% |
| 100% Post-construction film (building wrap) | 45 | 6.6 | 13 | 1520 | 10.3 | 0.199 | 33.77% |

FIGS. 10*a*-10*d* show MoE, MOR, IB and 24 h swell results.

The twin screw extruder torque and current data illustrate the binder processability for each treatment. The torque measured in the twin screw extruder reflects the shear force capable of inducing mixing within the TSE. Polymers with high melt flow index (MFI), like Virgin LDPE A and recycled PP, exhibit lower torque. The blending of polymers, specifically Astron/rePP and bale wrap/rePP, results in a reduction in torque when combined with the high MFI of recycled PP.

MoE and MoR indicated that all processed thermoplastic dispersions provided binder compositions with acceptable board properties. Post-industrial LDPE (Astron) exhibits good performance compared to other types of waste thermoplastic dispersions.

Virgin LDPE exhibited stronger composite boards. This is believed to be due to additives or contaminants in waste thermoplastics which interfere with binding properties of the cross-linker.

Internal bonding strength determines the binding between wood fibre and polymer binder. The four different waste polymer binders provided a similar internal bonding strength around 0.2-0.3 MPa.

Virgin LDPE A binder had 0.5 MPa in internal bonding strength which is twice greater than the waste thermoplastic polymer-based binder boards. This indicates that waste thermoplastics lose binding strength, potentially due to additives or contaminants. Methods described herein such as the treatment using heat or catalysts, or functionalisation, demonstrate the inventors steps towards managing and ameliorating the detrimental properties of the waste thermoplastics used. These inventive steps represent a significant advance in being able to process difficult feedstocks such as waste LDPE or PP film and other waste plastics.

The swelling rate observed over a 24-hour period in water indicates a significant propensity for water absorption in the recycled Polypropylene board. This swelling rate appears to be dependent on the moisture content of the board both before and during the preparation process. Interestingly, contrary to expectations, the board with lower initial moisture content exhibits a higher water absorption rate and swells more easily. The experimental results demonstrate that, with a moisture content of 9.14%, the recycled polypropylene board exhibited a swelling rate exceeding 60% within a 24-hour timeframe. Furthermore, both the 8% moisture content for Astron and the 9.53% moisture content for Astron/PP, which are considered low, demonstrated elevated swelling rates within a 24-hour period.

Example 14—Production of Composite Boards Comprising Thermoplastic Dispersion Plus Cross-Linker with and without Wax This example compares the performance of composite boards made with 3% isocyanate with or without an Aquawax 88 Gen wax coating.

Methodology

Composite boards 14A and 14B were control samples made using size-reduced pine wood chip and 3% pMDI. Composite boards 14C and 14D were made using size-reduced pine wood chip, 3% pMDI and 10% thermoplastic dispersion made from recycled building wrap according to the process of BWT4 in example 2A. Aquawax 88 Gen was applied to composite boards 14B and 14D at an amount of 0.75% of the board's weight.

TABLE 33

| board composition parameters. | | | | |
|---|---|---|---|---|
| Sample name | pDMI % wt of board | Thermoplastic source | Thermoplastic dispersion % wt of board | wax % of board |
| 14A | 3% | Building wrap | 0 | 0% |
| 14B | 3% | Building wrap | 0 | 0.75% |
| 14C | 3% | Building wrap | 10 | 0% |
| 14D | 3% | Building wrap | 10 | 0.75% |

The boards were assessed for performance in strength, stiffness, bond strength and swelling.

Results

TABLE 34

| performance characteristics of the boards with and without wax. | | | | |
|---|---|---|---|---|
| Sample name | MOR (Mpa) | MOE (MPa) | IBS (MPa) | ST (%) |
| 14A | 17.1 | 2656 | 1.13 | 33.58 |
| 14B | 16.6 | 2581 | 0.79 | 23.26 |
| 14C | 25.2 | 2863 | 1.50 | 10.85 |
| 14D | 24.9 | 2852 | 1.50 | 10.64 |

There was no significant difference between the boards MOR and MOE between the boards without wax and those with wax included.

There was a significant difference between the IB of Board samples 14A and 14B compared to Board samples 14C and 14D which were made with heat treated thermoplastic dispersion.

Control boards (no thermoplastic dispersion) containing wax showed some improvement in swell resistance (from 33.58% to 23.26%). However, the samples containing thermoplastic dispersion exhibited an improvement in swell resistance (i.e. increased moisture resistance) down to only 10.85% and 10.64% for boards without wax and with wax respectively. Further, boards containing thermoplastic dispersion exhibited enhanced strength (MOR) and stiffness (MOE) compared to control boards (regardless of whether wax was included in the control board).

Example 15—Comparison of Differing Amounts of Thermoplastic Dispersion with 1% Isocyanate This example compares the performance of boards made with 1% isocyanate with 10%, 15% and 20% thermoplastic dispersion by weight of the board with 1% isocyanate.

Methodology

Boards were made using 10%, 15% and 20% thermoplastic dispersion made from Recycled post-industrial LDPE film (building wrap) with 1% pMDI according to the parameters outlined for BWT4 in Example 2A.

TABLE 35 performance characteristics of the boards with different amounts of thermoplastic dispersion.

| Sample name | Binder (wt %) | MOR (MPa) | MOE (MPa) | IBS (MPa) | ST (%) |
|---|---|---|---|---|---|
| 12 | 0 | 11.0 | 1726 | 0.59 | 61.09 |
| 13 | 10 | 16.2 | 2071 | 0.80 | 23.19 |
| 14 | 15 | 15.8 | 1851 | 0.85 | 17.30 |
| 15 | 20 | 15.8 | 1713 | 0.81 | 14.02 |

Increasing amounts of thermoplastic dispersion resulted in reduced thickness swelling in the swell test, with even 10% of thermoplastic dispersion showing nearly three times less swelling of the board without thermoplastic dispersion. The thickness decreased as the amount of thermoplastic dispersion increased.

The boards with thermoplastic dispersion all had similar MOR and IBS, which was higher than the control board. The board with 10% thermoplastic dispersion had increased MOE with a decline in MOE as the amount of thermoplastic dispersion was increased.

We claim:

1. A method of producing a thermoplastic dispersion comprising applying heat to a thermoplastic to produce a melted thermoplastic, subsequently dispersing the melted thermoplastic in water under agitation to produce a thermoplastic dispersion comprising thermoplastic particles, wherein the melted thermoplastic is subjected to a treatment step, the treatment step comprising heating the thermoplastic at an activation temperature greater than 300° C.

2. The method according to claim 1, wherein the treatment step:

a) increases the melt flow index of the thermoplastic, b) decreases the viscosity of the thermoplastic, c) decreases the average molecular weight distribution of the thermoplastic, or d) any one or more of (a) to (c).

3. The method of claim 1, wherein the treatment step is applied during melting or dispersion of the thermoplastic.

4. The method of claim 1, wherein the treatment step further comprises adding a metal catalyst.

5. The method of claim 4, wherein the metal catalyst is selected from the group consisting of group XI transition metal catalysts, group XI transition metal oxide catalysts, copper catalysts, copper oxide catalysts, copper (I) oxide, copper (II) oxide, copper (II) sulphate, silver catalysts, silver (I) oxide, silver (II) oxide, gold catalysts, a metal catalyst with a single s orbital electron in the outer shell, a metal acetate catalyst, and zinc acetate.

6. The method of claim 4, wherein the metal catalyst is a copper oxide.

7. The method of claim 4, wherein the metal catalyst is added at 0.01% to 100% by weight of the thermoplastic.

8. The method of claim 1, wherein a cross linker is added to the thermoplastic dispersion to produce a binder.

9. The method of claim 8, wherein the cross linker is selected from an organic peroxide or an isocyanate.

10. The method of claim 9, wherein isocyanate is added at 5% to 50% by weight of the binder.

11. A method of producing a thermoplastic composite product, comprising mixing the thermoplastic dispersion of claim 1, with a fibre to form a composite mixture and applying heat and pressure to the composite mixture in a press or mould to form a thermoplastic composite product.

12. The method of claim 11 wherein the fibre is selected from a lignocellulosic material selected from sawdust, wood fibre, wood particles, wood chips, wood sheets, coconut husk, rice straw or husk, barley straw, bamboo, palm leaves or a combination thereof.

13. The method of claim 11, wherein the composite mixture has a moisture content of around 5% to around 15%.

14. The method of claim 1, wherein a source of thermoplastic comprises waste thermoplastic.

15. A method of manufacturing a moisture resistant composite product comprising obtaining a thermoplastic dispersion produced by heating a thermoplastic to produce a melted thermoplastic, subsequently dispersing the thermoplastic in water under agitation to produce a thermoplastic dispersion comprising thermoplastic particles, and wherein the thermoplastic is subjected to a treatment step;

combining the thermoplastic dispersion with a cross-linker and a fibre to produce a composite mixture, and applying heat and pressure to the composite mixture to form a moisture resistant composite product that exhibits a 24 hour swell of less than about 15% when measured by a 24 hour swell test;

wherein the treatment step is selected from i) heating the thermoplastic at an activation temperature greater than 300° C., ii) adding a metal catalyst, or iii) both (i) and (ii).

16. The moisture resistant composite product of claim 15 wherein the cross-linker is present at an amount of 0.5% to 5% by weight of the composite product.

17. The moisture resistant composite product of claim 15 absent a moisture resistance compound, other than the thermoplastic dispersion.

18. The moisture composite product of claim 17 wherein the moisture resistance compound is a wax.

19. A composite board comprising:

a) waste thermoplastic;

b) lignocellulosic material; and c) a cross linker, wherein the lignocellulosic material comprises at least 75% of the composite board, and wherein the composite board exhibits a 24 hour swell of less than about 15% when measured by a 24 hour swell test.

20. The composite board of claim 19 wherein the cross-linker is present at an amount of 0.5% to 5% by weight of the thermoplastic dispersion.

* * * * *